United States Patent
Hatton

(10) Patent No.: US 10,698,978 B1
(45) Date of Patent: Jun. 30, 2020

(54) SYSTEM OF ENGLISH LANGUAGE SENTENCES AND WORDS STORED IN SPREADSHEET CELLS THAT READ THOSE CELLS AND USE SELECTED SENTENCES THAT ANALYZE COLUMNS OF TEXT AND COMPARE CELL VALUES TO READ OTHER CELLS IN ONE OR MORE SPREADSHEETS

(71) Applicant: Charles Malcolm Hatton, Elgin, IL (US)

(72) Inventor: Charles Malcolm Hatton, Elgin, IL (US)

(*) Notice: Subject to any disclaimer, the term of this patent is extended or adjusted under 35 U.S.C. 154(b) by 340 days.

(21) Appl. No.: 15/469,848

(22) Filed: Mar. 27, 2017

(51) Int. Cl.
| | |
|---|---|
| *G06F 17/24* | (2006.01) |
| *G10L 15/26* | (2006.01) |
| *G06F 17/27* | (2006.01) |
| *G06F 16/22* | (2019.01) |
| *G06F 16/245* | (2019.01) |
| *G06F 16/25* | (2019.01) |
| *G06F 16/332* | (2019.01) |
| *G06F 16/33* | (2019.01) |

(52) U.S. Cl.
CPC .......... *G06F 17/246* (2013.01); *G06F 16/221* (2019.01); *G06F 16/245* (2019.01); *G06F 16/252* (2019.01); *G06F 16/3328* (2019.01); *G06F 16/3344* (2019.01); *G06F 17/2705* (2013.01); *G06F 17/2765* (2013.01); *G10L 15/265* (2013.01)

(58) Field of Classification Search
CPC .................................................. G06F 17/246
USPC ......................................................... 707/769
See application file for complete search history.

(56) References Cited

U.S. PATENT DOCUMENTS

| | | | | |
|---|---|---|---|---|
| 8,046,348 | B1* | 10/2011 | Rehling | G06F 16/3344 707/708 |
| 8,510,328 | B1* | 8/2013 | Hatton | G06F 16/90332 707/769 |
| 9,047,285 | B1* | 6/2015 | Li | G06F 16/3344 |
| 9,300,784 | B2* | 3/2016 | Roberts | H04M 1/72536 |
| 9,318,108 | B2* | 4/2016 | Gruber | G10L 15/22 |
| 9,330,720 | B2* | 5/2016 | Lee | G11B 20/10527 |
| 9,471,668 | B1* | 10/2016 | Alupului | G06F 16/3329 |
| 9,495,357 | B1* | 11/2016 | Smyros | G06F 16/24578 |
| 9,519,871 | B1* | 12/2016 | Cardonha | G06F 16/93 |
| 9,620,104 | B2* | 4/2017 | Naik | G10L 13/027 |
| 9,626,955 | B2* | 4/2017 | Fleizach | G10L 13/043 |
| 9,842,105 | B2* | 12/2017 | Bellegarda | G06F 17/2785 |

(Continued)

*Primary Examiner* — Jason C Olson

(57) ABSTRACT

Multiple computer applications connecting spreadsheet cells together using Natural language and software agents that allow English language sentences to be input that then read the English language sentences stored in spreadsheet cells which then can be used to analyze column text and individual text stored in cells. English language sentences sent from software agents, input by the user, or from text or SQL databases, or spreadsheet cells can put text values in cell columns which make a column of text unique. Likewise, two cells can be used to make decisions from IF Then Else sentences that can be integrated with the decision decided by a column of unique text and in each case the solutions comprise the steps of reading solution cells that contain English language sentences. Multiple spreadsheets can send text back and forth making decisions along the way until not more sentences exist in the application's sentence queues.

4 Claims, 78 Drawing Sheets

Overall architectural functional flow diagram

(56) References Cited

U.S. PATENT DOCUMENTS

| | | | |
|---|---|---|---|
| 9,865,280 B2 * | 1/2018 | Sumner | G06F 16/3344 |
| 9,881,007 B2 * | 1/2018 | Orsini | G06F 17/28 |
| 9,966,065 B2 * | 5/2018 | Gruber | G06F 17/2705 |
| 9,971,774 B2 * | 5/2018 | Badaskar | G10L 15/26 |
| 10,185,542 B2 * | 1/2019 | Carson | G06F 3/167 |
| 10,223,066 B2 * | 3/2019 | Martel | G06F 3/167 |
| 2005/0043940 A1 * | 2/2005 | Elder | G06F 16/24522 704/9 |
| 2007/0055656 A1 * | 3/2007 | Tunstall-Pedoe | G06F 17/28 |
| 2007/0233660 A1 * | 10/2007 | Rogers | G06F 17/2705 |
| 2008/0154828 A1 * | 6/2008 | Antebi | G06N 5/022 706/46 |
| 2010/0299154 A1 * | 11/2010 | Benja-Athon | G06F 19/325 705/2 |
| 2011/0004488 A1 * | 1/2011 | Benja-Athon | G06F 19/325 705/2 |
| 2011/0270603 A1 * | 11/2011 | Ovil | G06F 17/2705 704/9 |
| 2013/0262107 A1 * | 10/2013 | Bernard | G06F 17/2785 704/235 |
| 2018/0157468 A1 * | 6/2018 | Stachura | G06F 8/38 |

* cited by examiner

Overall architectural functional flow diagram

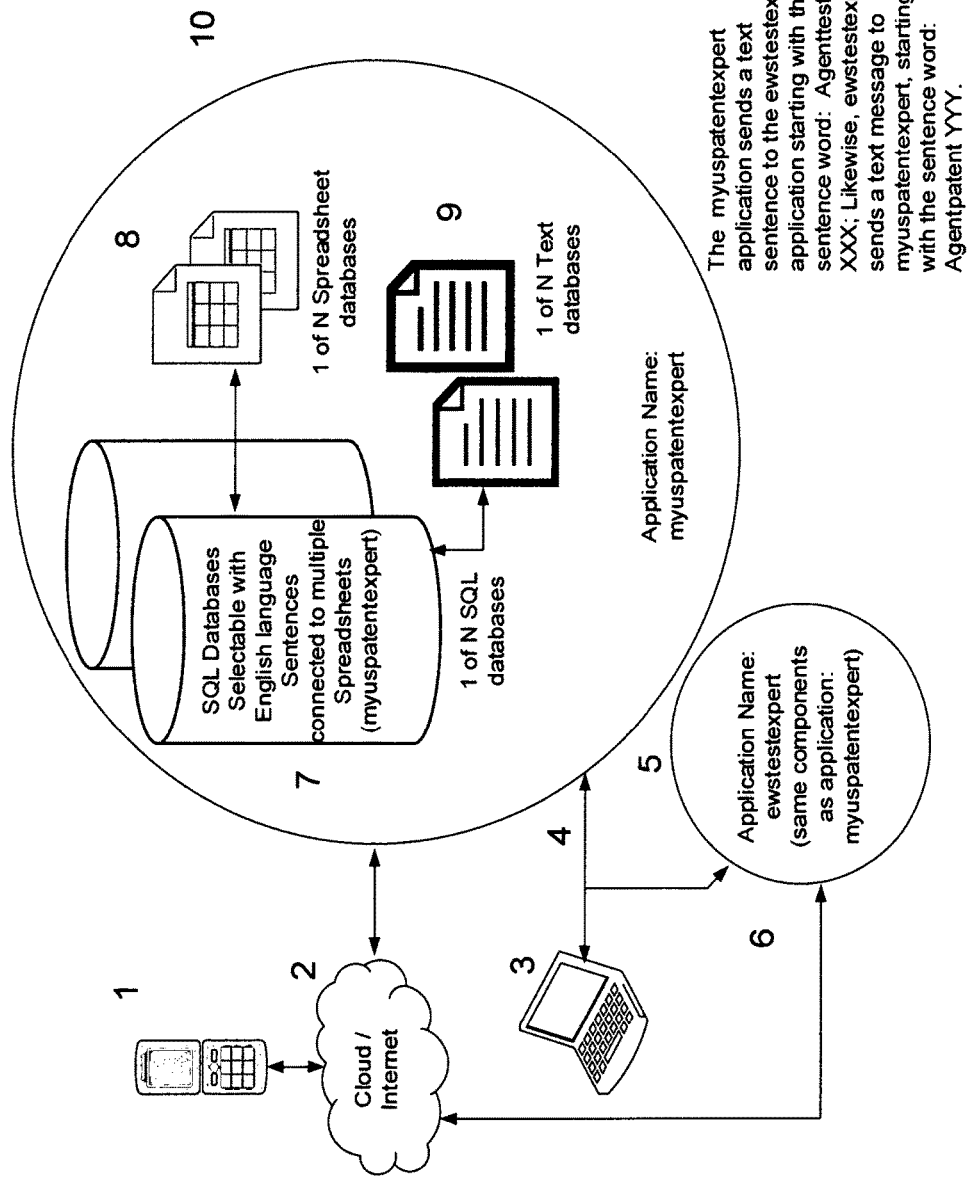

FIG. 3

Showing status of Support Items where, for example, Row 9 Col D says Password not done (received from USPO)

| | A | B | C | D | E |
|---|---|---|---|---|---|
| 1 | | | | | |
| 2 | | | | | |
| 3 | | | | | |
| 4 | | | US Patent Application Support Check List | | |
| 5 | | Check list items | Reference column - used to tell user what should be in Column D when completed: | Actual column - put codes in this column when completed: | |
| 6 | | 1. Are all the figures correctly formatted with margins and labels? | %ADMIN% COMPLET%1FigsFor mated | %ADMIN% COMPLET%1FigsFor mated | |
| 7 | | 2. Are the fonts the same for all text and figures? | %2SameTextFonts | %2SameTextFonts | |
| 8 | | 3. Are the file formats all the same? | %3FileFmts | %3FileFmts | ←3 |
| 9 | | 4. Has the password to upload files been received? | %4PasswdDone | %4PasswdNotDone | ←4 |
| 10 | | 5. Other | | | |
| 11 | | 6. Other | | | |
| 12 | | 7. Other | | | |
| 13 | | 8. Other | | | |
| 14 | | 9. Other | | | |
| 15 | | 10. Other | | | |
| 16 | | 11. Other | | | |
| 17 | | 12. Status of all support documents. | %12Of12Done% | %XOf12NotDone% | Sheet3 |

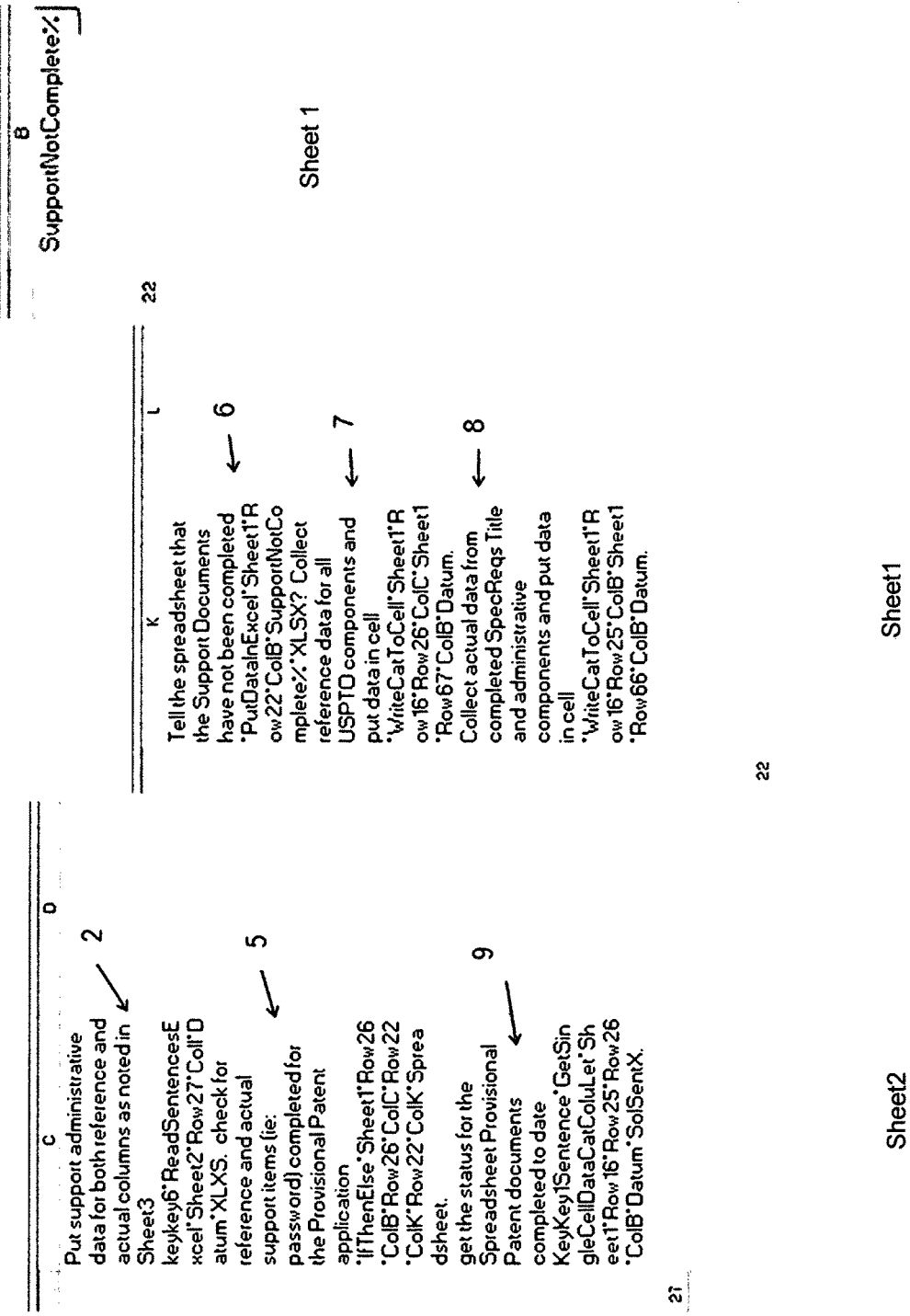

FIG. 5

Concatenating data from Sheet1 Row16 to 25 ColB and writing this data to Sheet1 R66 ColB using English language sentences coming from cells, software agent text messages, user input, and or other computers.

| | B | C | B |
|---|---|---|---|
| 16 | SpecReqs% | SpecReqs% | SpecReqs%Title%SupportNotComplete% |
| 17 | Title% | Title% | |
| 18 | | Abstract% | |
| | | | 66 SpecReqs%Title%Abstract%Drawings%Specification%Claims%SupportComplete% |
| 19 | | Drawings% | |
| 20 | | Specification% | |
| 21 | | Claims% | |
| 22 | SupportNotComplete% | SupportComplete% | |
| | | | 67 SpecReqs%Title%AbstractSupportNotComplete% |
| 23 | | | |
| | | | 68 SpecReqs%SupportNotComplete% |
| 24 | | | |
| | | | 69 Other conditions not shown that can be used by other helper sentences. |
| 25 | | | |
| 26 | | | 70 |

Actual Cell values (above) are placed in cells by sentences or by users who open the spreadsheet and place a value in a cell.

The Reference cell values (above) when compared against the actual cell values is used to determine how much work has been completed to file the US Patent application.

Sheet 1

Sheet 1

FIG. 6

Sentence Item # 9 (below) concatenates (FIG. 5) Sheet1 Row16 to Row26 ColB and since the concatenated value matches helper sentence shown in the FIG. 29 Sentence Item # 9D, the helper sentence then uses its solution cell (is the conditional sentences solution cell as well ) to read the sentences Item #'s 10 and 11 below.

| C | D | F | G |
|---|---|---|---|
| Put support administrative data for both reference and actual columns as noted in Sheet3 keykey6 ReadSentencesExcel Sheet2 Row27 ColI D atum XLXS. check for reference and actual support items (ie: password) completed for the Provisional Patent application "IfThenElse Sheet1 Row66 ColB Row67 ColB Row22 ColK Row22 ColK Spreadsheet. get the status for the Spreadsheet Provisional Patent documents completed to date KeyKey1Sentence GetSingleCellDataCatColuLet Sheet1 Row16 Row25 Row26 ColB Datum SolSentX. | 2<br><br>5<br><br>9 | show the Provisional US Patent status sheet for the completion of specification requirements and title wording 3/3/2014USPatentApplicationLessThan500CharsSeeTopOfSpecification. agenttest let me know if funding has been approved for the spreadsheet Provisional Patent application. | 10<br><br>11<br><br>Sentence 12 is the key3 sentence and is not in a spreadsheet cell. - it is part of the input which consists of: (Key7. Key3.) |

27                                                                                                                                                                                                    17

Sheet2                                                                                                                           Sheet1

FIG.7

User Status (sentence Item # 10 in FIG. 29 – The sentence Map / Listing. Status Sheet showing that the USPTO Requirements were reviewed and at the USPTO web site and the Title wording has been proposed

| Item # | Date | Title Wording | USPTO Web Site Requirements Reviewed | Comments: |
|---|---|---|---|---|
| 1 | 2/16/2016 | A system of English language sentences and words stored in spreadsheet cells that read those cells and use selected sentences that analyze columns of text and compare cell values to read other cells in one or more spreadsheets. | Yes – 7/5/2015 | Final Title Wording |
|  |  |  |  |  |

FIG. 9

A user message stating that: the: US Patent support documents have not been completed.

The Administrative Support Requirements: (USPTO web site reviewed); Figures properly formatted; All same text fonts; File names properly formatted; Password not completed; Support activities not completed.

1. As of 10/31/2014

Key3 Sentence is part of the (turn on the switch to store processed sentences. Key7. Key3.) input as noted in FIG. 29 starting at sentence Item # 12

FIG. 11

| | B | C | | I |
|---|---|---|---|---|
| 16 | SpecReqs% | SpecReqs% | | show what has been prepared to write the US Provisional Patent Application 3/3/2014USPatentApplicationLessStartUpMode? let me know if the Title wording has been completed 'IfThenElse'Sheet1'Row17'ColB'Row97'ColB'Row17'ColH'Row17'ColI'Spreadsheet. |
| 17 | Title% | Title% | SpecReqs%Title%SupportNotComplete% — 66 | |
| 18 | | Abstract% | SpecReqs%Title%Abstract%Drawings%Specification%Claims%SupportComplete% — 67 | |
| 19 | | Drawings% | | |
| 20 | | Specification% | SpecReqs%Title%Abstract%SupportNotComplete% — 68 | |
| 21 | | Claims% | SpecReqs%SupportNotComplete% — 69 | |
| 22 | SupportNotComplete% | SupportComplete% | | |
| 23 | | | Other conditions not shown | |
| 24 | | | | |
| 25 | | | | |
| 26 | | | — 70 | |

Else Part Cell

Sheet 1

Sheet 1

Sheet 1

FIG. 12

User Status (Sentence Item # 13 in FIG. 29) is read from a cell in the spreadsheet and displays this document - Preparation needed to start work on US Patent application:

| Item # | Date | Status | Changes Made | Comment |
|---|---|---|---|---|
| 1 | 2/5/2014 | 1. Study USPTO web site to determine requirement to write patent application. | | |
| 2 | 3/19/2014 | 1. Build US Patent development environment<br>2. Build the spreadsheet | | |
| 3 | 5/19/2014 | 1. Test the spreadsheet with Ews | Added if then else on sheet 3 | Build and debug Ews to work with spreadsheet |
| 4 | 5/19/2014 | 1. Continue to test | | |
| 5 | 4/23/2015 | 1. Document sentence processing as part of specification. | | |
| | | | | |
| | | | | |

FIG. 14

Sentence Item # 16 in FIG. 29 tests cells to see if the Abstract wording has been completed.

| H | A | B | I |
|---|---|---|---|
| show the US Patent Title wording used in spreadsheet processing 4/10/2014ProvisionalPatent Application. let me know if the Abstract wording has been completed "IfThenElse*Sheet1*Row18 *ColB*Row98*ColB*Row18* ColH*Row18*Col*Spreadsheet. ← 16 | Abstract% in Sheet1 Row18 ColB means Abstract wording has been completed - its not complete since the wordsymbol: Abstract% is not in this adjacent cell. | ← Blank cell | get the provisional US Patent status sheet for the completion of the Abstract wording 3/3/2014USPatentApplicatio n. show the message that the Abstract has not been completed 5/10/2014USPTO. get the actual Abstract wording document 5/10/2014USPTOUSPatentA pplication. let me know if the Drawings have been completed "IfThenElse*Sheet1*Row19*C olB*Row99*ColB*Row19*Col H*Row19*Col*Spreadsheet? ← 17 ← 18 ← 19 ← 20 |
| 17 | 18 | Sheet 1 | 18  Sheet 1 |

| A | B |
|---|---|
| | Abstract% |
| 98 | |

Sheet 1

FIG. 15

This is a notes page for the Abstract.

Notes:

FIG. 16

User Status (sentence number 17 in (FIG. 29)) is read from a cell in the spreadsheet and displays this document:

Status sheet for completion of Abstract wording must be less than 150 words

| Item # | Date | Abstract | Changes Made | Comment |
|---|---|---|---|---|
| 1 | 3/4/2014 | Initial Abstract done | Pending | Needs modification to define conditional methods |
| 2 | 4/25/2015 | Needs a new review | Pending | |
| | | | | |
| | | | | |
| | | | | |
| | | | | |
| | | | | |

FIG. 17

Tell what has been done to date by the said applications:

1. USPTO web site reviewed.
2. Completed formatting of Drawings.
3. Work on getting USPTO password.
4. Other...

FIG. 18

User Message (Sentence Item # 18 in (FIG. 29)) is read from a cell in the spreadsheet and displays this document)

The Abstract has not been completed. Note, even though this message says that the Abstract is not complete, it is in fact complete as this is an example US Patent application meaning to show interim results - Refer to FIG. 14 to see why this message is displayed.

FIG. 19

A sentence stored in a spreadsheet cell and read by the said application compares Sheet1 Row19 ColB with Sheet1 Row99 ColB and tests to see if the Drawings have been completed.

| | A | B |
|---|---|---|
| | | SpecReqs%Title%Abstract%SupportNotDone% |
| 95 | | SpecReqs% |
| 96 | | Title%  14 |
| 97 | | Abstract%  16 |
| 98 | | Drawings%  20 |
| 99 | | |

The letters: Drawings% inserted in this cell by a English (Natural) language sentence.

| | A | B |
|---|---|---|
| | Abstract% means Abstract wording has been completed. | |
| 18 | Drawings% means all Drawings have been completed. | No value in this cell |
| 19 | | |

Sheet1

FIG. 20

The said application starts reading sentences stored in cell Row19 ColI (Column I) – see sentence Item # 20 in FIG. 29.

| I | J |
|---|---|
| get the provisional US Patent status sheet for the completion ← 17 of the Abstract wording 3/3/2014USPatentApplication. show the message that the Abstract has not been ← 18 completed 5/10/2014USPTO. get the actual Abstract wording document 5/10/2014USPTOUSPatentApplic ← 19 ation. let me know if the Drawings have been completed "IfThenElse*Sheet1*Row19*ColB ← 20 *Row99*ColB*Row19*ColH*Row 19*ColI*Spreadsheet? | show me all completed drawings for the submission of ← 21 the Provisional US Patent application 3/3/2014AllDrawings*ReadSente ncesExcel*Sheet2*Row21*ColC* Datum*XLSX. Show the message that the drawings ← 25 have not been completed 8/29/2014USPTODrawingMessa geStatus. let me know if the specification has been completed "IfThenElse*Sheet1*Row20*ColB ← 26 *Row100*ColB*Row20*ColH*Ro w20*ColI*Spreadsheet. |
| 18 | 19 |

Sheet 1

FIG. 21

The said application starts reading sentences in Sheet2 Row21 ColC and puts a date in cell Sheet2 Row21 ColE – see below:

| I | J | C | D |
|---|---|---|---|
| show me all completed drawings for the submission of the Provisional US Patent application ← 21 | | Put the date in the designated cell to show when US Patent Figures were reviewed *PutDateInExcel*Sheet2*Row2 1*ColE*XLSX? ← 22 | |
| 3/3/2014AllDrawings*ReadSente ncesExcel*Sheet2*Row21*ColC* Datum*XLSX. Show the message that the drawings have not been completed ← 25 | | show all drawings FIGs as attachments to one sentence 9/1/2014DrawFigures. open MS Word version FIG 1 architectural diagram and the Conditional Sentence FIG 2 diagram ← 23 | |
| 8/29/2014USPTODrawingMessa geStatus. let me know if the specification has been completed | | 2/28/2014USPatentApplication SpreadSheetSymWords. ← 24 | |
| *IfThenElse*Sheet1*Row20*ColB *Row100*ColB*Row20*ColH*Ro w20*ColI*Spreadsheet. ← 26 | | | |
| Sheet1 | | | 21 |
| | | | 1/14/2016 15:40 |
| | | | 21  Sheet 2 |

Sheet2

FIG. 22

A user message (sentence Item # 25 in FIG. 29) is read from a cell in the spreadsheet and displays this document and the message on the computer screen:

The Drawings have not been completed.

User Notes:

1

Application #: 15469848

FIG. 23

User Message (Sentence Item # 28 - see FIG. 29) is read from a cell in the spreadsheet and displays this message.

The Specification (Detailed Description) has not been completed.

User Notes:

User Message (sentence Item # 33 – see FIG. 29) is read from a cell in the spreadsheet and displays this document) regarding the status for the completion of the claims.

The Claims document has not been completed.

User Notes:

1. none

FIG. 26

Per sentence Item # 36 (In the Sentence Map / Listing (FIG. 29)) Sheet3 Row26 ColB is not equal to Sheet3 Row26 ColC as shown in their respective cells below causing Sheet3 Row19 ColF to be read in FIG. 27.

| | B | C | D |
|---|---|---|---|
| 24 | Collected concatenated cell data using the Reference column (this column) for support documents from Row 6 – 17 Column C is shown (Below) and is done with a collect sentence. | Collected concatenated cell data using the Actual column for current support documents from Row 6 – 17 Column D is shown (Below) and is done with a collect sentence. | |
| 25 | | | |
| 26 | %ADMIN%COMPLET% 1FigsFormated%2Same TextFonts%3FileFmts% 4PasswdDone%12Of12 Done%. ← 4 | %ADMIN%COMPLET% 1FigsFormated%2Same TextFonts%3FileFmts% 4PasswdNotDone%XO ff12NotDone%. ← 3 | |
| 27 | | | |
| 28 | Sentence 4 puts the value in this cell. | Sentence 3 puts the value in this cell. | |
| 29 | | | |

Sheet3

FIG. 27

Status of detailed support questions. Sentence Item # 34 (see Sentence Map / Listing FIG. 29) determines that the support questions have not been completed and, therefore, reads cell Sheet3 Row19 ColF.

| | E | F | G |
|---|---|---|---|
| | Then | Else | |
| 18 | Show the provisional US Patent status sheet for the completion of the USPTO Support document processes 3/3/2014USPatentAppli cation. Tell the spreadsheet that the Support Documents and assessment have been completed "PutDataInExcel"Sheet1"Row 22"ColB"SupportComplete"/.XLSX? | Show the provisional US Patent status sheet for the completion of the USPTO Support document processes 3/3/2014USPatentApplicatio n. show the message that the US Patent administrative support documents have not been completed 5/10/2014USPTO. Agenttest the US Provisional Patent has not been completed 5/15/2014. Agenttest get the status for funding and approval from Agent test KeySentence"GetSingleCell DataCatColuLet"Sheet1"Row 35"Row43"Row44"ColB"Datum"SolSentX. | ← 35<br><br>← 36<br><br>← 37<br><br>← 38<br><br>sentence Item # 39 in the ewstestexpert spreadsheet |
| 19 | | | |
| 20 | | Sheet3 | |

FIG. 28

A User Message (sentence Item # 31 – see sentence Map / Listing FIG. 29) is read from myuspatentexpert (My US Patent Expert) application SQL database and displays this document)

The said application is displaying a claims notes page which is not being sent to the USPTO. Claims are shown by entering the question below at the said application input or by selecting the below question from the SQL drop down menu. Note, that the below question can be inserted in any spreadsheet cell and shown automatically as the spreadsheet(s) process there English language sentences:

What is claimed 2/24/2016SendingSendClaims?

FIG. 29A (The Sentence Map/Listing) is a Natural language listing of all English language sentences used in the processing of spreadsheet cells by the US Patent application example.

| Item #s | | |
|---|---|---|
| | In all, 48 English language sentences and words are processed (read and written to) within cells of the two spreadsheets used in this US Patent application example. In this case, once a software agent name is defined automatically on startup each said application will use that agent name to communicate with text between applications. In this exercise, sending the sentence: (Agentpatent show me the current specification.) form another said application will cause the myuspatentexpert (My US Patent Expert) application to show the US Patent Specification (detailed description) document to the user on the computer desktop. If the before mentioned sentence was stored in a spreadsheet cell and that cell was read by the said application using some form of cell spreadsheet logic, this same US Patent application specification document would be displayed on the computer screen.<br><br>On application startup, the said application receives input text (via the keyboard from a user, from a software text message, from a cell in the spreadsheet, or from the selection of a sentence from the drop down SQL menu). The two said applications start processing the English language sentences in the spreadsheet cells by entering the letters: key10 at the input of the said myuspatentexpert (My US Patent Expert) application. These letters then find the same letters in a stored sentence in the SQL database and since these letters are unique to all stored sentences in the SQL database, the sentence is automatically read by the said application which then examines the symbol word that then tells the said application to go to the attached spreadsheet and read the cell defined by its symbol word. The read sentence with its symbol word is: | Introduction to Natural language code listing used to process spreadsheet cells using Natural language (Item #s 0 through 47 – a total of 48 English language sentences) below - All sentence processing to read, write, change data, make decisions, execute computer programs to show documents or the execution of other computer resources is all done by using Natural language to read, write, and make decisions using spreadsheet cells. |
| 0A | Read master sentence to show all US Patent Application work keykey10*ReadSentencesExcel*Sheet2*Row12*ColA*Datum*XLSX.<br><br>The symbol word in this sentence is:<br><br>keykey10*ReadSentencesExcel*Sheet2*Row12*ColA*Datum*XLSX.<br><br>This symbol word directs the said application to go to the cell in the spreadsheet at location: Sheet2*Row12*ColA and to start reading the sentences in this cell. This cell | |

FIG. 29B (The Sentence Map/Listing) is a Natural language listing of all English language sentences used in the processing of spreadsheet cells by the US Patent application example.

| | |
|---|---|
| | sentence and word data is: |
| 0B | turn on the switch to store processed sentences.  key7. key3. |
| | The first sentence is: (turn on the switch to store processed sentences.) which tells the said application (the myuspatentexpert (My US Patent Expert) application) to record each read sentence associated with letters: key7. and key3.  The period characters are important because they tell the said application to process each group of letters separately.  The next set of letters to be processed are the (key7.) letters.  The key7 letters are unique to all sentences in the SQL database (except for one) and  cause this sentence to automatically execute (does not have to be selected from the SQL database drop down menu with a mouse)  and begin processing all of the sentences identified by this sentence's symbol word which identifies a cell in the spreadsheet that contains the next group of sentences to be read.   This sentence is shown as sentence Item # 1 below and processes all sentences up to and including the sentence in Item # 11 below.  At this point, the (key7.) input letters and its associated sentences are finished reading its sentences in the various cells in the spreadsheet and then the said application starts reading the next (key3.) sentence (see item 0B above).  The (key3.) sentence is unique to one stored sentence (like the key7 sentence) in the SQL database and automatically reads other sentences in cells associated with the key3 sentence   In all, and by the jumping to various cells, the key3 letters associated with a sentence in the SQL database and spreadsheet cells  will wind up causing the reading of sentence Item # 13 to sentence Item # 47 in the  myuspatentexpert (My US Patent Expert) and the ewstestexpert (Ews Test Expert) applications.  The key7 sentences begins by reading its sentence (has the letters key7 in it) as shown below as sentence Item # 1 |

FIG. 29C (The Sentence Map/Listing) is a Natural language listing of all English language sentences used in the processing of spreadsheet cells by the US Patent application example.

| 1 | Analyze column data to determine completion of Provisional Patent items keyKey7*ReadSentencesExcel*Sheet2*Row27*ColC*Datum*XLXS. | This sentence is in the SQL db and makes the said application read sentence 1 through 11 in the various spreadsheet cells |
|---|---|---|
| | Comment(s): | |
| 1A | The key7 letters and its associated sentence, like the key3 letters and its associated sentence (where the key3 sentence is the second of the two read (key3. key7. letter groups)), is connected to other sentences within the spreadsheet using the sentence's symbol words. Sentences that are connected to the key3 sentence, again like the key7 sentence, can use solution sentences to concatenate a column of letters, and based on the concatenated column values, then decides which cells to read or just based on two cell values (using an If Then Else sentence types can determine which of two cells the said application will read – this causes the said application to read spreadsheet cell sentences which then causes the said application to go to different cell locations based on the cell data read by the various sentences being processed by the said applications. A sentence read from a particular cell could tell the said application to go to a different spreadsheet on a local computer or to a different spreadsheet on another computer on the Internet. There, that spreadsheet could process its sentences, make some decisions and send a message back to the originating spreadsheet that may change the way previous decisions were made within that spreadsheet. Read cells generally contain English language sentences, words, synonyms, and symbol words). In all, the key3 sentence, like the key7 sentence comprises the steps of reading sentences starting at Item # 12 through sentences ending at sentence Item # 47 below. | |

FIG. 29D (The Sentence Map/Listing) is a Natural language listing of all English language sentences used in the processing of spreadsheet cells by the US Patent application example.

| | | |
|---|---|---|
| | This sentence listing (Item # 0 through Item # 47 – this document) are all the sentences being used to process this US Patent application example. The example shows that three items have been completed (even though all must have been completed to send the US Patent application to the USPTO). For demonstration purposes the components completed are: 1) SpecReqs – going to the USPTO and viewing what has to be submitted for the filing a US Provisional Patent application; 2) Title wording has been completed and; 3) notification that support documents have not been completed i.e.: getting a password for electronic filing. The second sentence identified as sentence Item # 2 below was caused by the actions of the first (sentence Item # 1) above and its reading of cells within the spreadsheet(s) and the logic to read cells that contain English language sentences throughout all spreadsheets by the said application(s). Two applications are running on the desktop and communicate with each other using TCP/IP software agent names. The said application can communicate using software agent names that are identified as the first word in a sentence that is sent to other spreadsheet cells in other spreadsheets. The software agent names are configured at application startup and are used to communicate text messages to other spreadsheet cells on the same desktop computer or on different computers on the Internet using the TCP/IP protocol. Note, that various FIGURES contain numbers. These numbers correspond to the sentence Item #s displayed at the left margin of this listing. Whole sentence Item #s are the actual sentences contained in the spreadsheet cells and item #s other than whole numbers in the first column (to the left) represent comments to the sentences. The key7 sentence starts reading the sentences it finds in spreadsheet cells beginning with sentence Item # 1 above and then proceeds to sentence Item # 2 below followed by the rest of the sentences that direct the said application to read, write, make decisions, and execute computer resources using the read cells in the two spreadsheets that comprise this listing. | Writing data to cells. |
| 2 | Put support administrative data for both reference and actual columns as noted in Sheet3 keykey6*ReadSentencesExcel*Sheet2*Row27*Coll*Datum*XLXS. | |

FIG. 29E (The Sentence Map/Listing) is a Natural language listing of all English language sentences used in the processing of spreadsheet cells by the US Patent application example.

| | Comment(s): | | Collecting and writing data to cells. | |
|---|---|---|---|---|
| 2A | The above sentence reads spreadsheet cell sentences in: Item # 3 and Item # 4 below from a cell identified by its symbol word as: *Sheet2*Row27*ColI* where ColI = (Column I). Sentence data from Item # 3 and Item # 4 will be used by other downstream sentences to process spreadsheets and their cells in this listing and will decide what has been done to complete US Patent filing documents. | | | |
| 3 | Collect actual data from completed administrative components and put data in cells *WriteCatToCell*Sheet3*Row6*Row17*ColD*Sheet1*Row26*ColC*Datum. | | | |
| | Comment(s): | | | |
| 3A | Sentence Item # 3 above concatenates the column of data from Sheet3 Row6 to Row17 ColD (See FIG. 3 – Number 3) and puts the result in Sheet3 Row26 ColC (See FIG. 26 – Number 3 – Actual Column). This data is known as the actual data (the data that changes when a user inputs a sentence that puts a value in a cell to indicate what patent support items were completed in the spreadsheet column as shown in FIG. 3 – Column D. In this case, a user inputs a sentence that puts the value of: %4PasswdNotDone in cell location Sheet3 Row9 ColD shown in FIG. 3. When the sentence in Item # 3 above concatenates its column, the value becomes: | | | |
| 3B | %ADMIN%COMPLET%1FigsFormatted%2SameTextFonts%3FileFmts%4PasswdNotDone%XOff12NotDone%. | | | |
| 3C | As noted, the value of: %4PasswdNotDone (See FIG. 3 Sheet3 Row9 ColD – is put in this cell by an English language sentence or manually put in the cell when the | | | |

FIG. 29F (The Sentence Map/Listing) is a Natural language listing of all English language sentences used in the processing of spreadsheet cells by the US Patent application example.

| | |
|---|---|
| 3D | spreadsheet is opened by a user to insert this cell data). This value is incorporated into the concatenated value shown above in Item # 3B. |
| | This is not a sum as would be the case if, for example, if cell 1 contained a 4 and cell 2 contained a 5. Then the sum would be 9. If these cells were concatenated the value would be: 45 and not 9 -- The said application uses the concatenated value of 45. The spreadsheets are not being used in the traditional sense of number computations but rather as a device that holds English language text where sentences can be read and compared to then make decisions for users. |
| | The sentence that puts the value of: %4PasswdNotDone% into its cell is simply registering the fact, by the user of the said application, that a password has not been received from the USPTO. The percent symbol in the concatenated value in 3B (above) helps users see the different word groups within the concatenated value as delimited by the % symbol -- see 3B above. |
| | Sentences Item # 3 and Item # 4 concatenate the Reference and Actual columns of data where the Reference column holds all the values to indicate what items need to be completed from an administrative point of view to complete a USPTO filing while the Actual concatenated column indicates what has actually been completed from an administrative point of view to complete all the administrative requirements (i.e.; read the USPTO web site, get a password, etc.) needed to file a USPTO application. Other downstream sentences (Item # 34) in this listing will compare the concatenated values of the Reference and Actual columns using an If Then Else sentence to select one of two cells that will be read by the said application. If all the support items were complete, the Actual and Reference concatenated values would equal each other. Actual and Reference data is shown below. |
| | Actual: |

FIG. 29G (The Sentence Map/Listing) is a Natural language listing of all English language sentences used in the processing of spreadsheet cells by the US Patent application example.

| | | |
|---|---|---|
| 3E | %ADMIN%COMPLET%1FigsFormated%2SameTextFonts%3FileFmts%4PasswdNotDone%XOff12NotDone%.<br><br>Reference: | |
| 3F | %ADMIN%COMPLET%1FigsFormated%2SameTextFonts%3FileFmts%4PasswdDone%12Of12Done%<br><br>Since Item # 3E and 3F are not the same an (IF Then Else) sentence in (Item # 34) will note the difference in the Actual and Reference values and will then choose either the Then cell or the Else cell of this sentence's symbol word. The (Then) and (Else) cells contain English language sentences and since the Actual and Reference values are not the same, the said application will use the sentences in the Else cell to start reading its sentences – see the (IF Then Else) sentence in (Item # 34) below. FIG. 26 is being sent to the USPTO. | |
| 4 | Collect reference data for all administrative components and put data in cell *WriteCatToCell*Sheet3*Row6*Row17*ColC*Sheet1*Row26*ColB*Datum. | Collecting and writing data to cells. |
| 4A | Comment(s): | |
| | The said application is going to concatenate the reference column (along with the actual column as done by sentence in Item # 3 above). The reference column is concatenated by the symbol word shown in sentence Item # 4 above namely by making the said application process this symbol word in the sentence of Item # 4. The symbol word is: | |

FIG. 29H (The Sentence Map/Listing) is a Natural language listing of all English language sentences used in the processing of spreadsheet cells by the US Patent application example.

| | |
|---|---|
| 4B | *WriteCatToCell*Sheet3*Row6*Row17*ColC*Sheet1*Row26*ColB*Datum.<br><br>This results in the following data being stored at location: *Sheet3*Row26*ColB* and is:<br><br>%ADMIN%COMPLET%1FigsFormated%2SameTextFonts%3FileFmts%4PasswdDone%12Of12Done%<br><br>Letters concatenated are shown in FIG. 3 for Sheet3 Row6 to Row17 Column C and the concatenation is shown in FIG. 26 Number 4. Both Figures are being sent to the USPTO. |
| 5 | check for reference and actual support items (i.e.: password) completed for the Provisional Patent application<br>*IfThenElse*Sheet1*Row26*ColB*Row26*ColC*Row22*ColK*Row22*ColK*Spreadsheet. |
| 5A | Comment(s):<br><br>Sentence in Item # 5 above compares the data in cell Sheet1 Row26 ColB to Sheet1 Row26 ColC. Remembering that Sheet1 Row26 ColB and Sheet1 Row26 ColC had already been concatenated by sentence Item # 3 and 4 (which will be used for other purposes by sentence Item # 34 below). Since they are not equal, the second (Sheet1 Row22 ColK in the symbol word of sentence Item # 5 above) is selected to read data in this cell. The second Sheet1 Row22 ColK is known as the (Else part – when data in not equal) and the first Sheet1 Row22 ColK is known as the (Then) part of this sentence when the data in cells  Sheet1*Row26*ColB*Row26*ColC are equal - See FIG. 4 Number 5. The said application designer has chosen to make the said application always read (the Else part when data is not equal) even if the data was equal by forcing the said application to read the data in the same cell namely Sheet1 Row22 ColK - See FIG. 26 |

FIG. 29I (The Sentence Map/Listing) is a Natural language listing of all English language sentences used in the processing of spreadsheet cells by the US Patent application example.

| | |
|---|---|
| 5 | Numbers 3 and 4. Note also, that when sentence Item # 5 reads the sentences in Sheet1 Row22 ColK (see FIG. 4 Number 6) that this sentence actually puts the value of: SupportNotComplete% in cell: Sheet1 Row22 ColB as shown in FIG. 4. FIG. 4 and FIG. 26 are being sent to the USPTO. | |
| 6 | Tell the spreadsheet that the Support Documents have not been completed *PutDataInExcel*Sheet1*Row22*ColB*SupportNotComplete%*XLSX. | |
| 6A | Comment(s):<br>Since sentence Item # 5 (above) determined that when sentence Item # 3 and 4 above were read they did not put the same information in their respective cells (regarding support data – password etc.) as determined by sentence Item # 5. When sentence item # 5 is read, the cell data pointed to by the second part of its symbol word (namely, Sheet1 Row22 ColK – The Else part of this IF Then Else sentence) included reading the sentence as shown in sentence Item # 6 above. This sentence (sentence Item 6 above) puts the value of: SupportNotComplete% in a cell (Sheet1 Row22 ColB) (see FIG. 4) and will be used by the downstream sentence of Item # 9 below which is a conditional solution sentence. Conditional Solution sentences when read concatenate a column of data and makes decisions based on this concatenated cell data. | |
| 7 | Collect reference data for all USPTO components and put data in cell *WriteCatToCell*Sheet1*Row16*Row25*ColC*Sheet1*Row67*ColB*Datum. | Collect and write data to cells. |

FIG. 29J (The Sentence Map/Listing) is a Natural language listing of all English language sentences used in the processing of spreadsheet cells by the US Patent application example.

| | Comment(s): | |
|---|---|---|
| 7A | The sentence in Item # 7 above uses the WriteCatToCell command to concatenate the column of data from Sheet1 Row16 to Row26 ColC and places that data in Sheet1 Row67 ColB resulting in this cell containing the characters (data) as shown in 7B: | |
| 7B | SpecReqs%Title%Abstract%Drawings%Specification%Claims%SupportComplete% as shown in FIG. 5. This data when written to Sheet1 Row67 ColB by the sentence in Item # 7 above is the reference data and will be compared against the actual data collected by sentence in Item # 8 below. If reference and actual data were equal it would mean that the US Patent application is complete and the spreadsheet(s) would reflect this fact in the reading of selected cell sentences in the spreadsheet decision making process. | |
| 8 | Collect actual data from completed SpecReqs Title and administrative components and put data in cell *WriteCatToCell*Sheet1*Row16*Row25*ColB*Sheet1*Row66*ColB*Datum. | Collect and write data to cells. |
| | Comment(s): | |
| 8A | The sentence in Item # 8 above writes:<br>SpecReqs%Title%SupportNotComplete%<br>to cell Sheet1 Row66 ColB - See FIG. 5. This means that sentence Item # 7A and Item # 8A above are not equal and the patent application is not complete – only completed are the SpecReqs% (viewed the USPTO web site for USPTO requirements) and the completed Title wording. Note, that in 8A where SupportNotComplete% above is part of the characters SpecReqs%Title% and was concatenated by sentence Item # 8 and | |

FIG. 29K (The Sentence Map/Listing) is a Natural language listing of all English language sentences used in the processing of spreadsheet cells by the US Patent application example.

| | | | |
|---|---|---|---|
| | the IF Then Else sentence in Item # 5 above. Note, that the said application has noted that only two patent components are completed when, in fact, all are complete (to submit this US Patent application) but this was done for example only purposes to explain the processes of the said US Patent application example. | | |
| 9 | get the status for the Spreadsheet Provisional Patent documents completed to date KeyKey1Sentence*GetSingleCellDataCatColuLet*Sheet1*Row16*Row25*Row26*ColB*Datum*SolSentX. | Read a column of cells and make a decision based on the particular data in the column cells. | |
| 9A | Comment(s): The sentence in Item # 9 (above) is a conditional solution sentence. This sentence will analyze the spreadsheet column (in the myuspatentexpert (My US Patent Expert) application spreadsheet) to determine what documents have been completed to date for the filing a US Provisional Patent application example. It does this by concatenating column cell data using its symbol word with its spreadsheet directions using Sheet1 Row16 to Row25 in ColB as the range of cells to collect the concatenated data. The concatenated data is: SpecReqs%Title%SupportNotComplete% and will be used with sentence Item # 9 (above) and helper sentences to make a decision regarding this concatenated data representing US Patent application example items completed to date. Further, this same cell data will be used by sentence Item # 12 (an IF Then Else sentence) to do a separate comparison and make other decisions based on the: SpecReqs%Title%SupportNotComplete% concatenated data. | | |

FIG. 29L (The Sentence Map/Listing) is a Natural language listing of all English language sentences used in the processing of spreadsheet cells by the US Patent application example.

| | |
|---|---|
| 9B | The conditional solution sentence in Item # 9 above uses helper sentences stored in the myuspatentexpert (My US Patent Expert) application SQL database and the said application then works to match part of the data in the conditional solution sentence (sentence Item # 9) symbol's word (namely with Sheet1 Row26 in ColB) in each of the symbol words for each helper sentence shown in 9C, 9D, 9E, and 9F. Now, when sentence Item # 9 is read by the said application, the found concatenated value is: |
| 9C | SpecReqs%Title%SupportNotComplete% |
| | And each helper sentence uses further information that points to a cell that may have this same value as noted by helper sentence's symbol word data as in: Sheet1( (Row66*ColB), (Row68*ColB), and (Row69*ColB)). The last helper sentence (9G) has Sheet3 where it should have been Sheet1 to be considered as a helper sentence for this conditional solution sentence shown in sentence Item # 9 above which has Sheet1. The only helper sentence that matches 9C (along with its other data) is (9D) which points to Sheet1 Row66 ColB whose contents is: (SpecReqs%Title%SupportNotComplete%) – See FIG. 5. Once this helper sentence is identified by the said application, the said application then reads 9D's symbol word namely: (Read*Sheet1*Row17*ColF – See FIG. 6) where the said application starts reading sentences Item # 10 and 11 below. |
| 9D | Identify the message to report status of SpecReqs through Title and that Support documents are not complete helper*ReadSentencesIfExcelValue*Sheet1*Row26*ColB*Row66*ColB*Read*Sheet1*Row17*ColF*XLSXMsgGp1. |
| 9E | Identify the message to report status of SpecReqs through Abstract and that Support documents are not complete helper*ReadSentencesIfExcelValue*Sheet1*Row26*ColB*Row68*ColB*Read*Sheet1*Row18*ColF*XLSXMsgGp1. |

FIG. 29M (The Sentence Map/Listing) is a Natural language listing of all English language sentences used in the processing of spreadsheet cells by the US Patent application example.

| | | |
|---|---|---|
| 9F | Identify the message to report status of SpecReqs and that Support documents are not complete helper*ReadSentencesIfExcelValue*Sheet1*Row26*ColB*Row69*ColB*Read*Sheet1*Ro w16*ColF*XLSXMsgGp1. | |
| 9G | Identify the message to be used to report status of US Patent administrative components helper*ReadSentencesIfExcelValue*Sheet3*Row18*ColD*Row26*ColB*Read*Sheet3*Ro w19*ColF*XLSXMsgGp1. Both FIG. 5 and FIG. 6 are being sent to the USPTO. | This does not mean the US Patent detailed description but rather the Patent Specs at the USPTO web site. |
| 10 | show the Provisional US Patent status sheet for the completion of specification requirements and title wording 3/3/2014USPatentApplicationLessThan500CharsSeeTopOfSpecification. | |
| | Comment(s): | |
| 10A | The reading of sentence Item # 10 above by the said application causes a status sheet to be shown on the computer screen and is being sent to the USPTO as FIG. 7. | |
| 11 | agenttest let me know if funding has been approved for the spreadsheet Provisional Patent application. | Sentence Item # 11 and sentence Item # 38 have different words |
| 11.1 | let me know if funding has been approved for the spreadsheet Provisional Patent | |

FIG. 29N (The Sentence Map/Listing) is a Natural language listing of all English language sentences used in the processing of spreadsheet cells by the US Patent application example.

| | | |
|---|---|---|
| | application. | but perform the same function since their symbol words are the same. Sentence 11.1 is what appears at the ewstestexpert application. |
| | Which then matches the whole sentence stored at the ewstestexpert (Ews Test Expert) application SQL and spreadsheet databases which is: | |
| 11.2 | let me know if funding has been approved for the spreadsheet Provisional Patent application keySentence*GetSingleCellDataCatColuLet*Sheet1*Row35*Row43*Row44*ColB*Datum* SolSentX. | |
| | Comment(s): | |
| 11A | The above sentence in Item # 11 is sent from the myuspatentexpert (My US Patent Expert) application via software agent (agenttest) to the ewstestexpert (Ews Text Expert) application. Both applications are running on the same computer and have the same functionality, but with different data in their text, SQL, and spreadsheet databases. The said applications can be placed on various computers on local and wide area networks using the TCP-IP protocol. | |
| 11B | The agenttest software agent name is removed by the myuspatentexpert (My US Patent Expert) application and becomes the sentence shown in Item # 11.1 above when received by the ewstestexpert (Ews Test Expert) application). Next, the sentence in Item # 11.1 finds the stored sentence shown in Item # 11.2 in the ewstestexpert (Ews Test Expert) application SQL database and the said application then starts reading this sentence's symbol word as in:<br><br>(keySentence*GetSingleCellDataCatColuLet*Sheet1*Row35*Row43*Row44*ColB*Datum *SolSentX) | |

FIG. 29O (The Sentence Map/Listing) is a Natural language listing of all English language sentences used in the processing of spreadsheet cells by the US Patent application example.

Using FIG. 8, the above solution sentence (Item # 11.2) concatenates Sheet1 from Row35 to Row43 ColB. (Note, there is no data in cells Sheet1 from Row38 to Row43 ColB). This concatenated value is: Funded%Dept23Approved%. Next, the solution sentence in Item # 11.2 looks at each helper sentence stored in the SQL database associated with the agenttest (ewstestexpert (Ews Test Expert) application) and shown below as: Item # 11C and Item # 11D. The conditional solution sentence in item # 11.2 then selects the helper sentence in Item # 11C (Sheet1 Row36 ColE) since this cell value matches the concatenated value found by the conditional solution sentence (Funded%Dept23Approved%) in Item # 11.2 (above) for the helper sentences stored in the agenttest (ewstestexpert (Ews Test Expert)) application SQL database. Further, sentence Item # 11C below (the helper sentence) is next processed to select its solution cell defined as Sheet1 Row36 ColF. The said application then reads the stored sentences in this cell (defined again as: Sheet1 Row36 ColF) and shown in FIG. 8. When the said application reads the sentences stored in the agenttest (ewstestexpert (Ews Test Expert) application) spreadsheet cell, at Sheet1 Row36 ColF, the said application sends two text messages back to the agentpatent (myuspatentexpert (My US Patent Expert) application). It should be noted that prior to this point, the agentpatent (myuspatentexpert (My US Patent Expert) application) has a number of sentences that are being processed and when the agenttest (ewstestexpert (Ews Test Expert) application sends back its two messages they must wait for all pending messages (sentences) that are being processed by the agentpatent (myuspatentexpert (My US Patent Expert) application) which includes some 20 or so sentences. In FIG. 8, both sentence Item # 11 (this sentence) and 42 (which is a different sentence with the same symbol word as sentence Item 11) are read and show up as sentences Item # 43 and 44 (in this document and read by the ewstestexpert (Ews Test Expert) application (below) and after being sent, show up in the myuspatentexpert (My US Patent Expert) application as sentence Items 40 and 41 in this Sentence Map / Listing (FIG. 29) – also refer to FIG. 8.

Related symbol words are in gray

FIG. 29P (The Sentence Map/Listing) is a Natural language listing of all English language sentences used in the processing of spreadsheet cells by the US Patent application example.

| | | |
|---|---|---|
| 11C | Identify the message for approved funding and review after requirements review and Title completion<br>helperLetterMethod*ReadSentencesIfExcelValue*Sheet1*Row44*ColB*Row36*ColE*Read*Sheet1*Row36*ColF*XLSXMsgGp1. | related to the conditional solution sentence in sentence Item # 11.2 above. |
| 11D | Identify the message for approved funding after requirements and Title completion but USPTO project not approved<br>helperLetterMethod*ReadSentencesIfExcelValue*Sheet1*Row44*ColB*Row35*ColE*Read*Sheet1*Row35*ColF*XLSXMsgGp1.<br><br>Note, the sentence Item # 11 (above) and Item # 38 (below) process the same cells in the spreadsheet located in the ewstestexpert (Ews Test Expert) application. – the sentences use different words but use the same symbol word. FIG. 8 is being sent to the USPTO. | |
| 12 | start at SpecReqs to Title wording to Support documents to see Provisional Patent application items completed<br>KeyKey3Sentence*IfThenElse*Sheet1*Row66*ColB*Row67*ColB*Row67*ColH*Row16*Coll*Spreadsheet. | Starts key3 sentence (part of key10 input) – see sentence Item 0A above |
| 12A | Comment(s): | |
| | See FIG. 10 – SQL database showing the Key3 sentence (with the underlined letters Key3 in FIG. 10) for sentence Item # 12 above. Sentences in Item # 7 and Item # 8 (above) collected column data and put that data into Sheet1 Row66 ColB and Sheet1 Row67 ColB – see FIG. 11. If the data was the same in these two cells (This is an IF Then Else sentence) then the said application would read the sentences in Sheet1 Row16 ColH, otherwise the said application will read the sentences in Sheet1 Row16 Coll (Column I). The data in the above cell locations are not the same (meaning that if all US | |

FIG. 29Q (The Sentence Map/Listing) is a Natural language listing of all English language sentences used in the processing of spreadsheet cells by the US Patent application example.

| | | | |
|---|---|---|---|
| | (Column I). The data in the above cell locations are not the same (meaning that if all US Patent components were complete, Sheet1 Row66 ColB would equal Sheet1 Row67 CoB) where Sheet1 Row67 ColB is the reference cell – all US Patent activities are done when Sheet1 Row66 ColB equals the reference cell - Since the values are not the same, the said application starts reading the sentences stored at Sheet1 Row16 Coll (Column I - the Else Part) – see FIG. 11 (sentences 13 and 14). The said application reads these sentences as shown in sentence Item # 13 and sentence Item # 14 below. Note that sentence Item # 12 is not in a spreadsheet cell but rather in the SQL database - FIG. 10 and FIG. 11 are being sent to the USPTO. Further, the starting input (see sentence item # 0B above) The (Key7.) has finished reading all sentences associated with these letters and when the (Key3.) sentence starts processing (using its stored sentence in the SQL database), the sentence in Item # 12 above is read and starts processing all the (Key3) sentences. | | |
| 13 | show what has been prepared to write the US Provisional Patent Application 3/3/2014USPatentApplicationLessStartUpMode. | User document shown on computer desktop | |
| 13A | Comment(s): This is a status sheet and is shown on the computer screen and sent to the USPTO as FIG. 12. | | |
| 14 | let me know if the Title wording has been completed *IfThenElse*Sheet1*Row17*ColB*Row97*ColB*Row17*ColH*Row17*ColI*Spreadsheet. | | decide which cells to read |

FIG. 29R (The Sentence Map/Listing) is a Natural language listing of all English language sentences used in the processing of spreadsheet cells by the US Patent application example.

| | | | |
|---|---|---|---|
| | Comment(s): | | User document shown on computer screen |
| 14A | As shown in Item # 14 (above), this sentence is stored in a cell in the spreadsheet (also stored in the SQL database) and was selected to be processed by the said application when it read sentence Item # 12 above. Sentence Item # 14 above works to determine if the Title wording has been completed by testing the contents of cell Sheet1 Row17 ColB - the contents of which is: Title% that was either put there by a user opening the spreadsheet and placing this value in the after mentioned cell or put there by an English language sentence sent to the spreadsheet from the input or from the SQL drop down menu sentence selection or sent from a software agent text message perhaps from the decision made by another spreadsheet. Sentence Item # 14 then compares the contents of two cells namely Sheet1 Row17 ColB to Sheet1 Row97 ColB where the Title% value was placed in this cell by one of several methods as previously mentioned to indicate that when these two cell values match (Sheet1 Row17 ColB and Sheet1 Row97 ColB) the If Then Else sentence in Item # 14 will choose the Then component of this sentence which is the cell contents as indicated by: Sheet1Row17 ColH. — See FIG. 13. This Figure is being sent to the USPTO. | | |
| 15 | show the US Patent Title wording used in spreadsheet processing 4/10/2014ProvisionalPatentApplication. | | |
| | Comment(s): | | |
| 15A | When this sentence is read by the said application, the said application opens a Title wording status document showing a change history of Title wording changes made to the Title wording — This document is displayed on computer screen and is being sent to the USPTO. | | |

FIG. 29S (The Sentence Map/Listing) is a Natural language listing of all English language sentences used in the processing of spreadsheet cells by the US Patent application example.

| 16 | let me know if the Abstract wording has been completed *IfThenElse*Sheet1*Row18*ColB*Row98*ColB*Row18*ColH*Row18*ColI*Spreadsheet. | decide which cells to read based on cell data. |
|---|---|---|
| 16A | Comment(s): From the above sentence where Sheet1 is inferred for all cell operations in this sentence, the contents of the cell location Row18 ColB compares to cell Row98 ColB. If they are equal the said application reads the sentences stored in cell location Row18 ColH otherwise the said application reads the sentences in cell location Row18 ColI (Column I). For sentence item # 16 above, this is another If Then Else sentence that will test cell values to see if the Abstract wording has been completed. It does this by using the steps to test the cell contents identified as: Sheet1 Row18 ColB against cell Sheet1 Row98 ColB. See FIG. 14 - Sheet1 Row18 ColB is empty (this means the user did not send this cell a sentence that would have put the value of: Abstract% (in what is known as the Actual cell) had the Abstract wording been completed. Instead, it's not complete. Cell Sheet1 Row98 ColB contains the value of: Abstract% (known as the Reference cell) so when the two before mentioned cells are compared: Sheet1 Row18 ColB to Sheet1 Row98 ColB, one contains a blank value and the other contains the letters: Abstract%. The sentence in Item # 16 above knowing that these cells are not equal chooses the Else part of this sentence which is: Sheet1 (inferred) Row18 ColI (Column I). This cell contains the sentences shown below as: Item # 17, Item # 18, Item # 19, and Item # 20 – see FIG. 14. It should be noted that all sentence Item #s not containing a letter after the number i.e.: Item # 20 vs. Item # 20A can be pasted into the said application and executed to do whatever is meant by the wording in the stored sentence from wherever it is stored (Text, SQL, or Spreadsheet) databases or sentences can be sent to another said application running on a local or wide area network if the pasted sentence has an agent name – i.e.: agentpatent show me the date that the drawings were read.. FIG. 14 is | |

FIG. 29T (The Sentence Map/Listing) is a Natural language listing of all English language sentences used in the processing of spreadsheet cells by the US Patent application example.

| | | |
|---|---|---|
| | being sent to the USPTO. | |
| 17 | get the provisional US Patent status sheet for the completion of the Abstract wording 3/3/2014USPatentApplication. | Shown on computer screen |
| 17A | Comment(s): | |
| | When this sentence is read by the said application and displayed on the computer screen it shows what has been done to write the Abstract wording noting changes and dates. This document is displayed on the computer screen and is being sent to the USPTO as FIG. 16. Also note, but not shown are other documents that appear with sentence Item # 17 (above) that give users additional information on writing the Abstract. Also attached to this sentence is an Abstract Notes page as shown in FIG. 15. | |
| 18 | show the message that the Abstract has not been completed 5/10/2014USPTO. | Shown on computer screen |
| 18A | Comment(s): | |
| | When this sentence is read in a cell by the said application and displayed on the computer screen it shows a message that the Abstract wording has not been completed. This document is displayed on the computer screen and sent to the USPTO as FIG. 18. A document showing what has been done to date is shown as FIG. 17. | |
| 19 | get the actual Abstract wording document 5/10/2014USPTOUSPatentApplication. | Shown on |

FIG. 29U (The Sentence Map/Listing) is a Natural language listing of all English language sentences used in the processing of spreadsheet cells by the US Patent application example.

| | | computer screen | |
|---|---|---|---|
| 19A | Comment(s): When this sentence is read from a spreadsheet (sentence Item # 16 above) the said application reads sentence Item # 19 as one of 4 sentences in this cell as seen in FIG.14. The myuspatentexpert (My US Patent Expert) then displays the actual Abstract document on the computer screen – This Abstract document is being sent to the USPTO. | | |
| 20 | let me know if the Drawings have been completed *IfThenElse*Sheet1*Row19*ColB*Row99*ColB*Row19*ColH*Row19*ColI*Spreadsheet. | Making a decision to show all drawings.. | |
| 20A | Comment(s): The sentence being read from the spreadsheet (Item # 20) above looks for a value at Sheet1 Row19 ColB (which has no value inserted in this cell) – see FIG. 19.  The sentence shown in Item # 20 above then works to compare the data in Sheet1 Row19 ColB (which has no data) to the contents of cell Sheet1 (where Sheet1 is inferred for all cell operations in sentence Item # 20) Row99 ColB. This cell (shown in FIG. 19 - number 20 in the Figure) and contains the value of: Drawings%.  Since the comparison fails, the sentence of Item # 20 chooses to read the Else part of the sentence (Item # 20 above) where:  the Then Else is part of the symbol word is:  (Then = Row19*ColH)  and  (Else = Row19*ColI).  The said application starts reading the sentence (based on the before mentioned  cell comparison) which is shown in FIG. 20 and whose contents (to be read) is from cell:  Sheet1 Row19 ColI (Column I) where the next sentence to be processed is shown below in Item # 21. FIG. 19 and FIG. 20 is being sent to USPTO. | | |

FIG. 29V (The Sentence Map/Listing) is a Natural language listing of all English language sentences used in the processing of spreadsheet cells by the US Patent application example.

| # | Sentence / Comment | Code | Description |
|---|---|---|---|
| 21 | show me all completed drawings for the submission of the Provisional US Patent application | 3/3/2014AllDrawings*ReadSentencesExcel*Sheet2*Row21*ColC*Datum*XLSX | |
| 21A | Comment(s): The above sentence (Item # 21) is stored in both the SQL and Spreadsheet databases and when called by sentence (Item # 20) above it tells the said application to start reading sentences in cell Sheet2 Row21 ColC. Note, even though all drawings have not been completed, the said application is showing what has been completed to date. | | |
| 22 | Put the date in the designated cell to show when US Patent Figures were reviewed | *PutDateInExcel*Sheet2*Row21*ColE*XLSX. | Writing a date to a cell using Natural language. |
| 22A | Comment(s): When the cell for sentence Item # 21 is read it includes the sentence in Item # 22 above. As shown in FIG. 21, sentence Item # 22 puts the date and time in cell Sheet2 Row21 ColE. Note, that sentence Item # 22 above, like any other stored sentence in the related text, SQL, or related data repositories and spreadsheet data repositories can use partial words in the stored sentences or use synonyms without symbol words i.e.: the sentence in Item # 22 could be: put a date in the cell. (without using any other words to cause the said application to read sentence Item # 22 above by matching some of the words in sentence Item # 22 with: put a date in the cell. – see FIG. 21 cell Sheet2 Row21 ColE). | | |

FIG. 29W (The Sentence Map/Listing) is a Natural language listing of all English language sentences used in the processing of spreadsheet cells by the US Patent application example.

| | | |
|---|---|---|
| 23 | show all drawings FIGs as attachments to one sentence 9/1/2014DrawFigures. | Showing 14 drawings and other documents on the computer screen. |
| 23A | Comment(s): The above sentence which was activated by an If Then Else sentence in Item # 20 will open all drawings that have been attached to the sentence in Item # 23 (above) – a total of 14 drawings including Figures: ( 4/32, 5/32  6/32, 8/32, 10/32, 13/32,  16/32,  19/32, 20/32, 21/32,  24/32, 26/32, 27/32, 30/32).    The sentence of Item # 23 (above) is shown in FIG. 21 above the word: Sheet2.   Note, again that the sentence above in sentence Item # 21 and in  FIG. 21 (above Sheet1) tells the said application to read sentences labeled as 22, 23, and 24.  Note, that other sentences can be inserted in this cell (or any cell) including but not limited to sentences that open URLs, or send software agent text messages, open computer programs, open various files such as a help file  that go to the USPTO to help users with how to file a US Provisional Patent  (utility)  application or other IFThenElse or conditional solution sentences.   Note that all Figures are shown in the Specification (Detailed Description) under:  Brief Description of Drawings. | |

FIG. 29X (The Sentence Map/Listing) is a Natural language listing of all English language sentences used in the processing of spreadsheet cells by the US Patent application example.

| | | | |
|---|---|---|---|
| 24 | open MS Word version FIG 1 architectural diagram and the Conditional Sentence FIG 2 diagram 2/28/2014USPatentApplicationSpreadSheetSymWords. | | |
| 24A | Comment(s): The sentence in Item # 24 specifically opens FIG. 1 – The Overall Architectural Functional Flow Diagram. This diagram showing, for example, the input words and the Conditional Sentence diagram FIG. 2 where any sentence can have N number of attachments. These figures are shown on the computer screen and are being sent to the USPTO. | | |
| 25 | Show the message that the drawings have not been completed 8/29/2014USPTODrawingMessageStatus. | Message shown on computer screen. | |
| 25A | Comment(s): The sentence stored in the spreadsheet in sentence Item # 25 above opens a user message on the computer desktop that states that the US Patent application drawings have not been completed - See FIG. 21 (Number 25) and FIG. 22. This sentence is part of the sentences stored in cell Sheet1 Row19 Coll (Column I) and is based on the reading of sentence in Item # 20 above which is an IF Then Else sentence that tests a cell value to see if certain parts of the work to complete the filing of the US Patent application have been done. In this case, all the work has not been done (indicated by the Else cell) and the appropriate user message (This message) as displayed by Item # 25 (above) is being sent to the USPTO and is FIG. 22. | | |

FIG. 29Y (The Sentence Map/Listing) is a Natural language listing of all English language sentences used in the processing of spreadsheet cells by the US Patent application example.

| | | |
|---|---|---|
| 26 | let me know if the specification has been completed *IfThenElse*Sheet1*Row20*ColB*Row100*ColB*Row20*ColH*Row20*ColI*Spreadsheet. | decide which cells to read. |
| | Comment(s): | |
| 26A | The sentence in Item # 26 above is one of three sentences stored in cell Sheet1 Row19 ColI (Column I) – see FIG. 21. This cell was read by the said application when the sentence in Item # 20 above was read which is an IF Then Else sentence that decided that the value described in its symbol word and compared the cell text value at Sheet1 Row19 ColB which is not equal to the text value at Sheet1 Row99 ColB. Because these values were not equal, this If Then Else sentence decided to use its Else part of the sentence (vs. the Then part of this sentence's symbol word) and read the sentences in cell at Sheet1 Row19 ColI (Column I) which included the sentence at Item # 26 above. This is another If Then Else sentence. This sentence through its symbol word is deciding which of two cells it will read by comparing Sheet1 Row20 ColB to Sheet1Row100 ColB (Sheet1 is inferred for all cell values in this symbol word). If the US Patent Specification (Detailed Description) had been completed, the value of: Specification% (Detailed Description) would be in cell Sheet1 Row20 ColB since it would have compared this value to Sheet1 Row100 ColB which has the value of: Specification% - See user message in FIG. 23 saying the specification (Detailed Description) is not completed – sent to USPTO. No spreadsheet Figure has been sent to the USPTO showing a cell test for the letters Specification% which was done for the Title% and Abstract% cells. | |
| 26B | Since the value of: Specification% is not in cell Sheet1 Row20 ColB, the US Patent Specification (Detailed Description) is not complete. The said application allows users to send text messages to the spreadsheet that would put the value of: Specification% in cell Sheet1 Row20 ColB if the specification had been completed. A user could have also opened the spreadsheet and inserted the value of: Specification% in Sheet1 Row20 | |

FIG. 29Z (The Sentence Map/Listing) is a Natural language listing of all English language sentences used in the processing of spreadsheet cells by the US Patent application example.

| | | | |
|---|---|---|---|
| | ColB if the US Patent application Specification (Detailed Description) had been completed. The reference values in the spreadsheet including the reference value at Sheet1 Row100 ColB was set to a cell value of: Specification% by opening the spreadsheet and inserting the various values in the selected cells as comparison values to indicate when components of the US Patent application are completed. Once the spreadsheet is set up to process US Patent applications, it is usually a onetime effort and the only items that would change are the data (the US Patent documents detailing the subject matter of each US Patent application etc.). Sentences can be added to cells which includes those cell associated with conditional sentence processing or those cells that use IF Then Else processing or cells that just have sentences including help aids, web sites, and other database reference materials based on the processes of various spreadsheets. | | |
| 27 | show me the Specification for the US Patent application for spreadsheets using symbol words 3/3/2014SpecsUSPatentApplicationDetailedDescription. | Showing the Detailed Description (Specification) document on the computer screen. | |
| 27A | Comment(s): | | |
| | The sentence processed in sentence Item # 26 has determined by comparing cell values (nothing in cell Sheet1 Row20 ColB) is compared to Sheet1 Row100 ColB which has the value of: Specification%   so these two cells are not equal) that the specification document is not complete as stated in the document shown by the cell sentence read by the said computer application in sentence Item # 27 above.  The document shown in sentence Item # 27 is an incomplete US Patent specification document.  If the specification had been completed, then the spreadsheet decision process would have | | |

FIG. 29AA (The Sentence Map/Listing) is a Natural language listing of all English language sentences used in the processing of spreadsheet cells by the US Patent application example.

| | | |
|---|---|---|
| | taken another path through the spreadsheet and posted the appropriate data to indicate this fact. In addition, when the incomplete specification is shown by the sentence in Item # 27, two other documents are shown when read from the same cell that reads sentence Item # 27. These include the sentences processed in Item # 28, # 29 and sentence Item # 30 shown below. The Specification (Detailed Description) document is being sent to the USPTO. | |
| 28 | show the message that the Specification has not been completed 5/10/2014USPTO. | User message shown on computer screen. |
| 28A | Comment(s):<br><br>The message shown in Item # 28 - See FIG. 23 (saying the specification has not been completed.) above is a message document that opens on the computer desktop stating that the US Patent application Specification (Detailed Description) document is not complete – This document allows users to insert notes into this document regarding other information about the US Patent application Specification (Detailed Description). FIG. 23 is being sent to the USPTO. | |
| 29 | get the US Patent Specification outline notes 2/4/2014SheetDirections. | Showing specification outline notes document on the computer screen. |

FIG. 29BB (The Sentence Map/Listing) is a Natural language listing of all English language sentences used in the processing of spreadsheet cells by the US Patent application example.

| | |
|---|---|
| 29A | Comment(s): |
| | The sentence in Item # 29 above is user notes regarding the work to complete the US Patent application. These notes include information about prior examples of US Patent specifications. This Figure that contain these notes are not being sent to the USPTO but are displayed on the computer screen – This document is not being sent to the USPTO. |
| 30 | let me know if the Claims have been completed *IfThenElse*Sheet1*Row21*ColB*Row101*ColB*Row21*ColH*Row21*ColI*Spreadsheet. |
| 30A | Comment(s): |
| | The above sentence in Item # 30 above is similar to the sentence in Item # 26 for the completion of the Specification except this is for completion of the Claims. Essentially, two cells noted in this sentence's symbol word consisting of the cell locations Sheet1 Row21 ColB and cell location Sheet1 Row101 ColB are looking to see that both cells contain the word: Claims%. This word could have been put in these cells by an English language sentence or by opening the spreadsheet and placing this word (with percent symbol) in both the Actual cell. It's assumed that the Reference cells would have this value. When the word: Claims% (which is compared to the reference cell that also has the value of: Claims%) is placed in the Actual cell it means the Claims have been completed. The sentence in Item # 30 reads one of two cells(containing the English language text) and since the Claims are not done because the Actual cell does not contain the word: Claims%, the sentence in Item # 30 above selects the Else part of this sentence consisting of Sheet1 Row21 ColI (Column I) shown in FIG. 24 starting with sentence Item # 31 below. |

FIG. 29CC (The Sentence Map/Listing) is a Natural language listing of all English language sentences used in the processing of spreadsheet cells by the US Patent application example.

| | | |
|---|---|---|
| | Sentence Item # 30 above causes the reading of the next 5 sentences stored in cell Sheet1 Row21 ColI Coll (Column I) and includes sentence Item # 35 in Sheet3 Row 19 ColF The next 5 sentences being read start with sentence Item # 31, 32, 33, 34 in FIG. 24, and sentence Item # 35 is shown FIG. 27. FIG. 24 and FIG. 27 are being sent to the USPTO. | |
| 31 | show the US Patent status sheet for the completion of the application Claims wording with notes 3/10/2014USPatentApplicationDependant-IndependantClaims. | |
| 31A | Comment(s): The sentence in Item # 31 is one of five sentences that is being executed by the sentence in Item # 30 (above) after that sentence has made a decision based on the reading of a cell that did not have the letters: Claims% in the designated Actual cell read by the said application. Since the letters Claims% were not found in its Actual cell, the said application shows a claims status sheet that says claim notes will not be sent to the USPTO. FIG. 28 is the message about Claims notes and is being sent to the USPTO. | This document displayed for user but not published to the USPTO. |
| 32 | show me examples of how to write US patent claims 1/16/2016ClaimsExamples. | |
| 32A | Comment(s): The sentence in Item # 32 above is attached to internal documents on the said computer running the said computer application (this computer application processing these text, SQL, and spreadsheet sentences) which are displayed to the user, but it is also attached | This document displayed for user but not published to the USPTO. |

FIG. 29DD (The Sentence Map/Listing) is a Natural language listing of all English language sentences used in the processing of spreadsheet cells by the US Patent application example.

| | | |
|---|---|---|
| | to web pages whereby the said application opens those web pages that describe how to write US Patent claims in addition to internal notes on how to write claims and is shown on the computer screen but is not being sent to the USPTO. | |
| 33 | show the message that the US Patent Claims document has not been completed 5/10/2014USPTO. | User message shown on computer desktop |
| 33A | Comment(s): The sentence in Item # 33 shows the user a message (see FIG. 25) by displaying a document that says the claims have not been completed. FIG. 25 is being sent to the USPTO. | |
| 34 | let me know if the USPTO support detail questions have been completed KeyKey2Sentence*IfThenElse*Sheet3*Row26*ColB*Row26*ColC*Row19*ColE*Row19*C olE*Spreadsheet. | decide which cell to read. |
| 34A | Comment(s): The sentence in Item # 34 compares the cell values in cell Sheet3 Row26 ColB to Sheet3 Row26 ColC to see if they are equal to each other – see FIG. 26 and FIG. 3. Since they are not (meaning that all the US Patent Support Items have not been completed i.e.: obtaining a password to upload US Patent documents) the said application then processes its spreadsheet cells to reflect that these cells are not equal as done by comparison and shown in FIG. 26. After sentence Item # 34 does its comparison, as | |

FIG. 29EE (The Sentence Map/Listing) is a Natural language listing of all English language sentences used in the processing of spreadsheet cells by the US Patent application example.

| | | |
|---|---|---|
| | shown in sentence FIG. 26, this same sentence uses the Else part of its symbol word to start reading the sentences in cell Sheet3 Row19 ColF as shown in FIG. 27 beginning with sentence Item # 35 below. FIG. 3, FIG. 26, and FIG. 27 are being sent to the USPTO. | |
| 35 | Show the provisional US Patent status sheet for the completion of the USPTO Support document processes 3/3/2014USPatentApplication. | Showing status document on computer screen. |
| 35A | Comment(s): | |
| | The sentence in Item # 35 above is part of a group of sentences that were processed from the decision made by the sentence in Item # 34 above. The sentences being read are shown in FIG. 27. The first sentence in this group is sentence Item 35. The status sheet for completed support items is shown in FIG. 3 and shows each item that must be checked off when completed. Each of the next 4 sentences including the sentence in Item # 35 above are read from a cell by the said application inclusive of (Items # 35, 36, 37 and 38) as shown in FIG. 27. | |
| 36 | show the message that the US Patent Administrative support documents have not been completed 5/10/2014USPTO. | Write data to cell saying certain support items are not done. |
| 36A | Comment(s): | |
| | See Item # 36 above and FIG. 9 -- status message that opens a document on the | |

FIG. 29FF (The Sentence Map/Listing) is a Natural language listing of all English language sentences used in the processing of spreadsheet cells by the US Patent application example.

| | | |
|---|---|---|
| | | An agenttest message is sent from agentpatent (sentence item # 37) and, in turn, agenttest sends a message back to agentpatent as sentence item # 46. This sentence then appears in the agentpatent application as sentence item # 39. Note, numbers refer to |
| | computer desktop that says what administrative and support items have and have not been completed toward the work to file for a US Patent Application example. Note, that sentences in Items # 9, 10 and 11 (FIG. 6) were selected by the helper sentence in Item # 9D after which sentence Item # 9 (a solution sentence) determined that the SpecReqs%Title%SupportNotComplete% (and specifically because of SupportNotComplete%) in the solution sentence's column. The user message states that the Administrative Support Documents have not been completed. Lastly, it should also be noted that the value of: SupportNotComplete% (Sheet1 Row22 ColB – FIG. 11) is concatenated with SpecReqs%Title% which is then processed by the sentence in Item # 38 below. FIG. 9 and FIG. 11 are shown on the computer screen and are being sent to the USPTO. | |
| 37 | agenttest the US Provisional Patent has not been completed 5/15/2014. | |

FIG. 29GG (The Sentence Map/Listing) is a Natural language listing of all English language sentences used in the processing of spreadsheet cells by the US Patent application example.

| | Comment(s): | sentence item #s in FIG. 29 – the Sentence Map listing. |
|---|---|---|
| 37A | Note, that sentences Item #s 35 through 38 were selected by the IF Then Else sentence Item # 34 which determined the status of the current patent components completed by comparing the concatenated values as shown in FIG. 11.<br>The sentence in Item # 37 when sent from the myuspatentexpert (My US Patent expert) application to the ewstestexpert (Ews Test Expert) application and was transmitted without its symbol word which is: | |
| 37B | *ReadSentencesExcel*Sheet1*Row48*ColC*Datum*XLSX.<br>The entire sentence is: | |
| 37C | agenttest the US Provisional Patent has not been completed 5/15/2014 *ReadSentencesExcel*Sheet1*Row48*ColC*Datum*XLSX. | |
| 37D | The above sentence (Item # 37) is 1 of 4 sentences that are read by the said application and stored in cell Sheet3 Row19 ColF and is shown in FIG. 27. When the sentence in Item # 37 arrives at the ewstestexpert (Ews Test Expert) application it is processed as:<br>the US Provisional Patent has not been completed 5/15/2014.<br>Where the letters agenttest were removed by the myuspatentexpert (My US Patent Expert) application and the rest of the sentence finds it symbol word in its respective SQL ewstestexpert (Ews Test Expert) application database. | |

FIG. 29HH (The Sentence Map/Listing) is a Natural language listing of all English language sentences used in the processing of spreadsheet cells by the US Patent application example.

| | | |
|---|---|---|
| | The above sentence (in 37C) associates the letters: agenttest with an IP address and the sentence is then sent to the agenttest application (ewstestexpert (Ews Test Expert) application). Again, the sentence in Item # 37 comes from reading sentences in the myuspatentexpert (My US Patent Expert) application at Sheet3 Row19 ColF (see FIG. 27) after it was determined, from sentence Item # 34, that the Administrative support detailed questions have not been completed (i.e. did not receive a password from the USPTO etc.). When sentence Item # 37C (i.e.: sentence Item # 37) is read by the ewstestexpert (Ews Test Expert) application, the said application reads the sentence stored at cell: Sheet1 Row48 ColC (see the symbol word of Item # 37C above) as shown in FIG. 30. The sentence stored in Sheet1 Row48 ColC of the ewstestexpert (Ews Test Expert) application is read and sends sentence Item # 46 below from the ewstestexpert (Ews Test Expert) application back to the myuspatentexpert (My US Patent Expert) application which is shown as sentence Item # 39 below. Normally, it would be thought that the next sentence should be that of sentence Item # 38, but it is not because agent messages post their results at the end of all messages processed in the application that they were sent to. The current application myuspatentexpert (My US Patent Expert) application reads sentences from 0 through 41 while the ewstestexpert (Ews Test Expert) application reads sentences item # 42 through 47 | |
| 38 | agenttest get the status for funding and approval from Agent test KeySentence*GetSingleCellDataCatColuLet*Sheet1*Row35*Row43*Row44*ColB*Datum*SolSentX. | Makes the same decision as sentence Item # 11 but uses different words. Causes sentence item # 47 to be read in the ewstestexpert |

FIG. 29II (The Sentence Map/Listing is a Natural language listing of all English language sentences used in the processing of spreadsheet cells by the US Patent application example.

| | Comment(s): | application. |
|---|---|---|
| 38A | The sentence in Item # 38 (see FIG. 27) is sending this text message from the cell read in the myuspatentexpert (My US Patent Expert) application at location Sheet3 Row19 ColF marked with number 38). The entire sentence with its symbol word is being transmitted to the ewstestexpert (Ews Test Expert) application (minus the letters: agenttest), but it should be noted that the only part of the sentence that needs to be transmitted to the ewstestexpert (Ews Test Expert) application is: get the status for funding and approval from Agent test. This is because the entire sentence exists at the ewstestexpert (Ews Test Expert) application and this incoming text message from myuspatentexpert (My US Patent Expert) application only has to match some of the words that are stored in the Ews Test Expert SQL database (and therefore the ewstestexpert spreadsheet) at the ewstestexpert (Ews Test Expert) application to begin reading this sentence. This sentence is a conditional solution sentence (meaning depending on the data in a column that it analyzes will depend on the solution that is given – see FIG. 8) and when it is processed by the said application on the ewstestexpert (Ews Test Expert) application, it does so by the concatenation of its column data related to cell Sheet1 cell Row35 to Row43 Column B. When these cells are concatenated the value becomes:<br><br>Funded%Dept23Approved%.<br><br>(note that spreadsheet cells 37 to 43 are empty – FIG. 8 has no data in these cells and, therefore, they are not part of the concatenated value of:<br><br>Funded%Dept23Approved%. | |

FIG. 29JJ (The Sentence Map/Listing) is a Natural language listing of all English language sentences used in the processing of spreadsheet cells by the US Patent application example.

| | |
|---|---|
| | The next step is that the solution sentence then looks at the helper sentences stored in the SQL database of the ewstestexpert (Ews Text Expert) application and finds these two sentences (Item # 38B and Item # 38C) |
| 38B | Identify the message for approved funding and review after requirements review and Title completion<br>helperLetterMethod*ReadSentencesIfExcelValue*Sheet1*Row44*ColB*Row36*ColE*Read*Sheet1*Row36*ColF*XLSXMsgGp1 |
| 38C | Identify the message for approved funding after requirements and Title completion but USPTO project not approved<br>helperLetterMethod*ReadSentencesIfExcelValue*Sheet1*Row44*ColB*Row35*ColE*Read*Sheet1*Row35*ColF*XLSXMsgGp1 |
| 38D | The solution sentence and its symbol word in sentence Item # 38 above examines sentences Item # 38B and sentence Item # 38C and its symbol words and, in turn, matches: Sheet1, Row44, and ColB that is in the solution sentence's symbol word and in the symbol words of both helper sentences (Item # 38B and Item # 38C above). All three stored sentences (the solution sentence and the 2 helper sentences) have these same values. However, the solution sentence looks further at both these helper sentences and works to see which cell (pointed to by one of these helper sentences) has the same concatenated value as found by the solution sentence in its concatenation process which resulted in: %Funded%Dept23Approved%. Next, looking at FIG. 8 and the cells of Sheet1 Row36 ColE and Sheet1 Row35 ColE, shows that cell Sheet1, Row36 ColE has the same value that the conditional solution sentence found when it concatenated the columns Sheet1 ColB Rows 35 and 36 – namely: Funded%Dept23Approved%. Once the said application identifies the correct helper sentence (see Item # 39B), it then uses that helper sentence's solution cell (Sheet1Row36 ColF) (see FIG. 8) and the said application reads the sentences stored in this cell. The first message is shown in Item # 43 below in the ewstestexpert (Ews Test |

FIG. 29KK (The Sentence Map/Listing) is a Natural language listing of all English language sentences used in the processing of spreadsheet cells by the US Patent application example.

| | |
|---|---|
| | Expert) application - after this sentence is read it appears at the myuspatentexpert (My US Patent Expert) application as sentence item # 40 below and shows the user message in: FIG. 31. The second sentence read is shown as sentence item # 44 in the ewstestexpert (Ews Test Expert) application. After this sentence is read by the ewstestexpert (Ews Test Expert) application, it appears at the myuspatentexpert (My US Patent Expert) application as sentence Item # 41 which causes the said application to display a listing of all sentences processed by the myuspatentexpert (My US Patent Expert) application. Sentences read by the ewstestexpert (Ews Test Expert) application are listed by a separate process and were manually added to the sentence listing of the myuspatentexpert (My US Patent Expert) application. FIG. 8 and FIG. 31 are being sent to the USPTO. |
| 39 | A message from agent test that the US Provisional Patent Application has not been completed 5/15/2014. |
| 39A | Comment(s): The sentence in Item # 39 above was sent from the ewstestexpert (Ews Test Expert) application and is missing the letters: AgentPatent as in: agentpatent a message from agent test that the US Provisional Patent Application has not been completed 5/15/2014. When this sentence is received at the myuspatentexpert (My US Patent Expert) application from the ewstestexpert (Ews Test Expert) application, it shows a document (from the myuspatentexpert (My US Patent Expert) application SQL database) stating that the US Provisional Patent Application has not been completed (See FIG. 32) - In summary, sentence Item # 37 (FIG. 27) sends a message to the ewstestexpert Ews Test Expert) application which, in turn, reads cell Sheet1Row48 ColC shown below as |

FIG. 29LL (The Sentence Map/Listing) is a Natural language listing of all English language sentences used in the processing of spreadsheet cells by the US Patent application example.

| | | User message shown on computer desktop | |
|---|---|---|---|
| | sentence Item # 46 (see FIG. 30) and sends a message back to the myuspatentexpert (My US Patent Expert) application as shown above in sentence Item # 39. Complications in understanding the sequence of these messages is due, in part, to the fact that when a message is sent from one application to another it gets posted at the end of what the receiving application is currently reading in its sentence queue – so the sentences in this listing appear to be out of sequence from what would be expected. The message is shown on the computer screen as FIG. 32. FIG. 27, FIG. 30, and FIG. 32 are being sent to the USPTO. | | |
| 40 | funding is available and has been approved for the US Patent application ApprovalToProceedUSPTO. | | |
| | Comment(s): | | |
| 40A | See user message in FIG. 31. Sentence Item # 40 above actually comes from both sentence Item # 42 and sentence Item # 47 (in the ewstestexpert (Ews Test Expert) application). But since these sentences perform the same function namely sending the message shown in sentence Item # 40 above, the message only appears once since the said application does not process duplicates. Duplicates were sent by two differently worded sentences having the same symbol word as shown by sentence Item # 11 and sentence Item # 38, in turn, read the cells as shown in FIG. 8. The top two blocks (to the right Row35 and Row36 ColF) show numbers 11 and 42 and numbers 38 and 47. Sentence Item #s 11 and 38 cause sentence #s 42 and 47 to be processed in the ewstestexpert (Ews Test Expert) application resulting in reading cell Sheet 1 Row36 ColF (see FIG. 8) twice which, in turn, causes sentence Item # 43 and sentence Item # 44 to send messages to the myuspatentexpert (My US Patent Expert) application as shown by sentence Item # 40 and sentence Item 41. | | |

FIG. 29MM (The Sentence Map/Listing) is a Natural language listing of all English language sentences used in the processing of spreadsheet cells by the US Patent application example.

| | |
|---|---|
| 40B | Next, sentence Item # 0A (above) directs the said application to record all sentences processed by the myuspatentexpert (My US Patent Expert) application and likewise this can be done for the ewstestexpert (Ews Test Expert) application which processes sentence Item # 42 through sentence Item # 47   The said application (myuspatentexpert (My US Patent Expert) application) receives the message in sentence Item # 41 below telling it to display all recorded sentences processed by myuspatentexpert (My US Patent Expert) application shown in a MS notepad file which has been copied into this document and noted as FIG. 29 (the Sentence Map / Listing) and is being sent to the USPTO.  It should be noted that after the myuspatentexpert (My US Patent Expert) application reads the sentence Item # 0B above that tells the said application to record the sentences being processed by the input letters:  key7 and  key3 which processes all cells (making decisions along the way)  in both the myuspatentexpert (My US Patent Expert) and the ewstestexpert (Ews Test Expert) applications. |
| 41 | show stored sentences using the showwdspp function. ([show,store,sentence,using,showwdspp,function]) |
| 41A | Comment(s): [show,store,sentence,using,showwdspp,function]  The sentence shown in Item # 41A is processed at  myuspatentexpert (My US Patent Expert) application and is shown in list format since this sentence is processed from the text database and not the SQL database or related data repository whereby both databases display read sentences differently.   All other sentences form the SQL database  are shown in normal sentence format -- see FIG. 8 Sheet1 Row36 ColF second sentence |

FIG. 29NN (The Sentence Map/Listing) is a Natural language listing of all English language sentences used in the processing of spreadsheet cells by the US Patent application example.

| | | |
|---|---|---|
| | in the cell identified as sentence Item # 44 below. This computer listing (this document) was derived for an automated printout of all sentences listed by the said applications at both the ewstestexpert (Ews Test Expert) application and the myuspatentexpert (My US Patent Expert) application as the spreadsheet logic and decision making processes take place to manage the US Patent application processes. . | |
| | Below this point all text messages have been received from the myuspatentexpert (My US Patent Expert) application and are being processed by the ewstestexpert (Ews Test Expert) application. Likewise, text messages are sent from below this point by the ewstestexpert (Ews Test Expert) application to the myuspatentexpert (My US Patent Expert) application where both said applications run on the same computer but could run on separate computers using a specific TCP/IP address for each agent name. The ewstestexpert (Ews Test Expert) application does analysis (using its own spreadsheet(s)) from the text messages sent to it by the myuspatentexpert (My US Patent Expert) application and then automatically (through the decision making process) sends messages back to myuspatentexpert (My US Patent Expert) application based on decisions made by ewstestexpert (Ews Test Expert) application that either change what the myuspatentexpert (My US Patent Expert) application does (processing column data (conditional sentence processing)) or IF Then Else sentences or puts character data in cells or tells the myuspatentexpert (My US Patent Expert) application to display user messages or the sentences may execute computer resources (open files, go to URLs, run SQL queries etc.). Any English language text message processed by the said application can process any number of computer resources as a result of the decisions made by reading and writing to spreadsheet cells using its text, SQL, spreadsheet databases or related data repositories, and software agents using stored user knowledge, experiences, observations, and symbol words stored as English language sentences in the said application's data repositories or any suitable data repository and spreadsheet cell data that can respond to spreadsheet cell processing. | The following sentences are processed in the ewstestexpert (Ews Test Expert) application. |

FIG. 29OO (The Sentence Map/Listing) is a Natural language listing of all English language sentences used in the processing of spreadsheet cells by the US Patent application example.

| 42 | let me know if funding has been approved for the spreadsheet Provisional Patent application. | Looks a column cell data and makes a decision - comes from the execution sentence (Item # 11) above. |
|---|---|---|
| 42A | Comment(s): Sentence Item # 42 (above) was sent to the ewstestexpert (Ews Test Expert) application by the myuspatentexpert (My US Patent Expert) application as one of two sentences shown as sentence Item # 10 and 11 (see FIG. 6). Sentence Item # 10 was read from a cell defined as: Sheet1 Row17 ColF. Cell Sheet1 Row17 ColF was selected for reading by the decisions made by the sentence in Item # 8 (above). That sentence determined that although the SpecReqs and Title wording are done, the password has not been received and the US Patent application has not been completed. Sentence Item # 11 (see sentence Item # 11 above) is a conditional solution sentence meaning that its column cells must be concatenated and compared to cell data defined by the appropriate helper sentence. The said application will read the sentences in Sheet1 Row17 ColF (see FIG. 6) which includes sentence Item # 11 which sends this sentence to the ewstestexpert (Ews Test Expert) application. When the sentence of Item # 42 (above) is read, it finds it's sentence in the ewstestexpert (Ews Test Expert) application SQL database where it contains its symbol word as shown in Item # 42B (below). | |
| 42B | let me know if funding has been approved for the spreadsheet Provisional Patent application keySentence*GetSingleCellDataCatColuLet*Sheet1*Row35*Row43*Row44*ColB*Datum* SolSentX | From the reading of sentence Item # 11 in the myuspatentexpert application. |
| 42C | Sentence Item # 42 is a conditional solution sentence shown with its symbol word in | |

FIG. 29PP (The Sentence Map/Listing) is a Natural language listing of all English language sentences used in the processing of spreadsheet cells by the US Patent application example.

| | |
|---|---|
| | sentence Item # 42B (above) |
| 42D | Note, that the conditional sentences shown above in Item # 42B will use its symbol word to concatenate Sheet1 Row35 to Row44 ColB. The conditional solution sentence in Item # 42 (does not have it symbol word as shown in Item # 42B). When sentence Item # 42B is read its concatenated value causes this sentence to search for two related helper sentences shown in Item # 44G and Item # 44H (below) to see which of those two sentences points to a cell containing the value of : |
| 42E | Funded%Dept23Approved%. |
| 42F | The helper sentence in Item # 44G goes to location Sheet1 Row36 ColF and finds the value of: Funded%Dept23Approved% which then causes the said application to further use this helper sentence and read the sentences stored in cell: Sheet1 Row35 ColF which contains two sentences. This again is shown in FIG. 8 whereby the said application reads the sentences in this cell and sends two messages back to the myuspatentexpert (My US Patent Expert) application as shown in sentence Item # 43 and sentence item # 44 below. Helper sentences (Item # 42G and Item # 42H (below) are not in the spreadsheet cells but rather in the SQL database of the ewstestexpert (Ews Test Expert) application. Most SQL database sentences are stored in spreadsheet cells except for helper sentences and other sentences that may not be associated with spreadsheet processes. Note, the helper sentence 42H has the words: not approved whereas helper sentence 42G does not. Stored sentence can differ from one sentence to the next just by changing one word or letter. |
| 42G | Identify the message for approved funding and review after requirements review and Title completion<br>helperLetterMethod*ReadSentencesI    FIG. 29JJ    *Row44*ColB*Row36*ColE*Rea d*Sheet1*Row36*ColF*XLSXMsgGp1. |

FIG. 29QQ (The Sentence Map/Listing) is a Natural language listing of all English language sentences used in the processing of spreadsheet cells by the US Patent application example.

| | | | |
|---|---|---|---|
| 42H | Identify the message for approved funding after requirements and Title completion but USPTO project not approved helperLetterMethod*ReadSentencesIfExcelValue*Sheet1*Row44*ColB*Row35*ColE*Read*Sheet1*Row35*ColF*XLSXMsgGp1. | | |
| 43 | agentpatent Funding is available and has been approved for the US Patent application ApprovalToProceedUSPTO. | User message shown on computer desktop | |
| 43A | Comment(s): The text message in sentence Item # 43 above is one of two messages being sent to myuspatentexpert (My US Patent Expert) application by a decision that was made by the ewstestexpert (Ews Test Expert) application spreadsheet (see FIG. 8 – Sheet1 Row36 ColF) after it decided that funding has been approved to apply for the US Provisional Patent. In effect, the user message in sentence Item # 43 above appears as sentence Item # 40 (above) in the myuspatentexpert (My US Patent Expert) application and is shown on the computer screen as FIG. 31. FIG. 31 is being sent to the USPTO. | | |
| 44 | agentpatent show stored sentences using the showwdspp function. | | Tells the myuspatentexpert application to show read sentences |

FIG. 29RR (The Sentence Map/Listing) is a Natural language listing of all English language sentences used in the processing of spreadsheet cells by the US Patent application example.

| | Comment(s): | | |
|---|---|---|---|
| 44A | The above message (Item # 44 above) is the second of two text messages sent from the ewstestexpert (Ews Test Expert) application to the myuspatentexpert (My US Patent Expert) application and is read by the myuspatentexpert (My US Patent Expert) application telling this application to display all sentences that this application has read. This sentence is a result of the decision made by sentence Item # 42 above. See FIG. 8 Sheet1 Row36 ColF. This sentence was sent twice (resulting from sentence Item # 11 and sentence Item # 38 – different words but the same symbol word) by the ewstestexpert (Ews Test Expert) application (It sent sentence Item # 44 twice) to the myuspatentexpert (My US Patent Expert) application because of the spreadsheet decisions that were made by the spreadsheet logic in the spreadsheet processed by the myuspatentexpert (My US Patent Expert) application. | | |
| 45 | the US Provisional Patent has not been completed 5/15/2014. | | |
| | Comment: | | |
| 45A | Sentence Item # 45 above was received from the myuspatentexpert (My US Patent Expert) application as sent by sentence Item # 37 above (see FIG. 27). The reading of sentence Item # 45 in the ewstestexpert (Ews Test Expert) application caused the reading of Sheet1 Row48 ColC (see FIG. 30) in the ewstestexpert (Ews Test Application) application as shown in sentence Item # 46 below. | | |

FIG. 29SS (The Sentence Map/Listing) is a Natural language listing of all English language sentences used in the processing of spreadsheet cells by the US Patent application example.

| | | |
|---|---|---|
| 46 | Agentpatent a message from agent test that the US Provisional Patent Application has not been completed 5/15/2014. | An agenttest message is sent from agentpatent (sentence item #37) and, in turn, agenttest sends a message back to agentpatent as sentence item # 46. This sentence then appears in the agentpatent application as sentence item # 39. Note, numbers refer to sentence items #s in FIG. 29/32 FIG. 29 - the Sentence map/Listing |
| 46A | Comment(s): The sentence in Item # 46 above resulted from a sentence being read in the myuspatentexpert (My US Patent Expert) application spreadsheet (see FIG. 27 sentence Item # 37). This sentence is: Agenttest the US Provisional Patent has not been completed 5/15/2014 and is missing its symbol word but finds its whole sentence (and its symbol word) at the ewstestexpert (Ews Test Expert) application. The entire sentence at | |

FIG. 29TT (The Sentence Map/Listing) is a Natural language listing of all English language sentences used in the processing of spreadsheet cells by the US Patent application example.

| | | |
|---|---|---|
| 46B | the ewstestexpert (Ews Test Expert) application is: | |
| | The US Provisional Patent has not been completed 5/15/2014 *ReadSentencesExcel*Sheet1*Row48*ColC*Datum*XLSX. | |
| 46C | Now the above sentence is read by the said application at the ewstestexpert (Ews Test Expert) application spreadsheet and reads the sentence stored in this cell at: Sheet1*Row48*ColC* which is: | |
| 46D | agentpatent a message from agent test that the US Provisional Patent Application has not been completed 5/15/2014. | |
| | When the above message is sent to the myuspatentexpert (My US Patent Expert) application (see sentence Item # 40 above) it displays the message on the desktop shown as FIG. 28. See FIG. 28 and FIG. 30. These Figures are being sent to the USPTO. | |
| 47 | get the status for funding and approval from Agent test KeySentence*GetSingleCellDataCatColuLet*Sheet1*Row35*Row43*Row44*ColB*Datum* SolSentX | From the reading of sentence Item # 38 in the myuspatentexpert Application. |
| 47A | Comment(s): | |
| | It should be noted that sentence Item # 47 is a conditional solution sentence just like sentence Item # 42 and uses the same helper sentences. The sentence (Item # 47 above) was received by the ewstestexpert (Ews Test Expert) application from the myuspatentexpert (My US Patent Expert) application as shown in sentence Item # 38 | |

FIG. 29UU (The Sentence Map/Listing) is a Natural language listing of all English language sentences used in the processing of spreadsheet cells by the US Patent application example.

| | |
|---|---|
| | above. In turn (see FIG. 8/32 ) the said application then reads the spreadsheet cell in the ewstestexpert (Ews Test Expert) application at location Sheet1 Row36 ColF and sends two messages back to the myuspatentexpert (My US Patent Expert) application – see sentence Item # 43 and 44 (above). Now, sentence Item # 43 is read in the ewstestexpert (Ews Test Expert) application (above) and is sent to the myuspatentexpert (My US Patent Expert) application where it is read (sentence Item # 40) above and displays the user message as shown in FIG. 31. |
| 47B | Next, sentence Item # 47 (above) (using its helper sentence to identify cell Sheet1 Row36 ColF and reads the second sentence at the ewstestexpert (Ews Test Expert) application spreadsheet) - (see FIG. 8) and sends a second message to the myuspatentexpert (My US Patent Expert) application as shown in sentence Item # 44 above telling the myuspatentexpert (My US Patent Expert) application to show all sentences read by this application. |

FIG. 30

The sentence that is being read at Sheet1 Row48 ColC in the Ews Test Expert application spreadsheet. Numbers in diagram refer to sentence Item numbers in FIG. 29 (the Sentence Map / Listing).

| | A | B | C | D | E | F |
|---|---|---|---|---|---|---|
| 43 | | | | | | |
| 44 | | | | | | |
| 45 | | | 11 and 38 | | | |
| 46 | | | Problem Message: | | | |
| 47 | | | agentpatent a message from agent test that the US Provisional Patent Application has not been completed 5/15/2014. ← 46 | | | |

Sheet1

A message from the agenttest (ewstestexpert (Ews Test Expert) application ) to the agentpatent (myuspatentexpert (My US Patent Expert)) application (sentence Item # 40 in the sentence map (FIG. 29)) is read by the ewstestexpert (Ews Test Expert) application spreadsheet at cell: (Sheet1 Row36 ColF – sentence numbers 43 and 44) and displays this document and the message below at the (myuspatentexpert (My US Patent Expert)) application:

After completion of a review of the specification requirements (not the Detailed Description) and Title wording, FUNDING and approval has been granted to proceed with the US Provisional Patent application example.

User Notes:

A User Message from the ewstestexpert (Ews Test Expert) application that says the US Patent Application has not been completed Notes:

The Provisional Patent Application has not been completed.

SYSTEM OF ENGLISH LANGUAGE SENTENCES AND WORDS STORED IN SPREADSHEET CELLS THAT READ THOSE CELLS AND USE SELECTED SENTENCES THAT ANALYZE COLUMNS OF TEXT AND COMPARE CELL VALUES TO READ OTHER CELLS IN ONE OR MORE SPREADSHEETS

A system of English language sentences and words stored in spreadsheet cells that read those cells and use selected sentences that analyze columns of text and compare cell values to read other cells in one or more spreadsheets.

BACKGROUND

The background of this invention is classified by number 706—Data Processing with subject matter: Artificial Intelligence. Also, see Natural Language Processing (NLP), AI programming, and Expert Systems (see Reference 2), Neural Networks, Software Agents, Natural language. Prior work in the same area by the applicant includes: U.S. Pat. Nos. 6,101,490, 6,269,356, and 8,510,328 B1. Search terms used to determine the existence of the methods of the said application(s)—See Reference 13.

Problems Solved—The said computer application(s) (see Reference 3) demonstrates methods by which spreadsheets (see Reference 11) are used in nontraditional ways to process human language (Natural language). The spreadsheets are not used to make calculations and or depend on calculations whatsoever, but rather their cells serve as containers that hold English language sentences (see Reference 5), text, words, and symbol words. In addition, spreadsheets can be sent English language text messages that analyze the text in a column of cells (known as conditional sentence processing) and then from that analysis the said application(s) (see Reference 10) decides on a cell to read that also contains English language sentences, text, words, and symbol words. The decisions made by one column of text then reads a cell that can contain English language sentences that when read can change the text in a cell in another unrelated column or the column itself or the column in another spreadsheet in another application in another computer. In effect, there can be multiple columns of text where any text cell can be changed with an English language sentence and then any column can be sent an English language sentence that will analyze the column of cell text to make a decision. The methods of this US Patent application disclosure can be complex due, in part, from the fact that the said application(s) are making decisions and based on those decisions are sending and receiving English language text messages between the said applications (and their spreadsheets and cells) which may include reading and writing text to various cells within the spreadsheets. These changes to cell text data will change the way the said applications communicate with one another. Another complication is caused by the fact that when a said application is sent and agent software text message (see Reference 4) and that application has sentences that are being processed, the arriving text message is posted at the end of all sentences being processed by that said application receiving the text message. The said applications still do their work but the sequence of what the applications are doing appears to be out of order.

Further, other processes consisting of a column of text that make decisions can be integrated with English language sentences (see Reference 6) that compare the text in two cells and from that comparison will make the said application read the sentences in a specified cell in the spreadsheet or in another spreadsheet. Input sentences (from users, data repositories, software agent text messages, or spreadsheets) that tell the said application to compare two cells and then from the comparison read sentences in a cell where any one of those sentences can be other comparisons (known as IF Then Else sentences) or conditional solution sentences (see Reference 8) or sentences that make the said application go to the web (see Reference 6) or query a SQL database or send agent text messages to other spreadsheets or show a picture based on a decision that the spreadsheet made or to do a host of other activities which can be made part of the spreadsheet's decision making process. Other improvements, for example, let the said application find a stored sentence that makes up a user's knowledge, experience, and observations stored as English language sentences and words (see Reference 12) in the computer's memory by using methods that recall stored sentences using synonyms or synonym sentences (see Reference 7). A synonym sentence is a sentence that has the same attachment (like a spreadsheet) but uses different words to open that spreadsheet c process the different cells in a spreadsheet. Stored sentences can be attached to different spreadsheet and the data can be processed by those sentences which can be used, in one instance, to share data between spreadsheets and between spreadsheets using different sheets or tabs within one spreadsheet. Stored sentences that process spreadsheets do so by using symbol words which are usually proper nouns in the sentences that define the type and methods the sentence will use to process the spreadsheet cells. In the below example, the stored sentence with the symbol word: check for reference and actual administrative support items (i.e.: password) completed for the Provisional Patent application

*IFThenElse*Sheet3*Row26*ColB*Row26*ColC*Sheet1*Row22*ColK*Row22*ColR*Spread sheet.

This stored sentence is and IF Then Else sentence where symbol word data in Sheet3 Row26 ColB is compared to the data in Sheet3 Row26 ColC. If the data is the same the said application reads sentences stored in cell location Sheet3 Row22 ColK otherwise if the data is not the same the said application reads the data stored in cell Sheet3 Row22 ColR. Data in cells are usually English language sentences or text. A host of problems are solved using the said application which include, but are not limited to: 1) Spreadsheet data is processed with (Natural Language) in this case, the English language; 2) Spreadsheets are used to make complex decisions using the English language, symbol words, and software agents. 3) A spreadsheet (known as spreadsheet N) can send a message to a specified spreadsheet (known as spreadsheet M) asking it to make a decision (based on its analysis of a column of text or when reading a sentence that asks for a comparison between two cell values). Spreadsheet M can send a message back to spreadsheet N that can change the way it originally made a decision and sent its message to spreadsheet M. Multiple methods can be used in the decision making process using the English language and sentences that are made up of conditional sentences integrated with IF Then Else sentences and other sentences used to access other computer processes and resources. Cells can contain English language sentences and words that can be read by the said application to do a variety of tasks related to general knowledge use or to specific knowledge, related to a user's knowledge, observations, and experiences. Storing knowledge, observations, and experiences comprise the steps of putting this information in English language sentence format and then placing these English language sentences in the computer's memory using text, SQL or spreadsheet data repositories.

The said application solves the problem of letting users store their general knowledge or specific knowledge, observations, and experiences in the form of English language sentences and words that are stored in spreadsheet cells such that those cells can make complex decisions from the English language sentences and words that are sent to the spreadsheets. The spreadsheets make decisions based on what users have told the spreadsheet or what other spreadsheets have told a spreadsheet in English, based on the spreadsheet's decisions. These decisions made by the spreadsheets may send out multiple English language text messages or words to any number of spreadsheets for which any spreadsheet can reply in English language text or words to the sending spreadsheet telling it what it should do next. These spreadsheets carry out human language conversations until no further conversations are needed to complete the request of a user or the request of other spreadsheets. The problem solved is that the said application takes users out of the decision making process and uses the common English language text interface without the need for computer code that would otherwise be needed to manage what the English language text and words are providing for their users.

Problems Noted in the Prior Art—Spreadsheets, in the past, have been mainly used to process numerical data and not used as currently disclosed in this specification (Detailed Description) to process non numerical data such as English language sentences and words. Further, processes disclosed in this specification (Detailed Description) define methods not known in the Prior Art by which the said application analyzes a column of spreadsheet text caused by inputting an English language sentence or words to the spreadsheet or inputs to the spreadsheet caused by the said application reading the sentences or words in a spreadsheet cell or input to the spreadsheet from a text message from a software agent coming from a second said application using its text, SQL databases, and the decisions of its spreadsheet cells.

There does not seem to be any methods known in the Prior Art that allows English language sentences and words to be sent to a spreadsheet that will take into account the fact that one of the cells in a column of text can be changed with the input of an English language sentence or words and whereby a second condition solution sentence can be sent to the spreadsheet that will concatenate the column of text with its new data that is now unique such that the said application will read a cell containing English language sentences and words based on the concatenated data found in the column of cells that would result in a new decision by the spreadsheet.

There does not seem to be any methods in the Prior Art that allows the reading of spreadsheet cells resulting from the concatenation of a unique column of text causing a unique cell to be read in the spreadsheet containing English language sentences and words and whereby the cell to be read contains one of more English language sentences and words that contain IF Then Else sentences whereby the said application reads this sentence type and analyzes the data (usually text data) in two cells such that if the data is the same in two cells, the said application reads that specified spreadsheet cell containing English language sentences and words and if the data is not the same the said application will read a second specified spreadsheet cell containing other English language sentences and words.

There does not seem to be any method in the Prior Art that allow users to store unique English language sentences based on knowledge, observation, and experiences and having unique symbol words coming from an application input or from a database or from spreadsheet cells or from a software agent that would cause a said application to read a said sentence and process the spreadsheet cells according to the unique components of the read sentence's symbol word.

There does not seem to be any methods in the prior art that allows one spreadsheet to make a decision using text, SQL databases and spreadsheet cells using unique English language text messages and words with or without symbol words such that the second spreadsheet sends a unique English language message or words back to a first spreadsheet that changes the way it sends messages to a second spreadsheet.

There does not seem to be any methods in the Prior Art that allows certain cells in a column of text cells to have their cell values changed by an English language sentence or words. Since the outcome of what the spreadsheet decides is dependent on the text values concatenated in a column of text cells, changing text in column cells with an English language sentence would be known to bias the decision the spreadsheet made by changing what cells the spreadsheet decided to read based on sentences the spreadsheet receives from user input, software agent text messages or sent from other cells within the same or different spreadsheets.

There does not seem to be any methods in the Prior Art that allows a said application to switch between spreadsheet cells with an English language sentence or words and its associated symbol word to get a new or different decision from the spreadsheet.

There does not seem to be any methods in the Prior Art that allows SQL databases to automatically transfer sentences stored in the SQL database representing a user's unique English language sentences, and in certain cases, the sentence's symbol word(s) further representing that user's knowledge, observation s and experiences that are then automatically stored into spreadsheet cells.

There does not seem to be any methods in the Prior Art that allows a user to select multiple English language sentences as depicted in FIG. 10 which when selected, using a mouse, would work to modify a column of text such that after the selection followed by the selection a conditional solution sentence would make the said application offer a unique solution.

There does not seem to be any methods in the Prior Art that allows a user to store a unique group of sentences from the SQL database into a cell of the said application spreadsheet after which that group of sentences can be attached to a single English language sentence (stored in a spreadsheet cell or text or SQL databases or equivalent data repositories and then that sentence can be selected from a drop down SQL menu or input into the said application at the user input or sent to the said application from a software agent text message, perhaps from the decision made by another spreadsheet. Any spreadsheet cell being read by the said application can be made to process (read or write) to other cells in the same or other spreadsheets.

SUMMARY OF DISCLOSURE

The purpose of the forgoing said computer software application is to process a user's knowledge, experiences, and observations stored as English language sentences and words stored in text, SQL databases, and in spreadsheet cells. The said application upon receipt of English language sentences and words then automatically opens the appropriate spreadsheet or spreadsheets and appropriate spreadsheet tabs to start reading the English language sentences and words stored throughout the cells in the spreadsheet. Those read sentence in the spreadsheet cells can then read sentences in cells that cause the spreadsheet to analyze a designated column of text (put there by English language text or words or by a user opening the spreadsheet) which then results in a unique decision that makes the spreadsheet read a designated solution cell also containing English language sentences and words. The English language text or words read from this designated solution cells may contain sentences that send text messages to other spreadsheets that ask those spreadsheets to make a decision and then to send their decisions back to the originating spreadsheet or send their decisions to other spreadsheets in the form of English language sentences and words.

The solution cell can also contain sentences that analyze two cells and if the data is the same in the two cells then the said application will read a designated cell containing English language sentences and words (called the Then cell) and if the data is not the same in the two cells, then the said application will read a different designated cell (called the Else cell) containing English language sentences and words. The solution cell can also contain other sentence types that cause the reading of these sentences that will then open web pages, execute computer programs, execute SQL queries, further read other spreadsheet cells, send software agent text messages to other computer applications or to other instances of the said computer application to cause that said computer application to process its own spreadsheet cells and or initiate other computer activities.

As the said application processes its spreadsheet cells making decisions along the way and posting what it is doing to the user, it also writes information to cells in the spreadsheet or to other spreadsheets in different computers telling these cells in text and characters what it has done. Users, at a later date, can for example, ask the spreadsheet what is has done by asking the spreadsheet (with an English language sentence or sentences) the date and time that the said application displayed user drawings. As the said application goes through its work it can even send progress statements to a column of cells and then as a final step, the said application can read a conditional solution sentence that analyzes everything that the said application has done and report the status to its user. Significant improvements in Natural language processing and decision making can be achieved by using text and SQL databases and spreadsheet cells that use a stored sentence's symbol words to tell the said application how it should process the English language text and words stored in spreadsheet cells.

BRIEF DESCRIPTION OF DRAWINGS

Note: There are 32 drawings/figures shown below that correspond to file names except that the below figure names use a space character in place of the underscore character as shown in the actual file name. In addition all filenames include the date of: Jan. 12, 2016, at the end of the file name followed by the .pdf extension and the FIG characters in the file names do not include the period character as in: FIG. Documents that are not designated as figures i.e.: (the Abstract, The Claims, The Spec. (Detailed Description), and the Title use file names with a space character (shown below) in place of the underscore character that are in the actual file name.

the Sentence Map/Listing (FIG. 29) shows all English language sentences used to process the sentences and data in two spreadsheets to show how the said applications are used to process a US Patent application example. The left hand column of FIG. 29 is the sentence Item # and is the same number that appears in all Figures—sentences with a decimal number is a variation of the sentence number just above the sentence decimal number. The center column explains the details of how the sentences in the spreadsheet cells, the text, SQL, and related data repositories are being processed and the functions that they implement. The right hand column is for comments. The sequence of sentences read by the said applications (and shown in the Sentence Map/Listing) depends on the logic and decisions the spreadsheets are making while assisting the user with the US Patent application example—helping to complete the various USPTO documents, making decisions on what is completed and not completed, and presenting the user with documents on the user screen that may need more work to change or update these documents. If a number is shown in a Figure (drawing) that number can be used to find the sentence that was read by the spreadsheet or from a text of SQL database or related data repository by looking at the Sentence Map/listing (FIG. 29) and finding the number in the left most column.

FIG. 2 Sentence Flow For Conditional And Non Conditional Sentence Processing Diagram FIG. 3 Collect Actual And Reference Support Data FIG. 4 Analyze Support Data To Put Data In Cells FIG. 5 Collect Data And Tell Spreadsheet Patent Components Completed FIG. 6 Sentences Selected Based On Column Cell Values FIG. 7 Review USPTO Web Site Requirements And Title Wording FIG. 8 Ask The Spreadsheet IF Patent Funding Approved FIG. 9 Show Status On Administrative Support Items FIG. 10 Showing Key3 Sentence In SQL Menu FIG. 11 Analyze Cell Data For Completed Patent Components and Report FIG. 12 Show Status Patent Components Started And Completed FIG. 13 See If Title Wording Completed FIG. 14 Get Status Of The Abstract Wording FIG. 15 Notes Page For Abstract Wording FIG. 16 Show Status Of The Abstract Wording FIG. 17 Notes Page For What Completed To Date FIG. 18 The Abstract_Has_Not_Been_Completed FIG. 19 Decision To See If Drawings Have Been Completed FIG. 20 Read Cells Based On Drawing Decisions FIG. 21 Show Completed Drawings FIG. 22 Message That The Drawings have not been completed FIG. 23 The Specification Detailed Description Has Not Been Completed FIG. 24 If Then Else Decision On Claims FIG. 25 The Claims Document Has Not Been Completed FIG. 26 Using Support Data Written To Cell FIG. 27 Reads Cell Sentence Then Makes Decision On Funding FIG. 28 MyUSPatent Application Displays Message About Claims Notes FIG. 29 The Sentence Map/Listing—A listing or each English language sentence by number also corresponding to numbers in the diagrams FIG. 30 Agenttest Reads Cell Sends To Agentpatent FIG. 31 Message from AgentTest to AgentPatent On Funding FIG. 32 Message From AgentTest Provisional Patent Not Complete The Title Wording And Status Sheet Document 1-12-2016.pdf The Abstract Wording Document 1-12-2016.pdf The Specification Detailed Description Provisional Patent Application NL And Spreadsheets Document 1-12-2016.pdf The Claims Document 1-12-2016.pdf

DETAILED DESCRIPTION

Figure 1:
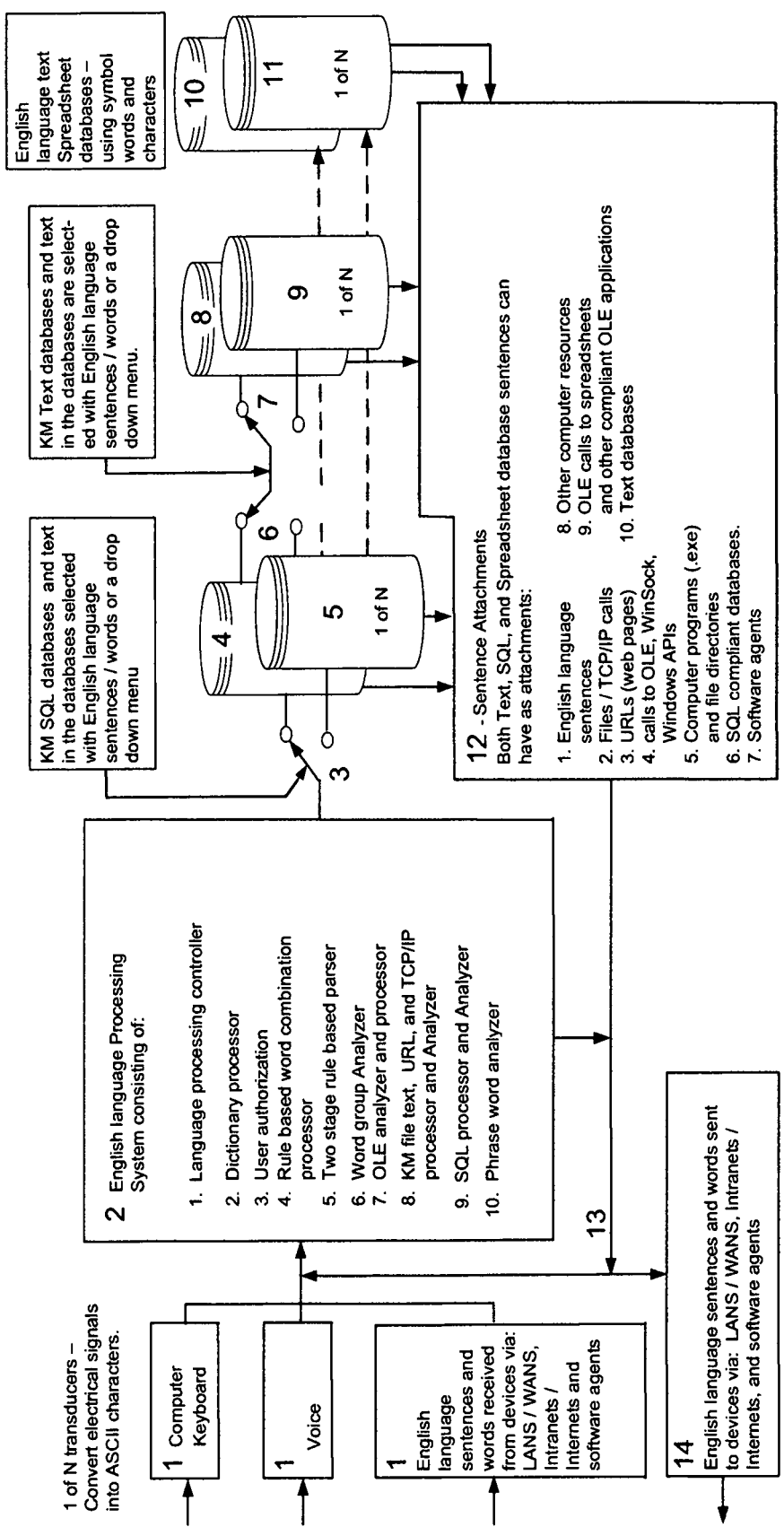
FIG. 1 Overall Architectural Functional Flow Diagram

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file of records, but otherwise reserves all (copyright or mask work) rights whatsoever. The said two spreadsheet applications and the computer programs that process these spreadsheets and the English language sentences and text contained in those spreadsheet cells are detailed in FIG. 29 otherwise known as the Sentence Map/Listing. The English language sentences (that are processed by the spreadsheets) and the comments for each English language sentence and text in FIG. 29 consist of: 40 pages; 12,159 words; 63,001 characters (no spaces); 575 paragraphs; and 2,503 lines.

The processes described within this specification (Detailed Description) document relay solely on the USPTO US Patent processes. This US Patent disclosure uses a said computer application(s) to process an example USPTO patent application and should not be used as a substitute for the US Patent application process defined at the USPTO web site. The purpose of the said computer applications is to define a USPTO patent filing process that will be used by spreadsheets to track, manage, and make decisions that will be submitted to the USPTO for this USPTO utility patent application filing. The way that this will be done will be to place Natural language sentences and words in spreadsheet cells. The Natural language in these spreadsheet cells will then communicate with other cells in the spreadsheet and other spreadsheets to determine the status of work and the decisions that will be made (by the spreadsheets and users) to file the US Patent application. The intention of this approach is to use the said computer application(s) in an actual setting to validate the effectiveness of its methods, to validate the operation of the software application(s), and to give a concrete example of how and where the said application(s) can be used.

There are several distinct computer components that are used to manage the filing of a US Patent application example and they are used together with seven main methods. The computer components that are used consist of: 1c) text and SQL databases or similar databases that store English sentences and words; 2c) Natural language; 3c) spreadsheets and their cells or an equivalent method whereby English language sentences can address (locate) computer memory that contains English language sentences and words; 4c) Symbol words embedded in Natural language sentences; 5c) computer systems that support the TCP/IP protocol so software agent text messages can be sent between spreadsheets (their cells) and; 6c) computing systems capable of processing text, spreadsheets, SQL databases or any equivalent computing systems capable of processing the components and methods as described in this USPTO specification (Detailed Description).

The seven main methods used to process English language sentences and words in text, SQL databases, and spreadsheet databases or equivalent databases where the English language sentences and words in SQL databases can be used, in conjunction with symbol word codes acting as nouns in the stored SQL databases records, can select various cells within its corresponding spreadsheets consisting of: 1m) a method that concatenates column cells of text in the spreadsheet that is activated by sending the spreadsheet an English language sentence(s) or words known as a conditional solution sentence; 2m) a method that compares the text in two cells by sending the spreadsheet an English language sentence or words known as an If Then Else sentence; 3m) a method that uses software agent text messages stored as English language sentences and words in spreadsheet cells; 4m) a method that allows stored English language sentences and words to be stored in both the spreadsheet cells, SQL, and text databases so that the sentences and words stored in the spreadsheet cells can be sorted by any letters input into the SQL database menu system, and that the spreadsheets can be attached to English language sentences and words; 5m) a method that allows the said application to process multiple English language sentences and words that are stored, read, and received from spreadsheet cells; 6m) a method that uses Natural language (English language text) in spreadsheet cells in two or more computing systems and; 7m) methods that let computers get data from spreadsheet cells, but also let those computers and said applications make decisions from the data they get without human intervention using the before mentioned computer components and methods—decisions can comprise several layers of decision making using multiple columns of concatenated text integrated with text that compares one value of text to another value of text in cells in various spreadsheets.

The detailed description of the said computer applications describes processes that further explain the seven main methods of 1 through 7 above and consist of: 1) spreadsheets that process text data and text stored in spreadsheet columns; 2) English language text statements stored in text, SQL databases, and spreadsheet cells that can be sent to the spreadsheets that will cause the spreadsheet to concatenate a column of text resulting in text that is unique for each set of text characters stored in cells in the column of text—the unique column of text characters causes the said application to then read a cell containing English language sentences and words stored in a cell in the spreadsheet; 3) English language text statements stored in text, SQL databases, and spreadsheet cells that can be sent to spreadsheets that will cause the spreadsheet to compare the text in two cells such that the comparison results in the reading of one of two cells containing English language sentences and words; 4) that any decisions made by the spreadsheets can be communicated to other spreadsheet using software agents messages (text sentences and words stored in spreadsheet cells); 5) that spreadsheets that communicate software agent text messages and words to other spreadsheet do not have to communicate the symbol words associated with the sent English language sentences and words; 6) that certain English language sentences and words sent to the spreadsheet will cause the said application and associated spreadsheets to read English language text and words stored in spreadsheet cells;

7) that a first spreadsheets that makes decisions can communicate those decisions to other spreadsheets or a second spreadsheet using software agent and non software agent English language sentences and words and the receiving second spreadsheet can then respond to the first sending spreadsheet using software agent and non software agent English language sentences and words that can change the decision making process made by the first spreadsheet—this process can repeat itself until the spreadsheets come to a final decision which may take several iterations of English language sentences and words that are processed between the first and second spreadsheets which can include involving N number of other spreadsheets in the decision making process; 8) a condition solution sentence (one that consists of making a decision from a column of unique text stored in column cells put there by sending the spreadsheet English language text and words or manually opening the spreadsheet and placing text in those column cells by the user) can be integrated with English language sentences and words that compare the text value in two cells (known as IF Then Else sentences). This is done by placing IF Then Else sentences in the solution cell of the conditional solution sentence (or by placing conditional solution sentences in one of two cells selected by an IF Then Else sentence) remembering that a condition solution can have multiple solution cells and the one that is read by the said application depends on the unique text value found in a column of text cells analyzed by the conditional solution sentence.

It should be noted that all sentences that are processed (read and written to cells) by the said two applications: myuspatentexpert (My US Patent Expert) and ewstestexpert (Ews Test Expert) refer to FIG. 29 known as The Sentence Map/Listing/Listing—This is a computer code listing in Natural Language. These Natural language sentences do all the work to process the US Patent application example using text, SQL and spreadsheet data repositories. The sentence Item # (to the left most side of the (FIG. 29—(The Sentence Map/Listing))) represents the sentence that is being processed in the sequence of all processed sentences as these sentences make decisions, show users completed and not completed work, get data, store data in spreadsheet cells, and otherwise manage all computer processes used to complete the work towards the filing of a US Patent application example.

The spreadsheets used with English language sentences and words do not use numerical processing—the text in column cells are used to define what US Patent application example components are completed i.e.: Abstract, Title wording etc.—being put there by users, software agent text messages, and other cells in the spreadsheet and from this, the said application will then concatenate the column of text (which will be unique) and then decide what cell (based on this uniqueness) containing the English language sentences and words the said application should read/use—to give status and information on the completion of the US Patent application. Sentences read can be software agent message (text messages sent to other spreadsheets asking them to make a decision) or sentences that are read that cause the said application to run a computer program, or to query a remote SQL database, or a query to the said application's internal text database or an English language query to Google as in: (Google, what is the time in London, England?) or reading a sentence that does an IF Then Else comparison of two cells in the spreadsheet and then based on that comparison then reads a specified cell also containing English language sentences and words. In this way, conditional sentence processing (a decision based on the data in a column of concatenated text) integrates with IF Then Else sentences. For example, the column cells containing SpecReqs % and Title % when concatenated becomes: SpecReqs % Title % which in this case means the USPTO web site specification has been read i.e.: SpecReqs % and the Title % has been completed. So, when the conditional sentence for these two cell elements are concatenated, the said application could decide to show notes the user has taken regarding specifications (the rules to file a US Patent application) and then show the user the Title wording.

If the same concatenation method of column cells were applied to numbers, the concatenation, for example, of the numbers 4 and 5 would become: 45 where an addition will yield the number 9. Sending English language text messages and words to spreadsheets can change the way a spreadsheet makes decisions and those decisions use English language sentences and word messages that can be sent to the same or to other computers and their spreadsheet cells or use the computer's resources as in opening files or reading a sentence that opens a URL.

This US Patent application consists of a sentence map (FIG. 29—(The Sentence Map/Listing) that lists each of 48 (0-47) English language sentences and words read by two spreadsheets running on two separated said applications on the same desktop computer to process the said US Patent application examples. Communications between the two spreadsheets is done with English language sentences and words using the TCP/IP protocol and software agents. Each software agent sentence can be stored in spreadsheet cells and the related text and SQL databases. Any sentences stored in a spreadsheet cell must have that same sentence stored in the SQL database since in one case, the SQL database is used to indirectly to sort sentences in the various spreadsheet cells. Sorting can use any input characters to find specific sentences stored in the SQL database and by default in any spreadsheet cell containing the same sentence or words.

Agent names are chosen by the user and stored and defined in the application text databases. On application start up, an English language text start up sentence is read by the said application that further reads the stored software agent names (that were defined by the user) which are further associated with a TCP/IP address and port numbers. The two software agent names defined on start up and used to process this US Patent Application example are: AgentPatent and AgentTest. A typical AgentPatent text message would look like the following:

agentpatent show me the last date that the drawings were reviewed going to the USPTO*DisplayCellValueExcel* Sheet2*Row21*ColE*SendBackDatum*XLSX?

This English language sentence (text) message is being sent by the ewstestexpert (Ews Test Expert) application having the agenttest software agent name and is sent to the myuspatentexpert (My US Patent Expert) application. When this message is sent by the ewstestexpert (Ews Test Expert) application, the agent name is removed (agentpatent) and the remaining words and symbol words are assigned to a TCP/IP address and port number and sent to the myuspatentexpert (My US Patent Expert) application noting that both applications comprise the same functions as shown in FIG. 1. The sentence is received as shown in FIG. 1 going to Point 1 then to Point 2 then the sentence goes to Point 3 and uses SQL database Point 4, then to Point 6 then to Point 7 bypassing text database 8 and then to spreadsheet 10 where the symbol word directive is applied to the spreadsheet, in this case the (myuspatentexpert (My US Patent Expert) application) spreadsheet, where a cell is read (containing English language sentences or words) or written to or used to get a computer resource (file (i.e.; spreadsheet files or other file types), URL, computer program or other computer resource etc.) or used to send a software agent text message(s). Sentences are routed through the said applications depending on the analysis of the sentence types according to FIG. 1. If a cell contains a software agent text message, the text is sent from Point 10 (if the software agent text message is found to be in a spreadsheet cell) to Point 12 then to Point 13 and then to Point 14 and then sent to other applications or to the Internet to other said applications connected to their own respective text, SQL, and spreadsheet databases (cells in the spreadsheet). If the text at Point 4 is not for the text database(s) or the spreadsheet(s), the said sentence goes to Point 12 and its sentence attachment is executed. Likewise, if the sentence is for the text database the sentence goes from Point 3 bypassing the SQL database and going to Point 7 then to Point 12 for execution. If the sentence was for an Internet search engine, the sentence would start with the name of the search engine followed by English language words that would be processed by that search engine— search engine names, like software agent names are defined at application start up. The input text would go from Point 1 to Point 2 then to Point 13 then to Point 14 and out to the Internet search engine. FIG. 2 is another view of the said application running on a single desktop computer and using local host to communicate between the myuspatentexpert (My US Patent Expert) application and the ewstestexpert (Ews Test Expert) application. The computer at Point 3 inputs a sentence to the myuspatentexpert application at Point 4 which, in turn, uses the SQL databases (Point 7) to query a cell in the spreadsheet at Point 8. In turn, Point 8 goes to Point 2 and sends a sentence to Point 6 and the ewstestexpert application at Point 5. Point 5 sends a response back to the myuspatentexpert application at Point 4 and if there are no more sentences in either the myuspatentexpert application or the ewstestexpert application sentence queues the spreadsheets stop reading and writing to cells or activating computer resources, otherwise sentence processing continues until the sentence queues are empty or the said applications are not receiving or sending other messages.

The after mentioned sentence shown below:

agentpatent show me the last date that the drawings were reviewed going to the USPTO*DisplayCellValueExcel*Sheet2*Row21*ColE*SendBackDatum*XLSX?

consists of a sentence body—namely:

(agentpatent show me the last date that the drawings were reviewed going to the USPTO) and a symbol word (defined as a noun in the sentence) consisting of: (*DisplayCellValueExcel*Sheet2*Row21*ColE*SendBackDatum*XLSX?).

The sentence body tells what the sentence will do i.e.: send an agent sentence telling the myuspatentexpert (My US Patent Expert) application to show the last date and time that the drawings were reviewed by the user before sending the drawings to the USPTO. The symbol word directive *DisplayCellValueExcel* then tells the said application to go to Sheet2 Row21 ColE and show the user what is stored in this spreadsheet cell. Initially, when the drawings were displayed by the said application, a spreadsheet sentence embedded within a spreadsheet cell that contained a sentence that told the said application to show the drawings was a sentence that wrote a date and time to the spreadsheet cell: Sheet2 Row21 ColE. So now sending the before mentioned sentence to the myuspatentexpert (My US Patent Expert) application will show the date and time that the drawings were last reviewed before going to the USPTO.

The said application starts processing its USPTO patent application components by receiving input letters as shown in FIG. 1 at point 1. The input letters can come from user input at the keyboard, spreadsheet cell processing, text or SQL data repository processing or other data repository processing or from software agent text messages consisting of an Agent name, English language sentences, and words. The spreadsheet processing and decision making starts by inputting the letters (key10) which are letters contained in an English language sentence stored in the SQL database. Since the letters Key10 are unique to all the stored (learned) English language sentences and words in the SQL database (or secondarily in the text databases), it causes the said application to read this sentence, which in learn mode was attached to one of two spreadsheets and in particular the (myuspatentexpert (My US Patent Expert) spreadsheet. This spreadsheet is used to process most of the components of the USPTO patent application example. The other said application (ewstestexpert (Ews Test Expert) application) processes the remaining said sentences using its text, SQL, and spreadsheet cells. The spreadsheet opens (not visible on the computer screen), for processing, when the sentence or words are input because the sentence was attached to the spreadsheet in learn mode using the SQL database. The SQL database sends the Key10 sentence to the spreadsheet using the directions in the Key10 sentence symbol word and tells the said application to start reading a spreadsheet cell also further defined in the sentence's symbol word. All the sentence's processed by both spreadsheets are described in great detail in FIG. 29—(The Sentence Map/Listing)—the Natural language listing of all 48 (0-47) English language sentences in total) used to process the USPTO patent application example. In the case of FIG. 29 (The Sentence Map/Listing), shows each sentence and is defined as a sentence item # in the left most margin of this document followed by a description section (middle section) stating the process of each sentence followed by the right hand margin that contains additional comments. Some US Patent application processing sentences will be discussed in detail later in this description and all of the sentences processed in both spreadsheets are described great detail in FIG. 29—(The Sentence Map/Listing).

It should be noted that inputting the letters: key10 (see FIG. 29—(The Sentence Map/Listing)) sentence Item 0A) into the said application (myuspatentexpert (My US Patent Expert) application either at the application input at FIG. 1 or from a cell (that sends the spreadsheet sentence or words back to the input a Point 1) in a spreadsheet or from a software agent text message coming from another spreadsheet (at point1 (related to English language input) in FIG. 1) or by selecting a sentence from the drop down SQL menu (as an example shown in FIG. 10) will cause the said application(s) to process all 48 (0-47) English language sentences and words in all the cells within the two spreadsheets that comprise two separate said applications either using the same computer or other computers connected together using an Internet connection(s). In reading all 48 (0-47) sentences, the said application will further use English language sentences and words to read and write to cells and to make decisions regarding the status of USPTO patent application example components, show user notes on how to fill out the a US Patent Application, prompting users to complete remaining work, and to make decisions that will tell a user what work should be started next. It should be noted that the US Patent detailed description uses an example US Patent application filing of how the said application(s) can be used to assist users in this effort, but it should also be noted that the said application(s) can be used in any environment, using the said application and English language sentences (the English language can be used in any domain) defined using words to assist users in making decisions and automating work activities using the said applications, computers, and when needed, using the Internet.

Figure 10:
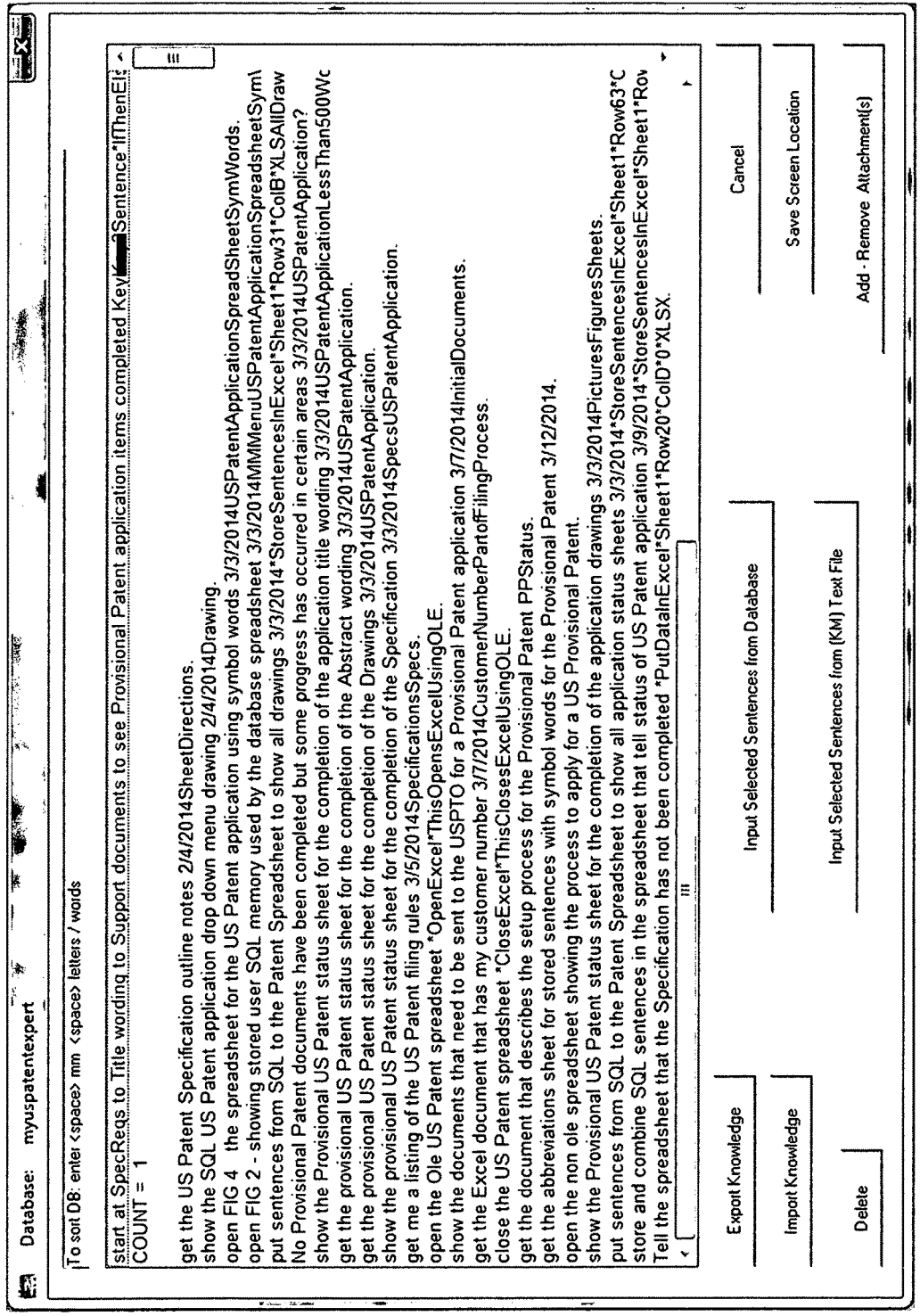

Referring to FIG. 29—(The Sentence Map/Listing) and shown as sentence item #0A and shown here as:
(Read master sentence to show all US Patent Application work keykey10*ReadSentencesExcel*Sheet2*Row12*ColA*Datum*XLSX.)
where it can be seen that the SQL database sentence has the letters: key10 in its symbol word. These letters are unique to all sentences stored in the SQL database which causes the said application to process this sentence as soon as the Key10 letters appear at the input at point1 of FIG. 1. If there were two or more stored sentence with the key10 letters, the said application would not process any of these sentences, but instead would display these sentences in a drop down SQL menu similar to what is shown in FIG. 10 and then let the user decide which stored sentences should be selected and processed by the said application. At this point, the user would select the appropriate stored sentence for processing. Now, when the said application reads this sentence as the only sentence with the letters: Key10 which is part of a sentence stored in the SQL database (as shown above), it opens the spreadsheet since it is attached to the Key 10 sentence and uses an OLE (Object Linking and Embedding) process, to start reading the sentences in a spreadsheet cell as defined by the Key10 sentence symbol word as in: (keykey10*ReadSentencesExcel*Sheet2*Row12*ColA*Datum*XLSX).

To process the US Patent application example, the said applications use two spreadsheets and two software agent names to communicate with each other's spreadsheets using text messages. One software agent name is: agentpatent and its application name is the: myuspatentexpert (My US Patent Expert) application and the other agent name is the: agenttest and its application name is the: ewstestexpert (Ews Test Expert) application. Both applications are running on the same computer but using a TCP/IP connection to communicate with each other's applications and spreadsheets using text. When the said application starts reading the key10 sentence, it sees that its symbol word (a noun in the stored sentence) contains the instructions: Sheet2*Row12*ColA which tells the myuspatentexpert (My US Patent Expert) application to read the contents (the sentences) of this cell in the spreadsheet at this location.

In this cell, shown as sentence Item #0B in FIG. 29—(The Sentence Map/Listing), is a sentence and two character sets namely: (turn on the switch to store processed sentences. key7. key3.). The sentence (turn on the switch to store processed sentences.) is a sentence stored in the text database and when read directs the said application: myuspatentexpert (My US Patent Expert) to record each processed sentence (that is read) as the spreadsheets start making decisions and reading and writing to various cells within both spreadsheets for the US Patent application process. Further, the myuspatentexpert (My US Patent Expert) application will send and receive text messages using software agent text messages stored in various spreadsheet cells that will be sent and received by the ewstestexpert (Ews Test Expert) application. At the end of the sentence's processed in the myuspatentexpert (My US Patent Expert) application is a sentence that tells the said application to show all sentence's processed to the user on the computer user screen (see sentence Item #41 in FIG. 29—(The Sentence Map/Listing)) that were processed and recorded on this application as a result of the sentence that told the said application to record each processed sentence (namely, as: (turn on the switch to store processed sentences.) which was stated earlier to the myuspatentexpert (My US Patent Expert) application when it read the cell sentences associated with the Key 10 input—see sentence Item #0A and 0B in FIG. 29—(The Sentence Map/Listing).

FIG. 29—(The Sentence Map/Listing) is a direct result of all the sentences processed and automatically shown to the user on the computer desktop based on the sentence (turn on the switch to store processed sentences.)—this sentence causes sentences to be recorded and the recorded sentences are displayed by the reading of sentence Item #41 which occurs at the end of all sentences processed in the myuspatentexpert (My US Patent Expert) application. To see all sentences processed in the ewstestexpert (Ews Test Expert) application requires a setup process similar to the one done by the myuspatentexpert (My US Patent Expert) application using the same sentences as in: (turn on the switch to store processed sentences.) followed by a later sentence in the ewstestexpert (Ews Test Expert) application that tells this application to display all recorded sentences. It should also be noted that while a particular said application is reading spreadsheet cell text or writing text, the said application can still receive text messages from other said applications since those received messages are posted at the end of the text that is currently being processed by that said application. The next set of characters are the (Key7. Key3.) characters. Like the Key10 characters, the Key7 characters are unique to a stored sentence in the SQL database and shown as an example in FIG. 10 for the Key3 sentence. Also, a cell containing the text in FIG. 29 (The Sentence Map/Listing) item #0B are all separated with the period character. This is done since the said application has to know what characters it should take to the text or SQL databases and if there were no sentence delimiter (the period character) the said application would try to look for all characters run together which would be: (turn on the switch to store processed sentences key7 key3) and there is no stored sentence with a sentence that represents these characters in the SQL, text, or spreadsheet cells.

As the spreadsheets start making decisions from the reading of stored Natural language (English language sentences and text/words/characters) stored in various cells throughout both spreadsheets in the (myuspatentexpert (My US Patent Expert) application and the ewstestexpert (Ews Test Expert) application) run by these two separate said applications running on the same desktop computer having their own spreadsheets and text and SQL databases, the said applications will need to start analyzing spreadsheet cells. In the first case, the process that starts the analysis consists of collecting concatenated cell column text values for both a reference and actual column for the myuspatentexpert (My US Patent Expert) application. A reference column of text in cells that are concatenated i.e.: (the letter A in one cell and the letter B in another cell becomes: AB when concatenated) is compared to an actual column of concatenated text such that the actual column of individual text in cells is changed when a cell is sent a text message to the spreadsheet indicating, for example, that a password has not been created to upload documents to the USPTO. As shown in FIG. 3, the reference column consisting of (Sheet3 Rows 6 through 17 Column C) has text characters in its cells that depict certain tasks needed to be completed in what is called the support items i.e.; setting up a password (Sheet3 Row 9 Column C—%4PasswdDone), making sure fonts are the same throughout all documents sent to the USPTO (Sheet3 Row7 Column C—%2SameTextFonts) along with other tasks that need to be identified and completed by the said applications.

The reference column values can be changed by sending the spreadsheet a text message or by a user who opens the spreadsheet to manually add or change the values in the reference column, however, the values in the reference column usually never change. On the other hand, the actual column cell text values change as patent support items are completed. Looking again at FIG. 3 and noting, for example, that a password has not been established to upload documents to the USPTO, the cell (Sheet3 Row9 Column D—%4PasswdNotDone) indicates that no password has been established.

Next, two English language sentences are read from a spreadsheet (this all came about from the: Key10 input) cell that concatenates the column cell text values for the reference and actual columns identified in FIG. 3 diagram numbers 3 and 4 and puts the concatenated values in a cell as shown in FIG. 26. It can be seen that in FIG. 26 that cells identified as numbers 3 and 4 are not equal noting that number 3 shows the letter value of: 4PasswdNotDone in its concatenated value and number 4 shows the letter value of: 4PasswdDone in its concatenated value. In should be noted that the Sentence Map/Listing (FIG. 29) identifies number 3 and 4 above as sentence Item # s and the details of each and every sentence processed in the spreadsheets including sentences that read and write data to cells, sentences that make IF Then Else decisions based on cell data, conditional solution sentences that analyze a column of text cells and then select a cell for reading, sentences that send and receive software agent text messages, and sentences the open computer resources are detailed in the Sentence Map/Listing (FIG. 29).

Since these concatenated values are not the same (according to sentence Item #5 in the Sentence Map/Listing (FIG. 29)) and shown here as:
(check for reference and actual support items (i.e.: password) completed for the Provisional Patent application *IfThenElse*Sheet1*Row26*ColB*Row26*ColC*Row-22*ColK*Row22*ColK*Spreadsheet.)
meaning some or all of the support items have not been completed, the said application then chooses to read the Else cell namely the second Sheet1 Row22 ColK (it's one of two cells will the same cell location and, therefore, the same cell contents (Sheet1 Row22 ColK) value—see FIG. 29—(The Sentence Map/Listing) sentence Item #5A that explains in more detail how this IF Then Else sentence works). Making the said application read the same cell sentences regardless of what the IF Then Else sentence determined, as shown in FIG. 29—(The Sentence Map/Listing) sentence item #5, was done because the user wanted to see all documents that were being presented by the said application regardless of what the said application decided to do (what cell the If Then Else sentence decided to select because of the comparison—(Sheet1*Row26*ColB*Row26*ColC). Now, sentence item #5 in FIG. 29—(The Sentence Map/Listing) (based on the cell data in FIG. 26) reads the contents of the spreadsheet cell identified as Sheet1Row22 ColK in the myuspatentexpert (My US Patent Expert) application and starts reading the sentences at this location as shown in FIG. 4, starting with sentence Item #6 (middle spreadsheet screen shown above Sheet1) and shown as sentence Item #6 in FIG. 29—(The Sentence Map/Listing). Sentence Item #6 then writes the letters: SupportNotComplete % to Sheet1 Row22 ColB as shown in FIG. 4. The value: SupportNotComplete % will be used later by other sentences (i.e.: a conditional sentence) to make decisions regarding what work should be done to complete the US Patent application example. The cell containing the written letters: SupportNotComplete % simply means that all support items have not been completed as shown in FIG. 3 Sheet3 Rows 6 through 17 ColD whereby ColD and ColC, when concatenated, are not equal to each other as determined by sentence Item #5 which causes sentence Item #6 to write SupportNotComplete % in cell Sheet1 Row22 ColB in FIG. 4.

Sentence Item #6 in FIG. 29—(The Sentence Map/Listing) is important because the IF Then Else sentence of Item #5 has decided that all support items are not complete (i.e.: did not receive a password from the USPTO) and based on the sentence of Item #6 (FIG. 29—(The Sentence Map/Listing—sentence Item #6) the said application myuspatentexpert (My US Patent Expert) application is going to put the value of: SupportNotComplete % in Sheet1 Row22 ColB. This is an example of how IF Then Else sentences (sentence Item #5) read from a spreadsheet cell, tests text data in two cells and then based on that decision uses a sentence (sentence Item #6) to put the value: SupportNotComplete % in a column that will be used by the conditional solution sentence in Item #9 (FIG. 29—(The Sentence Map/Listing)) which will concatenates a column of patent tasks (SpecReqs %, Title %, and SupportNotComplete %) to become: SpecReqs % Title % SupportNotComplete %. The conditional solution sentence will use this value in its concatenation process to then make its own decisions based on getting this data from the myuspatentexpert (My US Patent Expert) application for its specific reason. In summary, the before mentioned sentences Item #3 (FIG. 3) gathers two columns of support data (actual and reference), then in FIG. 4 using sentence Item #6 and the K column (Else column), puts this data in Sheet1 Row22 ColB which is then used in another column of data shown in FIG. 5 by sentence Item #9 which is then used to make decisions on patent tasks completed and is described in more detail below.

Sentence Item #7 collects the reference column (regarding what would constitute all completed patent documents—this is a different reference column than the one used to determine support items completed or not completed) by concatenating cell text from Sheet1 Row16 to Row25 (shown in FIG. 5) which then puts the results in cell: Sheet1 Row67 ColB. Again, sentences Item # s 3 and 4 were used to concatenate support data (receipt of password from the USPTO) vs. concatenation by sentences #7 and 8 which determined actual patent components completed i.e.: (Reading the USPTO web site requirements, completing the Title wording and Abstract etc.—see FIG. 29—(The Sentence Map/Listing) Item #7B and in FIG. 5 Sheet1 Row67 ColB. Next, sentence Item #8 in FIG. 29—(The Sentence Map/Listing) gets the actual data (regarding actual patent documents completed) and concatenates Sheet1 Row16 to Row25 ColB and puts the result in cell: Sheet1 Row66 ColB as shown in FIG. 5 Sheet1 Row66 ColB. Sentence Item #12 in FIG. 29—(The Sentence Map/Listing) will use the concatenated data from the reading of sentences 7 and 8 (see FIG. 4) and FIG. 29 to make decisions and show users what has been completed towards the filing of the US Patent application example. It also should be noted that sentence Item #12 is the key3 sentence (see the letters Key3 in its symbol word—shown below as:
(start at SpecReqs to Title wording to Support documents to see Provisional Patent application items completed KeyKey3Sentence*IfThenElse*Sheet1*Row66*ColB*Row67*ColB*Row16*ColH*Row16*ColI*Spreadsheet.)
meaning that all key7 sentences have been read and processed from sentence Item #0 through sentence Item #11 as shown in FIG. 29. In summary, the key7 input sentence reads sentence Item #0 through sentence Item 11, also stored in the various spreadsheet cells and text and SQL databases, while the key3 input sentence reads sentences Item #12 through sentence Item #47 where some of these sentences are read and processed by the second said application running under the same desktop computer known as the ewstestexpert (Ews Test Expert) application.

Sentence Item #9 is a conditional solution sentence (makes a decision based on the various contents of text cells in a column). This will determine what has been done to complete the US Patent application by analyzing the column of text where each entry in the column text spreadsheet cells were put there by opening the spreadsheet and placing a text value in a column cell or from a software agent text message (perhaps from a decision made by another spreadsheet) or from a spreadsheet cell that has a stored sentence in that cell that will put a value in a cell within the designated spreadsheet. Each entry in the column text indicates what US Patent application task has been completed. When the Title wording task has been completed, for example, the letters: Title % will be placed in Sheet1 Row17 ColB as shown in FIG. 5. When sentence Item #9 is read from the spreadsheet cell (also residing in the myuspatentexpert (My US Patent Expert) application SQL database—see FIG. 6 number 9), it concatenates its column text cells and then reads the appropriate helper sentence (see Reference 9) stored in this SQL database. The correct helper sentence and its data are selected from some of the parameters in the conditional solution sentence (#9 in FIG. 29—(The Sentence Map/Listing)) and the value it concatenated from its respective column cell text. As shown in FIG. 5 Sheet1 Row16 to Row25 ColB, the data in these cells has been concatenated by sentence Item #9 and then further explained in FIG. 29—(The Sentence Map/Listing) by helper sentence #9D. 9D's Sheet1 Row66 ColB (FIG. 5) cell contains the same text as the concatenated value found by the conditional solution sentence of sentence Item #9 which means that the said application will read this helper sentences' solution cell which is identified as Sheet1 Row17 ColF as shown in FIG. 6.

Figure 8:
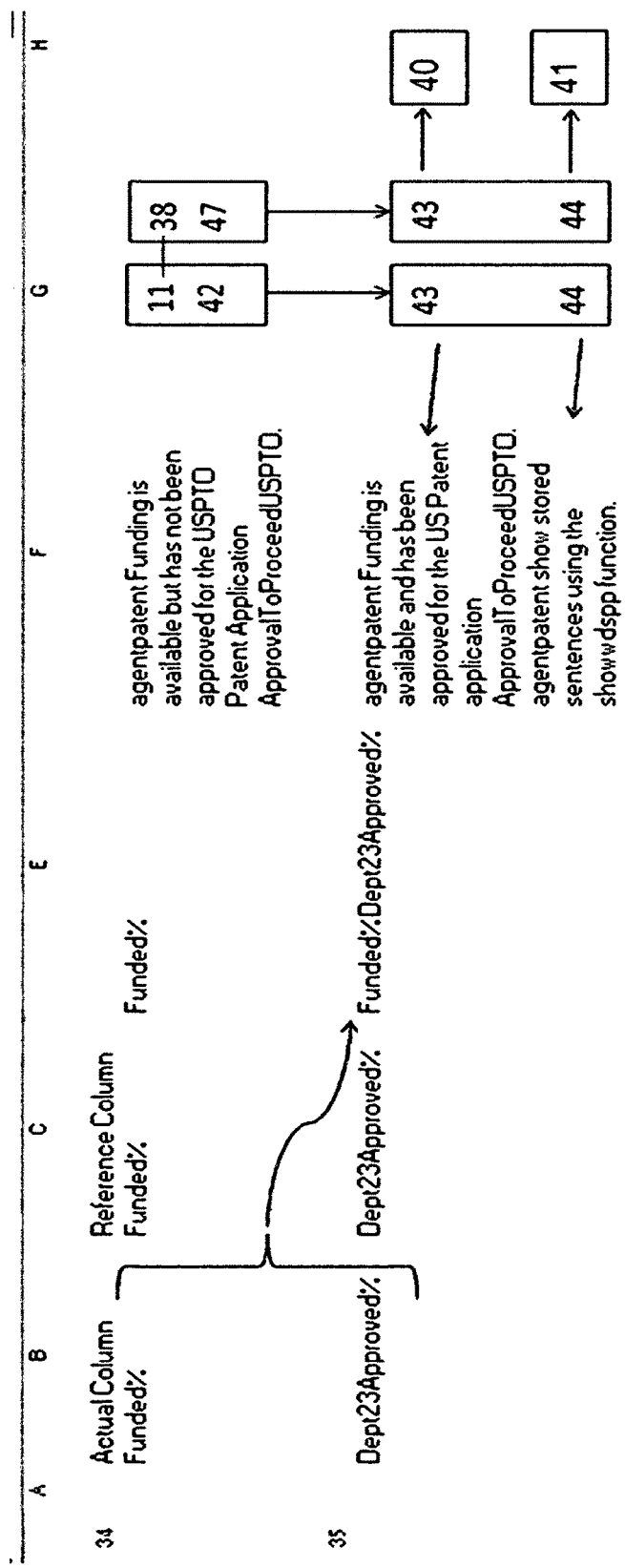

Note, that there were 4 helper sentences to choose from: The helper sentence #9D in FIG. 29 selects the cell to read as shown by sentence #10 based on what has been completed as shown in FIG. 5 Sheet1 Row16 to Row25 ColB. Sentence Item #10 when read by the said application displays the user message on the desktop as shown in FIG. 7. Noting that the helper sentence selected cell Sheet1 Row17 ColF as shown in FIG. 6. Further, the helper sentence's solution cell (which is the solution cell for the conditional solution sentence of sentence Item #9) is a second sentence in cell Sheet1 Row17 ColF which contains a software agent text message. The software agent text message is shown in FIG. 29 as sentence Item #11. This text message is sent from the spreadsheet in the myuspatentexpert (My US Patent Expert) application to the ewstestexpert (Ews Test Expert) application spreadsheet. This is another conditional solution sentence as shown in FIG. 29 sentence Item 11.2 and is shown in FIG. 8. In effect, sentence Item #11.2 (derived from sentence Item #11 in FIG. 29) concatenates Sheet1 Row35 to Row43 using solution sentence (Item #11.2) and concatenates Sheet1 from Row35 to Row43 ColB in the myuspatentexpert (My US Patent Expert) application's spreadsheet again seen in FIG. 8. (Note, there is no data in cells Sheet1 from Row38 to Row43 ColB) and further uses helper sentences to tell the said application what cell it should read as the solution to the conditional solution sentence in sentence Item #11 (i.e.: 11.2). In this case, the helper sentence tells the said application (ewstestexpert (Ews Test Expert)) to read cell Sheet1 Row36 ColF (using helper sentence 11C in FIG. 29 (The Sentence Map/Listing) and FIG. 8).

The first sentence in cell shown in FIG. 8 is shown in (FIG. 29) sentence Item #43 and is a software agent text message that is being sent back to the myuspatentexpert (My US Patent Expert) application (noting that myuspatentexpert (My US Patent Expert) sent a first message (sentence Item #11 (FIG. 29)) to the ewstestexpert (Ews Test Expert) application and now, in response, is sending a message back to the myuspatentexpert (My US Patent Expert application). This message now appears in the myuspatentexpert (My US Patent Expert) application and is shown in FIG. 29 as sentence Item #40 telling the myuspatentexpert (My US Patent Expert) application that funding has been approved to work on the USPTO patent application as shown in FIG. 31. It should be noted that software agent text messages sent from application A then received by application B and then back to application A appear to be out of order, when looking at the sentences in the sentence map/listing, FIG. 29, and this is because processed software agent text messages go to the end of sentences being processed in the receiving said application. So sentence Item #11 in myuspatentexpert (My US Patent Expert) application sends a software agent text message and receives a reply that appears in the myuspatentexpert (My US Patent Expert) application from ewstestexpert (Ews Test Expert) as sentence Item #40 which is at the end of sentences processed in the myuspatentexpert (My US Patent Expert) application. Further, shown in FIG. 8 and the blocks with sentence Item numbers where sentence Item #11 was sent from myuspatentexpert (My US Patent Expert) application to the ewstestexpert (Ews Test Expert) application and read as sentence Item #43 which is then sent back to the myuspatentexpert (My US Patent Expert) application appearing as sentence Item #40. As sentences are read in the myuspatentexpert (My US Patent Expert) application, sentence Item #38 (FIG. 8) will be read which has the same symbol word as sentence Item #11 but uses different sentence words. The result is that sentence Item #38 will cause sentence Item #47 to be read in the ewstestexpert (Ews Test Expert) application which will send a software agent text message back to the myuspatentexpert (My US Patent Expert) application which will appear in this application as sentence Item #43 just like what was done with sentence Item #11. Two sentences are again read from cell Sheet1 Row36 ColF in the ewstestexpert (Ews Test Expert) application including sentence Item 43 and Item #44. Sentence Item #44—(see FIG. 29) when read will show the sentences recorded by the myuspatentexpert (My US Patent Expert) application as part of the Key10 input. In other words the Key 10 input (see sentence Item #0 in FIG. 29) read a sentence telling the myuspatentexpert (My US Patent Expert) application to record all sentences read in all cells in the myuspatentexpert (My US Patent Expert) application. When sentence Item #44 is finally read it tells the myuspatentexpert (My US Patent Expert) application to show all recorded sentences in a text file (shown on the computer screen) which has been copied into FIG. 29—The Sentence Map/Listing.

The key7 input letters (caused by the input of the key10 letters) made the said application find the sentence, in parenthesis below, in the SQL database which is: (Read master sentence to show all US Patent Application work keykey10*ReadSentencesExcel*Sheet2*Row12*ColA*Datum*XLSX.).

and then to use this sentence's symbol word and go to the correct cell and then to read the sentences in that cell. The symbol word is:
(keykey10*ReadSentencesExcel*Sheet2*Row12*ColA*Datum*XLSX)
When this cell was read from a designated cell in the myuspatentexpert (My US Patent Expert) spreadsheet the cell contained the sentence and letters including: turn on the switch to store processed sentences. key7. key3. The key7 letters found a sentence in the SQL database which then starting reading sentences 1 through 11 in as shown in FIG. 29—(The Sentence Map/Listing). Since there are no more sentences to process from the key7 letters, the myuspatentexpert (My US Patent Expert) application starts processing the key3 letters. Like the key7 letters, the key3 letters are part of a sentence in the SQL database (see FIG. 10 top sentence) and is the only sentence with the key3 letters which causes the said application to read this sentences as soon as it is selected by the myuspatentexpert (My US Patent Expert) application because it's the only sentences with the letters: key3. The key3 sentence in its decision making and processing of spreadsheet cells will cause the said applications to read and write data resulting in processing the remaining sentences in both spreadsheets. The key7 sentence read and processed 12 sentences while the key3 sentence will read and process (48-11) sentences resulting in the processing of 37 sentences which starts at sentence number 12 and ends with sentence number 47 as seen in FIG. 29.

Figure 13:
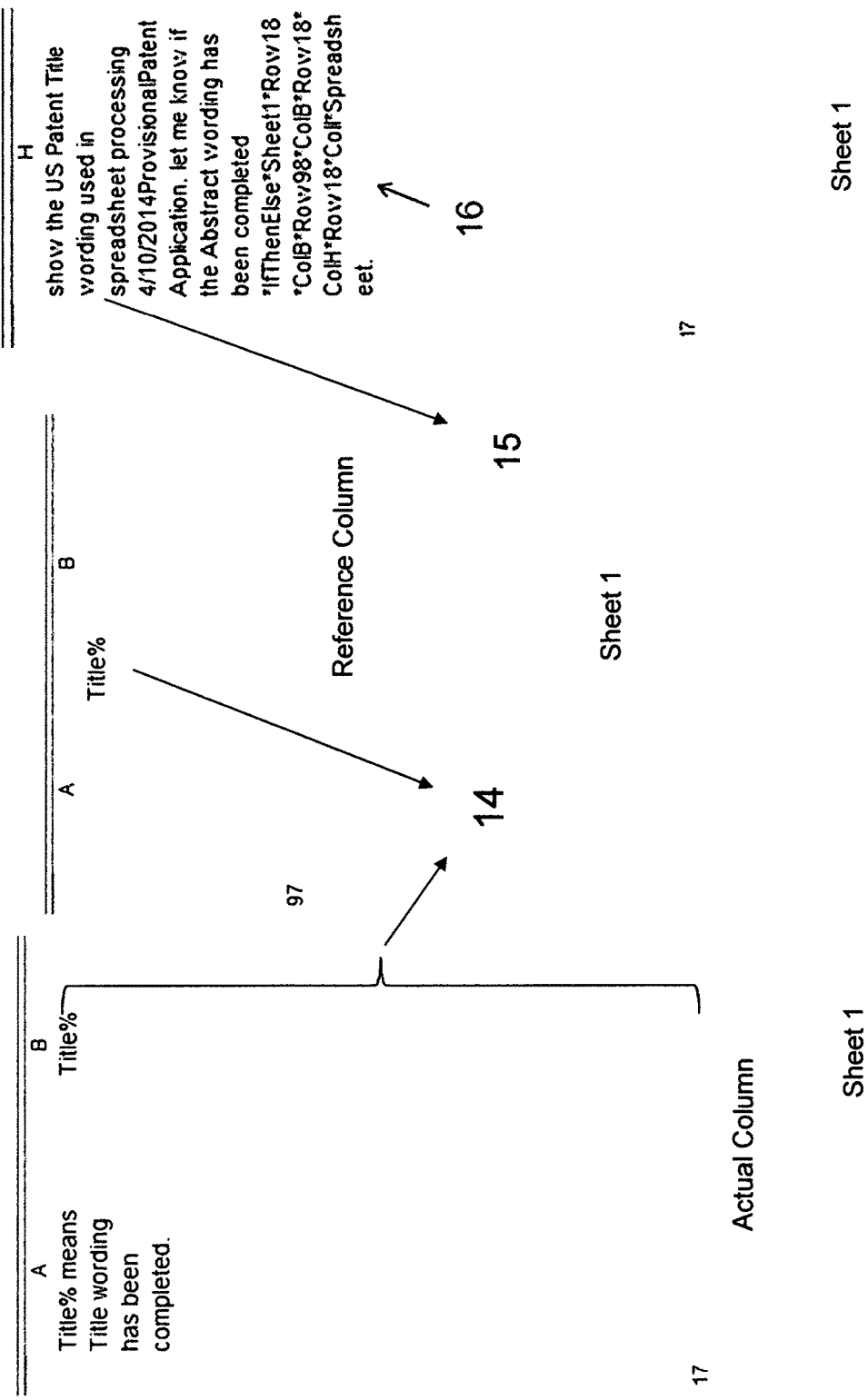

Next, sentence Item #12 (see FIG. 10) used the data put in the cells from sentence Item #6 and 7 from FIG. 11 Sheet1 Row16 to Row25 Cols B and C which put the concatenated data in FIG. 11 Sheet1 Row66 ColB and Sheet1 Row67 ColB and made the IF Then Else decision (of sentence Item #12) causing the myuspatentexpert (My US Patent Expert) application to read the sentences in cell FIG. 11 Sheet1 Row16 ColI (Column I) consisting of sentences # s 13 and 14. The myuspatentexpert (My US Patent Expert) application will now start reading sentence Item #13 (FIG. 29—(The Sentence Map/Listing)). Sentence Item #13 displays FIG. 12. Next, the sentence Item #14 from Sheet1 Row16 ColI is read (FIG. 11) which is another IF Then Else sentence that will compare two cells for the value of: Title % meaning that the Title wording has been completed if the user or an English language sentence (form a decision made by some spreadsheet connected to the Internet) entered the value of Title % in the Actual column—as shown in FIG. 13 or if a user manually entered this value in the spreadsheet or if some spreadsheet cell had a sentence that was read that put the value of Title % in this cell. Since sentence Item #14 finds that both the Actual and Reference cells in FIG. 13 to be equal, sentence Item #14 selects its Then cell (Sheet1 Row17 ColH) to be equal and starts reading the sentences in this cell. In this case, there are two sentences and the first is sentence item #15 (FIG. 29—(The Sentence Map/Listing) and again shown in FIG. 13). Since the spreadsheet determined that the Title wording was completed, sentence item #15 shows the completed Title wording document known as: The Title Wording And Status Sheet Document.pdf which is shown on the computer screen.

Next, the said application will look to see if the Abstract has been complete by reading sentence Item #16—the last sentence in cell Sheet1 Row17 ColH shown again in FIG. 13 with the number 16. Sentence Item #16 is going to test to see if the Abstract wording has been complete and this is done by reading the IF Then Else sentence Item #16. Sentence Item #16 compares cells as shown in FIG. 14 where cell Sheet1 Row18 ColB is compared against Sheet1 Row98 ColB. One cell contains no characters (a blank cell) while the other cell contains the characters: Abstract %. Since there is no match, sentence item #16 (FIG. 29—(The Sentence Map/Listing)) uses its Else cell Sheet1 Row18 ColI (Column I) and starts reading the sentences in this cell as shown in FIG. 14. The myuspatentexpert (My US Patent Expert) application starts reading the next 4 sentences (sentence Item #17 through sentence Item #20) again from cell Sheet1 Row18 ColI (Column I). The sentences read from Sheet1 Row18 ColI (Column I) are also shown in FIG. 29 reading sentence Item numbers and associated Figures as in: 17 (FIG. 16), 18 (FIGS. 18), and 19 (The Abstract Wording Document.pdf) mostly shows status and documents related to work on the Abstract. Sentence Item #20 is another IF Then Else sentence and will show drawing status and selected drawings on the computer screen.

Sentence Item #20 compares two cells (see FIG. 19) one containing the word: Drawings % (Sheet1 Row99 ColB) and the other cell (Sheet1 Row19 ColB) containing no characters and is empty. Since the comparison fails, sentence Item #20 starts reading the sentences stored in cell Sheet1 Row19 ColI (Column I) (the Else cell)—shown both in FIG. 19 and FIG. 20. Now, in FIG. 20 the said application starts reading the sentences in this cell (Sheet1 Row19 ColI (Column I)) consisting of sentence item 21 (Sheet1 Row19 ColI (Column I)) (FIG. 20 and FIG. 21) which then reads a cell consisting of sentence Item numbers: 22, 23, and 24 (FIG. 21 (Sheet2 Row21 ColC)). Sentence Item #22 puts a date in a cell to indicate when the drawings were presented to the user on the computer screen. At a later time a user can ask, with an English language sentence: (When were the drawings last shown to the user?). Sentence Item #23 shows all the drawings Figures which are attached to this sentence except for FIGS. 1 and 2 which have their own sentence (sentence Item #24) and shows FIG. 1 and FIG. 2. After sentence Item 24 is read showing both FIG. 1 (the overall architectural diagram) and FIG. 2/25 (the conditional sentence diagram), the said application then returns to cell Sheet1 Row19 ColI (Column I) (FIG. 20) and starts reading sentence Item #25.

Reading this sentence by the myuspatentexpert (My US Patent Expert) application shows a message on the computer screen stating that all the drawings (Figures) have not been completed—see FIG. 22. Sentence Item #26 is read next shown in FIG. 20 sentence number 26 and see FIG. 29 sentence Item 26 which is another IF Then Else sentence type and will test a cell to see if the letters: Specification % (Detailed Description) are in both of the cells that this sentence will test. Since the letters: Specification % (Detailed Description) only exists in one cell shown in FIG. 29—(The Sentence Map/Listing) sentence items 26 and 26A), the said application will read sentences in cell Sheet1 Row20 ColI (Column I) and start reading sentence Item #27 which is this Specification (Detailed Description). The said application will also read sentence Item #28 (see FIG. 23) which is a status message presented on the computer screen that tells the user that the specification (Detailed Description) is not complete. Notes can be placed in this document to give other relevant information regarding the status of the specification (Detailed Description). Next, sentence Item #29 referred to in The Sentence Map/Listing displays the Specification (Detailed Description) outline notes. These notes contain all information on writing the US Patent application example and the final US Patent application. Also note that no spreadsheet cells have been sent to the USPTO that shows a cell test for the letters: Specification % (Detailed Description) as was done for the Title % and Abstract %. The outline notes open when the Specification (Detailed Description) opens on the desktop computer—the notes are not sent to the USPTO but are displayed on the computer screen to assist the user in filling out the Specification (Detailed description) and other documents.

Figure 24:
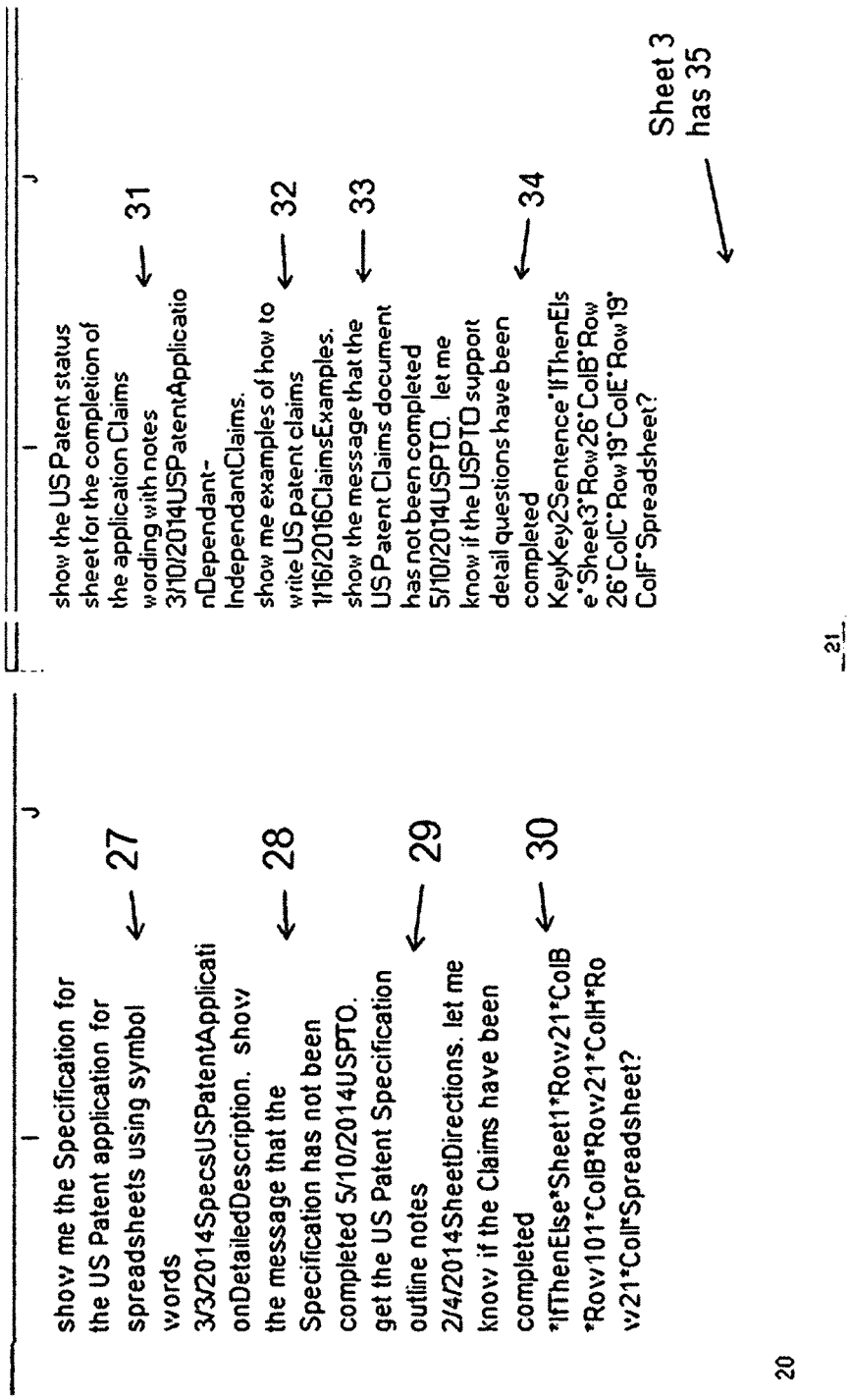

Sentence Item 30 (FIG. 24, FIG. 27, and FIG. 29—(The Sentence Map/Listing)) is another IF Then Else sentence and this time the sentences will test a cell in the spreadsheet to see if the Claims have been completed. One cell has the characters: Claims % while another is an empty cell (if the claims were completed the empty cell would also contain the characters: Claims %). Since the comparison does not match, sentence Item #30 (see FIG. 24) chooses the Else cell which is cell Sheet1 Row21 ColI (Column I) which contains 4 English language sentences that the said application will read starting with sentence Item #31 shown again in FIG. 24. The said application next reads sentence Item #31 which is displayed on the computer screen and tells the user what has been done to complete the claims document. FIG. 29—(The Sentence Map/Listing) shows sentence Item 31A and explains in detail which documents are being sent to the USPTO. Sentence Item #32 when read is another document displayed on the computer screen that gives examples of how to write claims. Sentence Item #33 tells the user that the claims have not been completed. This is displayed to the user with a document that is read by the said application and shown as FIG. 25 on the computer screen. Next, the said application reads sentence Item #34 which will determine if the Support Detailed Questions have been completed. This is going to depend on the work of two previous read sentences which were sentence Item # s 3 and 4 which are shown in FIG. 3 and FIG. 26 again shown in detail in FIG. 29—(The Sentence Map/Listing) for sentence Items 34 and 34A. Sentence Item 34 compared cells Sheet3 Row26 ColB and Sheet3 Row26 ColC and since they are not equal meaning the support questions indicate, for example, that the password has not been received from the USPTO, sentence Item #34 selects its Else cell (cells were not equal—Sheet3 Row19 ColF FIG. 27) to read the sentences in this cell.

This again is shown in FIG. 27 and the said application starts reading sentence Item #35. Note, that any one or more sentences shown in a spreadsheet cell can be copied and pasted into the input of the said application, to do whatever the said sentences tells the said application to do. Sentence Item #35 shows a user status sheet showing FIG. 3 on the computer screen where the Actual column shows the status of support items either completed or not completed. Next, sentence Item 36 is a status document regarding completion of Support Items i.e.: (Password completed and received from USPTO). This is shown with a status document in FIG. 9. Sentence Item #37 is read next and sends a message to the ewstestexpert (Ews Test Expert) application from the myuspatentexpert (My US Patent Expert) application using a TCP/IP connection to this application. Just before the myuspatentexpert (My US Patent Expert) application sends sentence Item #37 to the ewstestexpert (Ews Test Expert) application it removes the letters agenttest and the sent message becomes:
The US Provisional Patent has not been completed May 15, 2014.
This sentence does not have its symbol word but finds its symbol word in the ewstestexpert (Ews Test Expert) application SQL database which is:
*ReadSentencesExcel*Sheet1*Row48*ColC*Datum*XLSX When the sentence:
(The US Provisional Patent has not been completed May 15, 2014.) is read by the ewstestexpert (Ews Test Expert) application, it uses its symbol word found in the ewstestexpert (Ews Test Expert) application SQL database and from the directions in this sentence's symbol word starts reading the cell at cell location: Sheet1 Row48 ColC which is shown in FIG. 30. This read sentence then becomes sentence Item #46 in the ewstestexpert (Ews Test Expert) application because it's being processed by the ewstestexpert (Ews Test Expert) application as shown in FIG. 29—(The Sentence Map/Listing). Now, sentence Item #46 sends a message from the ewstestexpert (Ews Test Expert) application back to the myuspatentexpert (My US Patent Expert) application and appears as sentence Item #39 in the myuspatentexpert (My US Patent Expert) application remembering that in the Sentence Map/Listing—FIG. 29, a total of 48 sentences are processed, sentences item # s 0-41 are processed by the myuspatentexpert (My US Patent Expert) application and sentence Item # s 42-47 are processed by the ewstestexpert (Ews Test Expert) application. The fact that these read/processed sentences appear to be out of sequence text messages (jumping back and forth between the two applications) is due to the fact that text messages received by a said application are posted at the end of all the sentences that are in that said application's sentence queue. After sentence Item #37 is read, the myuspatentexpert (My US Patent Expert) application starts reading sentence Item #38 as shown in FIG. 27, but sentence Item #37 sends a message to ewstestexpert (Ews Test Expert) application which then starts processing its spreadsheet cell resulting in sentence Item #46 being sent to the myuspatentexpert (My US Patent Expert) application (see FIG. 30) which, in turn, is processed in this application as sentence Item #39 in the Sentence Map/listing—FIG. 29.

After sentence Item #37 is read/processed, the myuspatentexpert (My US Patent Expert) application starts reading sentence Item #38 (FIG. 27) i.e.:
(agenttest get the status for funding and approval from Agent test KeySentence*GetSingleCellDataCatColuLet*Sheet1*Row35*Row43*Row44*ColB*Datum*SolSentX.).
This is an agent text message that is being sent to the ewstestexpert (Ews Test Expert) application. It is also a conditional solution sentence and will go to the spreadsheet in the ewstestexpert (Ews Test Expert) application and concatenate a column of text cells to determine if funding has been approved to work on the US Patent application. In FIG. 8, a user either put the values of: Funded % and Dept23Approved % (by opening the spreadsheet) in the actual columns at locations Sheet1 Row35 ColB and Sheet1Row36 ColB respectively or these values were put there by English language sentence sent from a software agent text message or from a sentence selected from the Text or SQL databases. When the conditional solution sentence is received (shown below again) by the ewstestexpert (Ews Test Expert) application as in:
(agenttest get the status for funding and approval from Agent test KeySentence*GetSingleCellDataCatColuLet*Sheet1*Row35*Row43*Row44*ColB*Datum*SolSentX.)
it concatenates (In FIG. 8 in the ewstestexpert (Ews Test Expert) application spreadsheet) Sheet1 Row35 ColB and Sheet1 Row36 ColB which results in the concatenated value of:
Funded % Dept23Approved %

Next, the two helper sentences starting with (Identify below: (Identify the message for approved funding and review after requirements review and Title completion helper-LetterMethod*ReadSentencesIfExcelValue*Sheet1*Row-44*ColB*Row36*ColE*Read*Sheet1*Row36*ColF* XLSXMsgGp1.)
And
(Identify the message for approved funding after requirements and Title completion but USPTO project not approved helperLetterMethod*ReadSentencesIfExcelValue*Sheet1* Row44*ColB*Row35*ColE*Read*Sheet1*Row35*ColF* XLSXMsgGp1.)
are matched by some of the parameters in the conditional solution sentence namely: (Sheet1 Row44 ColB) where these same parameters are in the above two helper sentences. But the conditional solution sentence works further and from its concatenated value of:
Funded % Dept23Approved %
looks to see which of the two above helper sentences has this same value as contained in a cell pointed to by a particular helper sentence. As it turns out, the helper sentence pointing to a cell with the same values as found by the conditional solution sentence's concatenation is:
Sheet1 Row36 ColE. (see first helper sentence above each having the letters: (identify . . . ) Now, since the correct helper sentence has been identified, the said application now is directed to read the sentences in this helper sentence's solution cell which is cell: Sheet1 Row36 ColF. See FIG. 8 Sheet1 Row36 ColF to see what sentences are being read by the ewstestexpert (Ews Test Expert) application. Also, if should be noted that in FIG. 8 that Sheet1 Row35 and Row36 ColC are the Reference cells and tell the user what data can be put in Sheet1Row35 ColE and Sheet1Row36 ColE.

Sentence Item #38 (the conditional solution sentence) came from sentences being read in cell Sheet3 Row19 ColF in the myuspatentexpert (My US Patent Expert) application as shown in FIG. 27 and the reading of the cell containing the sentences in FIG. 27 came from the decision made by sentence Item #34 which made its decision based on FIG. 3 and FIG. 26.
Referring to FIG. 8, it should be noted that the numbered blocks in columns G and H state that sentences Item #11 and 38 perform the same function but use different sentence words but have the same symbol word. In turn, sentence Item #11 causes sentence Item 42 to be read in the ewstestexpert (Ews Test Expert) application. Next, sentence Item 42 causes sentence Item #43 to be sent to the myuspatentexpert (My US Patent Expert) application. When this sentence is read in the myuspatentexpert (My US Patent Expert) application it become sentence Item #40 and displays the user message (see FIG. 31) in the myuspatentexpert (My US Patent Expert) application as detailed in sentence Item #40 FIG. 29 (the Sentence Map/Listing).

Likewise, sentence item #38 (like sentence Item #11) causes sentence Item #47 to be read in the ewstestexpert (Ews Test Expert) application. Next, sentence Item #47 causes sentence Item #43 (just like sentence Item #11) to be sent to the myuspatentexpert (My US Patent Expert) application. When this sentence is read in the myuspatentexpert (My US Patent Expert) application it become sentence Item #40 and displays the user message in the myuspatentexpert (My US Patent Expert) application as shown in FIG. 29. Finely, the second sentence from the ewstestexpert (Ews Test Expert) application spreadsheet to be read from this cell is namely: FIG. 8—Sheet1Row36 ColF and is sent to the myuspatentexpert (My US Patent Expert) application. This appears in the ewstestexpert (Ews Test Expert) application as sentence Item #44—See FIG. 8 and FIG. 29—(The Sentence Map/Listing). When sentence Item #44 is sent to the myuspatentexpert (My US Patent Expert) application it shows up as sentence Item #41—See FIG. 8. Sentence Item #41 was told to display all the sentences that were collected (by the sentence: turn on the switch to store processed sentences.) from the input: key10 sentence Item #0B) shown in the Sentence Map/Listing or FIG. 29.

Process Summary—The said patent application employs methods to process Natural language that when used with symbol words, data repositories, software agents, and spreadsheets, will make decisions not normally known to spreadsheet processes—spreadsheets are normally used to perform mathematical functions. An English language sentence (or text) can tell a spreadsheet to analyze two columns of text and if the English language sentence doing the analysis, using an If Then Else sentence, decides that the two columns of text are equal it will read a cell with English language sentences and if the two columns are not equal the said computer application will read a different cell with English language sentences. The columns of text used in the before mentioned analysis are shown in FIG. 3. The said application is working to determine what support components have been completed in the US patent example application which is being used to demonstrate, in a practical sense, where and how the said computer applications can be used. This is done by sentence Item 2 shown in FIG. 4. Then sentence 5 in FIG. 4 decides that the column text is not equal (the US Patent application support items are not complete—i.e.: do not have a password etc.) and so the column cell of Sheet1 Row22 Column K was selected for reading by the decision of Sentence 5 which included sentence numbers 6, 7, and 8 in FIG. 4.

Next, sentence 6 in FIG. 4 writes SupportNotComplete % in FIG. 4 to cell Sheet1 Row22 Column B which is also shown in FIG. 5 Sheet1 Row22 Column B. Now sentence 9 in FIG. 6 integrates the column data from sentence 5 put in Sheet1 Rows16 through Row26 Column B showing: SupportNotComplete % from the IF Then Else sentence 5 then selecting sentences 6,7, and 8, and then back to sentence 9 shown in both FIGS. 4 and FIG. 6. Next, solution sentence 9 (FIG. 5—concatenates column B Rows16 through 26) and based on the unique values in this column including: SupportNotComplete % selects a helper sentence by testing each helper sentence to see if it has the same concatenated values along with other matching values to the conditional solution sentence. The correct helper sentence once selected uses its solution cell Sheet1 Row17 Column F and reads sentences 10 and 11 shown in FIG. 6. Sentence 10 shows a status sheet and sentence 11 sends a text message to the ewstestexpert (Ews Test Expert) application using the TCPIP IP address pointed to by using the Agenttest sentence keyword.

Now, sentence 11 is a solution sentence and does not show its symbol word or the fact that it is a solution sentence (it would show: SolSentX in its symbol word indicating it was a solution sentence). When sentence 11 is processed on the ewstestexpert application, it concatenates Sheet1 Rows35 and 36 Column B as shown in FIG. 8 and shown in cell Sheet1 Row36 Column E. This causes (as a solution) the reading of Sheet1 Row36 Column F. which when read by the ewstestexpert application sends two messages back to the myuspatentexpert (My US Patent Expert) application. One of the sentences sent back from the ewstestexpert (Ews Test Expert) application to the myuspatentexpert (My US Patent Expert) application tells the user that funding for the US Patent application has been approved (shows a message to the user on the myuspatentexpert application that funding has been approved) and the other sentence directs the said myuspatentexpert application to show the sentences that it is processing. Various other English language sentences are processed between the said two applications and explained in great detail in the Sentence Map/Listing of FIG. 29 and in the above detailed description.

General Summary—spreadsheets are not normally used to process Natural language statements stored in spreadsheet cells. Likewise, spreadsheets are not normally used with Natural language such that those spreadsheets and their cells can be used to respond to Natural language statements sent to the spreadsheets from users, from software agent text messages or the spreadsheets themselves as cells are read for the contents of their English language sentences in their cells and then those English language sentences are placed at the input of the said application to query or write to other cells, to make decisions that include going to web sites, doing remote SQL queries (SQL queries not within what the said application does with its own SQL queries), integration of decisions using the said application spreadsheet processes within its spreadsheets or other spreadsheets in the same or other computing systems.

There are some very distinct functions in the said application(s) that give the said applications advantageous capabilities not associated with spreadsheet processing which is comprised of: 1) ability to put text data in spreadsheet cells with English language sentences such that a column of text cells when concatenated from what those English language sentence put in those cells can be made to make decisions based on the content of a column of text cells—the solution is known as a condition solution since the solution depends on the conditions of each text cell in a column of text cells. If the content is changed in a column of text cells, the said application will offer a solution based on the new content in the column cells; 2) The solution offered by the said application(s) to a column of text cells is done by reading a solution cell which can contain multiple English language sentences. Any one of those English language sentences can be used to reset the values in the column of text cells that caused the said application to read its solution cell in the first place. The column of text can also be changed by one or more sentences in the solution cell to pre-bias a solution when other sentences put column text in cells after which a solution sentence is sent to the spreadsheet(s); 3) A spreadsheet can contain multiple columns of text each having a unique solution based on the contents in its column cells; 4) A first spreadsheet making a decision can send its decision to a second spreadsheet which will make its decision based on the decision received from a first spreadsheet. The second spreadsheet can send a message back to a first spreadsheet changing the way it makes any future decisions; 5) The solution cell (containing English language sentences) when read by the said application can read a type of English language sentence known as an IF Then Else sentence. IF Then Else sentences compare the contents of two cells and from a comparison will decide which of the two cells the said application should read. Each of the two cells contains English language sentences or words; 6) A conditional solution sentence can be integrated with IF Then Else sentences or vise versa; 7) Any spreadsheet cell containing English language sentences can use those sentences to: a) Open a URL with an English language sentence such as the USPTO web site; b) Open computer programs; c) Open spreadsheets and read and write to spreadsheet cells coming from spreadsheet cells themselves or processed by inputting text to the spreadsheet; d) Cause the said application to query local and remote SQL databases or text databases; e) open other said applications and; f) cause the said application to process other computer resources; 8) Cause the said application to send and receive software agent text messages to other spreadsheets or to cause the said application to open other computer resources; 9) Store user knowledge, observation, and experiences in the form of English language sentences that can be stored and processed in spreadsheet cells or related data repositories. Further, a single sentence can be read from a spreadsheet cell that then reads another cell containing multiple English language sentences that puts text in various column cells or in one column of text cells that works to bias the column with data such that when the column of text cells is processed by a conditional solution sentence the results is considered to be biased taking into account what those biasing text values (caused by sending the spreadsheets multiple sentences) did to the resulting solution.

Uses—Any system involving the storage in human language associated with human knowledge, observations, and experiences (and stored in computer memory or other such devices) as it relates to complex decision making especially as it applies to the: legal system; engineering systems; medical systems; financial systems; national security systems; US Patent application systems as demonstrated with this disclosure; computer help desk systems, computer software application systems (all of the software running the said applications) is managed by the said application software as demonstrated by the example sentence: get the date that the drawings were reviewed i.e.: (show me the last date that the drawings were reviewed going to the USPTO.) or (get me a listing of spreadsheet symbol words.); or (Tell me if funding has been approved for the pending US Patent application?) or (show me the computer code that processes spreadsheet symbol words.); or systems involving diagram flows or asking the software applications what computer code should be used in a particular situation. The stored sentence: (Tell me if funding has been approved for the pending US Patent application?) is a condition solution sentence that looks at what text was put in a column with English language sentences that define what has been done to fund the US Patent application; legal investigation systems; and any other systems using Natural language and having the need to make complex decisions that can be changed by other remote systems making their own complex decisions using spreadsheets and Natural language as defined in this detailed description.

REFERENCES

Reference 1: Prolog Programming in Depth—Michael A. Covington, Donald Nute, and Andre Vellino ISBN 0-673-18659-8.

Reference 2: A web site in England using WIN-PROLOG—a rule based AI programming language using software agents.

Reference 3: The said application is the software application developed to process English language text sentences, data objects including text databases, SQL databases, and spreadsheet databases where spreadsheet cell text is processed by the said application, and further using software agents, symbol words, synonyms, and synonym sentences.

Reference 4: Software agents are the names given at said application startup that use text to transmit text messages over the Internet or on local computers as in: (agentpatent let me know the status of documents completed for the US Patent application *IfThenElse*Sheet1*Row19*ColD* 15*Row18*ColH*Row18*ColI*Spreadsheet.).

In the above stored English language sentence starting with: agentpatent whereby the text of the remaining part of the sentence after agentpatent is being sent to the said application called: myuspatentexpert via the TCPIP protocol from the said application called: ewstestexpert with software agent name: agenttest. Note, also that the above agent sentence could be sent as: (agentpatent let me know the status of documents completed for the US Patent application.) where the symbol word part would not have to be sent via agentpatent since the full sentence already exists within the myuspatentexpert application so the words that are sent to agentpatent (i.e.: myuspatentexpert) match most of its stored sentence words causing the said application to execute that sentence's attachments which, in this case, is a spreadsheet containing sentences that will be processed by the said application and in this case by the symbol word: (*IfThenElse*Sheet1*Row19*ColD*15*Row18*ColH* Row18*ColI*Spreadsheet) as shown in the above sentence.

Reference 5: English language sentences (have verbs and nouns and may include other grammar types stored in text, SQL, other data repositories, and spreadsheet cells and represent a user's knowledge, experiences, and observations. These sentences may be recalled from the text, SQL, and other such data objects using letters, symbols, partial sentences, and combinations of alpha numeric characters and in doing so will cause the said application to execute the sentence's attachments.

Reference 6: Attachments to sentences stored in the text, SQL, spreadsheet cells, and related data objects include all computer resources including but not limited to: URLs, all file types (spreadsheets, documents, voice and video files, remote SQL queries), software agent sentences stored in the text or SQL data repositories (databases) and other similar data objects that can be used by the said application to process English language sentences such as: Google what is the time in London, England?, English language sentences that open another said application database (a different said application Expert i.e.: open my genome expert.), English language sentences that contain symbol word instruction used by the said application to process cell data in spreadsheets, and other computer resources.

Reference 7: A synonym sentence is an English language sentence stored in the text, SQL, spreadsheet cells, and related data objects that have one or more other stored sentences using different words but attached to the same computer resource.

Reference 8: A solution sentence is a sentence comprising the steps of using its symbol word that is stored in the SQL, or spreadsheet cells and which further use the conditional sentence's symbol word instructions to concatenate a column of alpha numeric characters in a column of cells. The solution sentence then looks for a helper sentence that has the same concatenated value as found by the solution sentence plus additional like values that match the row and column values found in both the conditional solution sentence and the helper sentence such that once a match is found the conditional sentence uses the helper sentence solution cell (contains English language sentences and text). The reading of these stored sentences from the helper sentence comprises the steps for making a solution for the solution sentence. The sentences comprising the solution and defined using conditional sentence helper sentences can contain sentences that are conditional solution sentences, IF Then Else sentences, software agent text messages, and sentences that are used to implement other computer resources. IF then Else sentences that select a cell for reading can contain sentences that are conditional solution sentences or other IF Then Else sentences or sentences that cause the said application to execute other computer resources including sentences that read and write data to spreadsheet cells. Giving the said applications the dynamic ability to read and write data or erase data, gives the said application its memory.

Reference 9: A helper sentence goes to a cell to read sentences and is used by a conditional solution sentences to provide a solution by reading the helper sentence's solution cell. The solution sentence concatenates a column of alpha numeric characters put in these cells by sentences sent to the spreadsheet (users can also put values in cells by opening the spreadsheet). The solution sentence then looks for a helper sentence that contains the same cells identifiers (Rows and Columns and cell information) and then the solution sentence further looks to see if the helper sentence contains the same concatenated values found by the conditional solution sentence in a designated cell, and if it does, the said application then reads the helper sentence and its solution sentences stored in that helper sentence solution cell.

Reference 10: Terms used in this Document—The software application described in this US Provisional Patent application is hereafter known as the said application and is further described as comprising the steps of having a software system using computer programming languages, data objects consisting of repositories that contain various forms of English language text and words, software agents running on local and wide area networks using the TCP/IP protocol or other such protocols used to transport text on local and wide area networks, spreadsheets consisting of columns of cells and individual cells containing English language sentences (the said words (text)) and other such characters, words in the said text that contain synonyms and symbol words and symbol words consisting of characters which may or may not contain spaces. The said data objects/repositories contain English language text sentences which are attached to spreadsheets and upon selecting the text from drop down menus or entering text at the input either opens the said spreadsheets to display their cells or process the symbol words such that the symbol words are used by the said application to process the various cell text within the attached spreadsheet. The spreadsheet cells can either communicate with other cells in the same spreadsheet or communicate using software agents or other methods to transport the text in one cell to another spreadsheet in another said application on a different computer on a local or wide area network. The said attachments are computer resources comprising the steps of attaching files (one type of file is a spreadsheet file), URLs, software agents, computer programs, and other English language sentences—see Reference 4.

Reference 11: Excel is a trade name for Microsoft's spreadsheet application.

Reference 12: Reference to the term English language sentences and words can mean English language sentences and characters or English language sentences and text.

Reference 13: Web based search terms used to see if said application exists per this detailed description: a) spreadsheet conditional sentence processing; b) communications in text between spreadsheet cells; c) reading English language text stored in spreadsheet cells to make decisions; d) integration of English language text decisions based on column text analysis and If Then Else analysis; e) reading English language spreadsheet cell text to make decisions in the English (Natural) language; f) complex decision making using text stored in multi-column spreadsheets; g) coded words (symbol words) used in English language sentences to direct processing of spreadsheet cells and; h) column cell decisions made by the sending spreadsheet that are changed when receiving spreadsheet sends a message back to the sending spreadsheet that changes one of its text column cell values.

What is claimed is:

1. A method that comprises English language processing of text stored in text databases, knowledge management (KM) structured query language (SQL) databases, and spreadsheet cell databases, wherein processing comprising deconstructing input text of an English language sentence into its grammar parts comprising noun and verb phrases, further comprising computer hardware, computer software, and a computer application, wherein a computer application reads Natural language text in SQL and spreadsheet cells to make natural language decisions by processing SQL databases and spreadsheet cells, comprising the steps of:
    placing English language text sentences in selected SQL database, wherein selecting the sentences in a SQL drop down menu will automatically store the sentences in save mode in a designated spreadsheet cell, wherein the English language text sentence is attached to a designated spreadsheet by running a spreadsheet's executable program, wherein a selected sentence is processed by the computer application and connects to the attached designated spreadsheet to process data in the attached designated spreadsheet or other spreadsheets;
    linking together English language sentences with their attachments in spreadsheet cells throughout one or more spreadsheets;
    placing spreadsheet cell text characters in rows or columns of spreadsheet cells that are concatenated to a row or column cell, wherein a concatenated text character data is used in a decision-making process;
    storing English language sentence text in the SQL database, wherein SQL English language text is attached to text characters, wherein the computer application reads the SQL English language sentence text and places attached sentence text characters in spreadsheet column or row cells or places text characters in row or column cells, wherein the computer application reads a concatenation sentence that concatenates text characters placed in row and column cells, wherein the concatenated text characters are compared to cells in the spreadsheet, wherein a comparison results in the computer application selecting one of two cells to read containing English language sentences or text characters;
    storing if then else (IfThenElse) sentences in the SQL databases and the spreadsheet cell databases that will compare a concatenated row or column text character data to another concatenated row or column of text character data or will compare the concatenated row or column text character data to the designated spreadsheet cell in the spreadsheet or other spreadsheets and after the comparison will cause the computer application to read a spreadsheet cell or to read the spreadsheet cell containing English language text sentences; and
    testing a spreadsheet Natural language decision to determine if correct sentences are read from a decision made by the spreadsheet, wherein English language text is sent to the spreadsheet requesting the spreadsheet to retrieve information and make a decision, wherein the computer application transmits and receives text messages to and from spreadsheet cells on local and wide area computer networks.

2. The method of claim 1, wherein a computer application receives a software text message from at least one of a software agent, a text message from a keyboard computer application input text, or a SQL database using an SQL menu to select the text that will be placed at the computer application input, wherein the text in the SQL database is a same text that is in spreadsheet cells, wherein a text selected or received by the computer application are processed by the computer application, wherein SQL text data is selected using a first step comprising;
    matching, including a best match method, wherein not all words at a computer input are needed to match every word in stored text in the SQL database, wherein if a stored SQL sentence has a symbol word, the input text can omit the symbol word and match remaining words in a stored sentence, wherein a near matching stored sentence is placed at a computer application input for processing, wherein a second step comprising;
    processing agent names, wherein an agent name is sent from one computer application to a second computer application, wherein the agent name is contained in the sent agent sentence, wherein an agent sentence comprises the agent name and words in the agent sentence, wherein the agent name is removed at a receiving computer application, wherein the remaining sentence words near match words in the stored sentence of the receiving computer application, wherein a third step comprising;
    processing symbol words, wherein symbol words are located in stored sentences and tell the computer application how to process computer activities, comprising: storage of data in spreadsheet cells, reading data in spreadsheet cells, sending and receiving software agent English language text messages, running computer programs of any type, running SQL queries, execution of object linking and embedding (OLE) spreadsheet functions, implementation of Dynamic Data Exchange (DDE), implementation of English language text messaging to Internet browsers, implementation of application programming interfaces (APIs), and processing browser data.

3. The method of claim 1, wherein the steps of making natural language decisions comprises digitally storing a plurality of English language sentences learned by a computer application from a user or the computer application input text connected to the plurality of text databases, or connected to SQL database input, wherein the computer application input text is connected to the plurality of SQL databases, or wherein the computer application input text is connected to the plurality of spreadsheets using spreadsheet cells, wherein the computer application input text from a keyboard computer application input text selects stored text from the plurality of databases, wherein the computer application input text fully or partially matches words in a database from words at the computer application input text partially or fulling matching the text stored in the databases, wherein selected text from the database is feedback to the computer application input text, or a software agent text message is received at the computer application input text from a remote computer application, wherein the remote computer application is the computer application that sends or receives computer application data to the computer application, wherein the computer application sends the software agent text message comprising a word agent concatenated with the user defined agent name then concatenated with text to make up the software agent text message, wherein a text message is sent to other applications on a local or wide area network, wherein the applications are connected together using the software agent names associated with their internet protocols (IP) addresses, wherein the computer application makes decisions from text sent to a receiving computer application comprising;

text data sent to a spreadsheet, wherein a text data sent to the spreadsheet places data in spreadsheet cells in rows or column cells resulting from text data sent by software agent text message, received at a computer keyboard, or received by a selection of a stored sentence selected from an SQL drop down menu, wherein column or row cells are concatenated comprising;

a column or row of cell text data, wherein an computer application reads a sentence stored in the SQL and spreadsheet cell databases containing a symbol word that directs the computer application to concatenate the text data in row or column cells, wherein a concatenated data is text data placed in a designated cell as determined by the concatenation stored sentence's symbol word in the row or column, wherein the concatenated data is text or numerical data with no spaces between the data in a concatenated cell, wherein the concatenated data is processed comprising;

a next sentence read from the SQL and spreadsheet cell databases, wherein a read stored sentence contains the symbol word comprising if then else (IfThenElse) text that directs the computer application to compare the concatenated cell to another concatenated cell, wherein after a comparison the IfThenElse sentence chooses to read spreadsheet cell sentences, wherein if the comparison is not equal, the computer application is directed to read the cell identified by the symbol word that contains a not equal comparison cell location otherwise the computer application is directed to read an equal comparison cell location, wherein the comparison cell location contains text or English language sentences that are read by the computer application, wherein the computer application processes a next type of comparison of spreadsheet data comprising;

the next sentence read from the SQL and spreadsheet cell databases, wherein the read stored sentence contains the symbol word comprising text known as Solution Sentence X (SolSentX), wherein as a SolSentX symbol word is read by the computer application and directs the computer application to concatenate the column or row of data in the spreadsheet, wherein the concatenated data is compared to a same data in the plurality of helper sentences, wherein the helper sentence data that matches the concatenated data from the SolSentX sentence and finds cell location data in the helper sentence symbol word and reads text or English language sentences in a designated helper cell location, wherein read spreadsheet cells connect different cells together from cell to cell in a spreadsheet or from cell to cell in multiple spreadsheets, wherein spreadsheets send data back and forth, wherein one spreadsheet provides data to a second spreadsheet, wherein a first spreadsheet uses the data or solution from the second spreadsheet to make a decision by the first spreadsheet, wherein the computer application processes the next type of comparison of spreadsheet data comprising;

the next sentence read from the SQL and spreadsheet cell databases, wherein a selected English language text sentence in the SQL and spreadsheet cell databases using the symbol word of the selected English language sentence by near matching the computer application input text to the stored text in the SQL database, wherein after the selected English language sentence is read from the SQL database the computer application reads the symbol word and concatenates the column or row of text, wherein if the row or column contains only one cell value in the column or row, that column or row is concatenated resulting in only one value in the concatenated cell, wherein a single concatenated value is compared to a second cell with a single value, wherein if the comparison is not equal the computer application is directed to read the cell identified by the symbol word that contains the not equal comparison cell location containing English language text or text characters otherwise the computer application is directed to read the equal comparison cell location, wherein the comparison cell location contains English language text or text characters.

4. The method of claim 1, wherein a process to digitally manage knowledge management (KM) structured query language (SQL) database records using spreadsheet cell text messages comprising the steps of;

storing KM SQL records in a KM SQL database, wherein a spreadsheet cell text data is a same data as stored in the KM SQL database;

sorting spreadsheet cell text data using the KM SQL database sorting, wherein spreadsheet cells are not sorted directly, but are sorted in the KM SQL database since every text message stored in the spreadsheet cell is replicated in the KM SQL database which has a plurality of sorting options including uniquely stored sentences that show themselves as one record separated from all other records shown on a computer screen having unique letters or words from all other records in a drop down SQL menu, further comprising text message in the KM SQL database, including one or more symbol words comprising text that instructs a computer application to preform Natural language grammar parsing or non Natural language instructions on spreadsheet cells, wherein non Natural language instructions that are single characters or one or more words are used to select sentence elements of a stored English language sentence currently selected to preform processes by the computer application on the spreadsheet cells, the KM SQL database records or a text database or to carry out functions in the computer application further comprising, sorting of any text stored in the text or KM SQL databases by a single text character or multiple characters comprising the steps of;

sorting common row and columns associated with the spreadsheet cell text stored in spreadsheet cells;

selecting the KM SQL records using a mouse with the computer application SQL drop down menu to automatically store KM SQL text message records in a designated spreadsheet cell, wherein spreadsheet processing further comprises;

selecting remote spreadsheets, wherein a local spreadsheet is known as spreadsheet 1, wherein spreadsheet 1 sends a software agent text message to spreadsheet 2, wherein spreadsheet 2 is in a different network than spreadsheet 1, wherein spreadsheet 2 reads a text message from spreadsheet 1, wherein spreadsheet 2, after reading the text message from spreadsheet 1, is directed to make a decision by analyzing data in spreadsheet 2, wherein spreadsheet 2 sends the decision, in a text message, back to spreadsheet 1, wherein spreadsheet 1 processes the decision from spreadsheet 2, wherein spreadsheet 1 processes the data from spreadsheet 2 to make the decision by spreadsheet 1.

* * * * *